United States Patent
Kozakai et al.

(10) Patent No.: US 12,355,375 B2
(45) Date of Patent: Jul. 8, 2025

(54) STEPPING MOTOR DRIVE DEVICE

(71) Applicant: ORIENTAL MOTOR CO., LTD., Tokyo (JP)

(72) Inventors: Kei Kozakai, Tsukuba (JP); Makoto Morimoto, Tsukuba (JP)

(73) Assignee: ORIENTAL MOTOR CO., LTD., Tokyo (JP)

( * ) Notice: Subject to any disclaimer, the term of this patent is extended or adjusted under 35 U.S.C. 154(b) by 65 days.

(21) Appl. No.: 18/043,888

(22) PCT Filed: Sep. 14, 2021

(86) PCT No.: PCT/JP2021/033813
§ 371 (c)(1),
(2) Date: Mar. 2, 2023

(87) PCT Pub. No.: WO2022/065141
PCT Pub. Date: Mar. 31, 2022

(65) Prior Publication Data
US 2024/0039444 A1 Feb. 1, 2024

(30) Foreign Application Priority Data

Sep. 24, 2020 (JP) .................. 2020-159830

(51) Int. Cl.
*H02P 21/08* (2016.01)
*H02P 8/12* (2006.01)
(Continued)

(52) U.S. Cl.
CPC .............. *H02P 21/22* (2016.02); *H02P 21/20* (2016.02)

(58) Field of Classification Search
CPC ............ H02P 21/22; H02P 21/20; H02P 8/22; H02P 8/12; H02P 21/08
(Continued)

(56) References Cited

U.S. PATENT DOCUMENTS

| 8,378,601 B2* | 2/2013 | Harakawa | H02P 21/06 |
| | | | 318/434 |
| 2003/0057911 A1* | 3/2003 | Kuwano | H02P 8/14 |
| | | | 318/685 |

(Continued)

FOREIGN PATENT DOCUMENTS

| CN | 109450303 A | 3/2019 |
| JP | H04-33560 A | 2/1992 |

(Continued)

OTHER PUBLICATIONS

Hidetaka Takemura, et al., "Vibration Suppression of Stepping Motor Driven System Using Cogging Torque Compensator", Transactions of the Japan Society of Mechanical Engineers Series C, vol. 78, No. 785 (Jan. 2012), pp. 74-81; English abstract.

*Primary Examiner* — Gabriel Agared
(74) *Attorney, Agent, or Firm* — Rabin & Berdo, P.C.

(57) ABSTRACT

A stepping motor driver which drives a stepping motor according to a position angle command includes: a current detector that detects a phase current; an inverter that applies a current to a winding; and a control unit that controls the inverter. The control unit includes: a phase current coordinate transformer that transforms the phase current to generate a dp-axis detection current and a qp-axis detection current; a torque correction command generator that generates a torque correction command according to a torque correction waveform for suppression of torque fluctuation; a torque correction command coordinate transformer that transforms the torque correction command into a dp-axis component and a qp-axis component to generate a dp-axis torque correction component and a qp-axis torque correction component; an adder that superposes the dp-axis torque correction component and the qp-axis torque correction component respectively on a dp-axis fundamental current command and a qp-axis fundamental current command to (Continued)

generate a dp-axis current command and a qp-axis current command; and a control command generator that compares the dp-axis detection current and the qp-axis detection current respectively with the dp-axis current command and the qp-axis current command and applies a control command to the inverter.

13 Claims, 36 Drawing Sheets

(51) Int. Cl.
    *H02P 8/22*       (2006.01)
    *H02P 21/20*     (2016.01)
    *H02P 21/22*     (2016.01)

(58) Field of Classification Search
    USPC ...................................................... 318/400.02
    See application file for complete search history.

(56) References Cited

U.S. PATENT DOCUMENTS

| | | | |
|---|---|---|---|
| 2008/0116835 A1* | 5/2008 | Tsui | H02P 8/32 |
| | | | 318/696 |
| 2015/0137727 A1 | 5/2015 | Furutani et al. | |
| 2016/0233804 A1 | 8/2016 | Furutani et al. | |
| 2019/0199253 A1 | 6/2019 | Shigeta et al. | |

FOREIGN PATENT DOCUMENTS

| | | | | |
|---|---|---|---|---|
| JP | 2003-009592 A | 1/2003 | | |
| JP | 3503894 B2 | 3/2004 | | |
| JP | 2005-210786 A | 8/2005 | | |
| JP | 2010-057217 A | 3/2010 | | |
| JP | 2014-045592 A | 3/2014 | | |
| JP | 2019-516339 A | 6/2019 | | |
| TW | 201332279 A | 8/2013 | | |
| TW | 201517499 A | 5/2015 | | |
| TW | 201820769 A | 6/2018 | | |
| WO | WO-2022065141 A1 * | 3/2022 | .............. | H02P 21/08 |

* cited by examiner

Slot magnet type motor with gap ratio of 4 in non-excitation

Slot magnet type motor with gap ratio of 4 in d-axis excitation with rated current according to rotor angle FIG. 35 Reluctance torque of slot magnet type motor with gap ratio of 8 in d-axis excitation FIG. 37  Rotational vibrations (with correction)
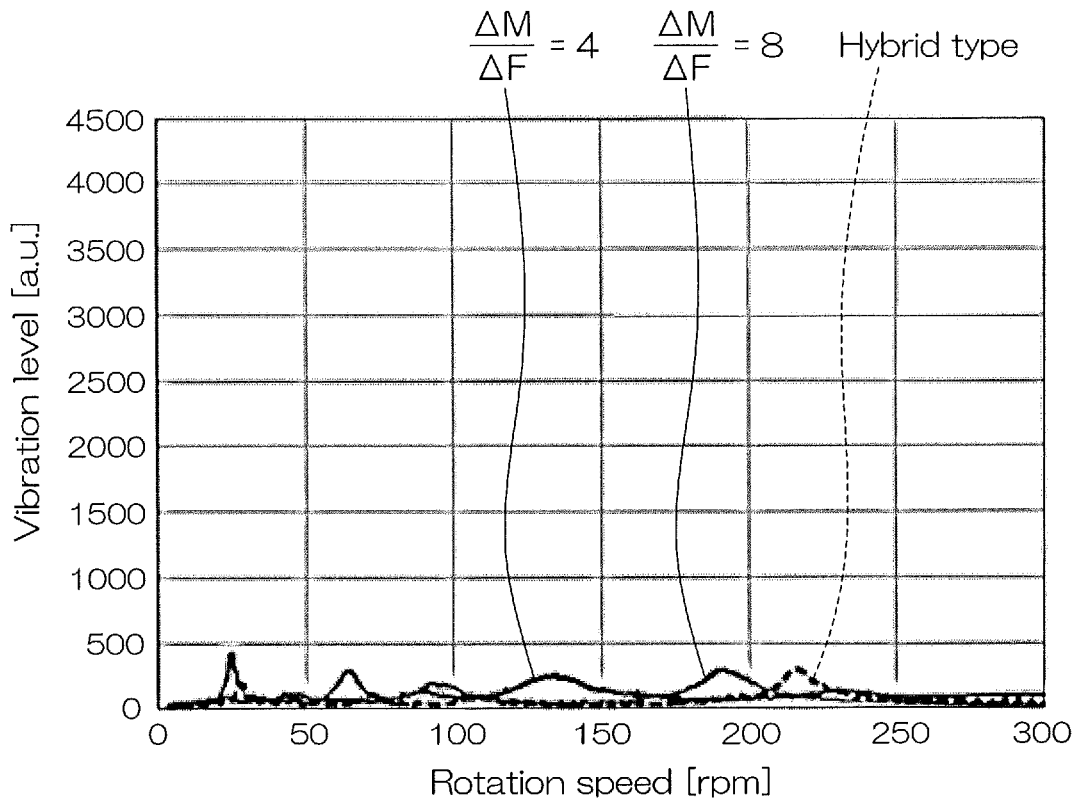
FIG. 38  Current waveforms
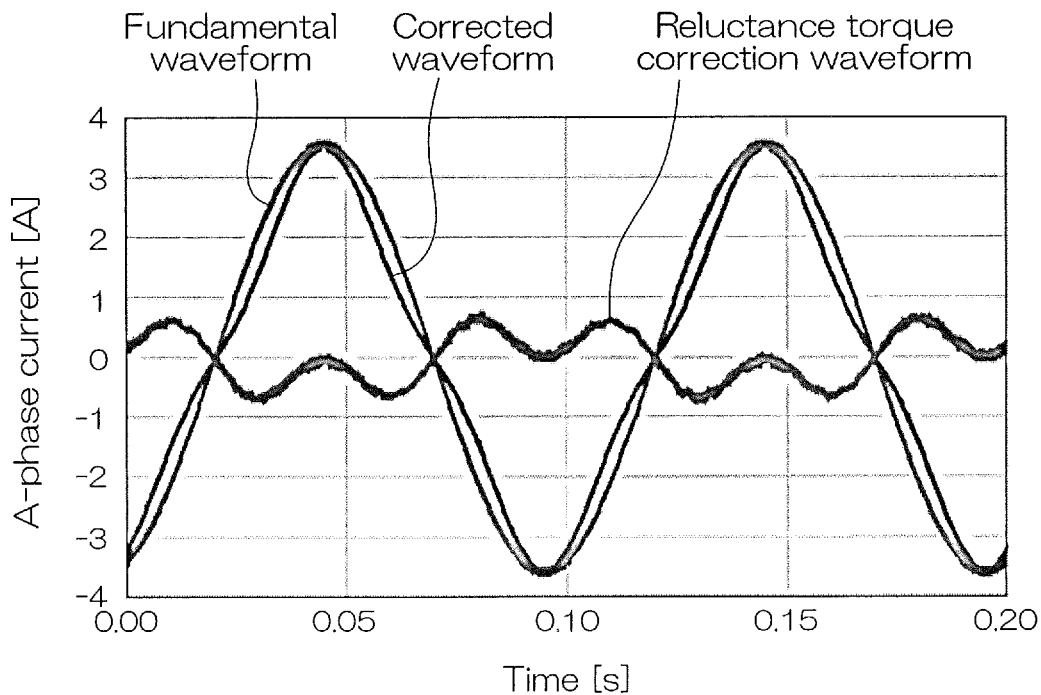

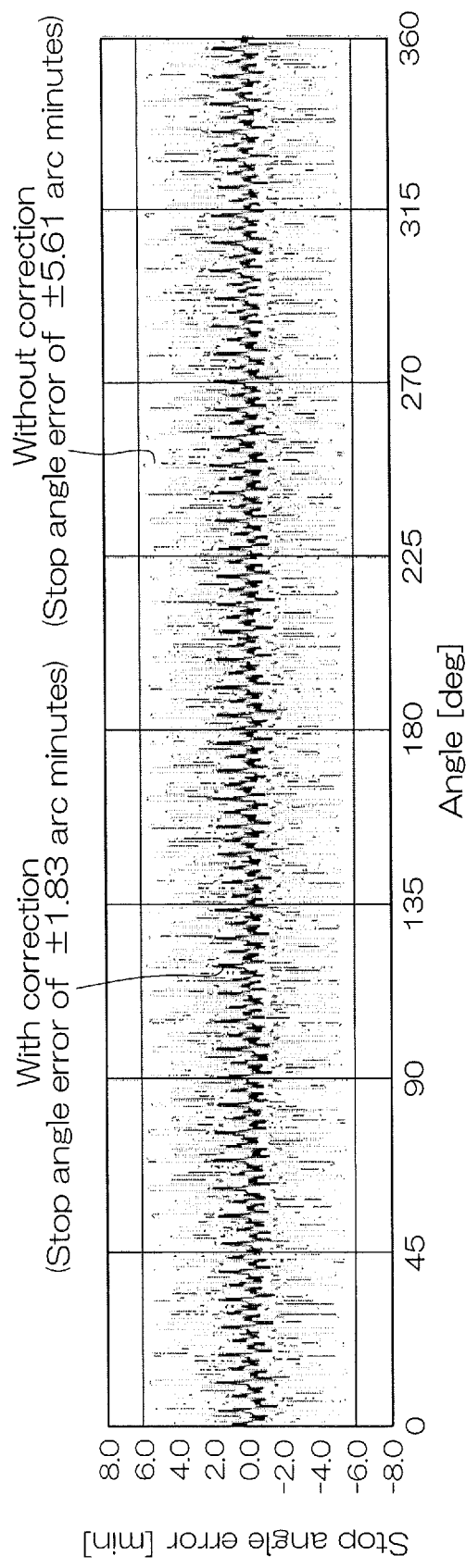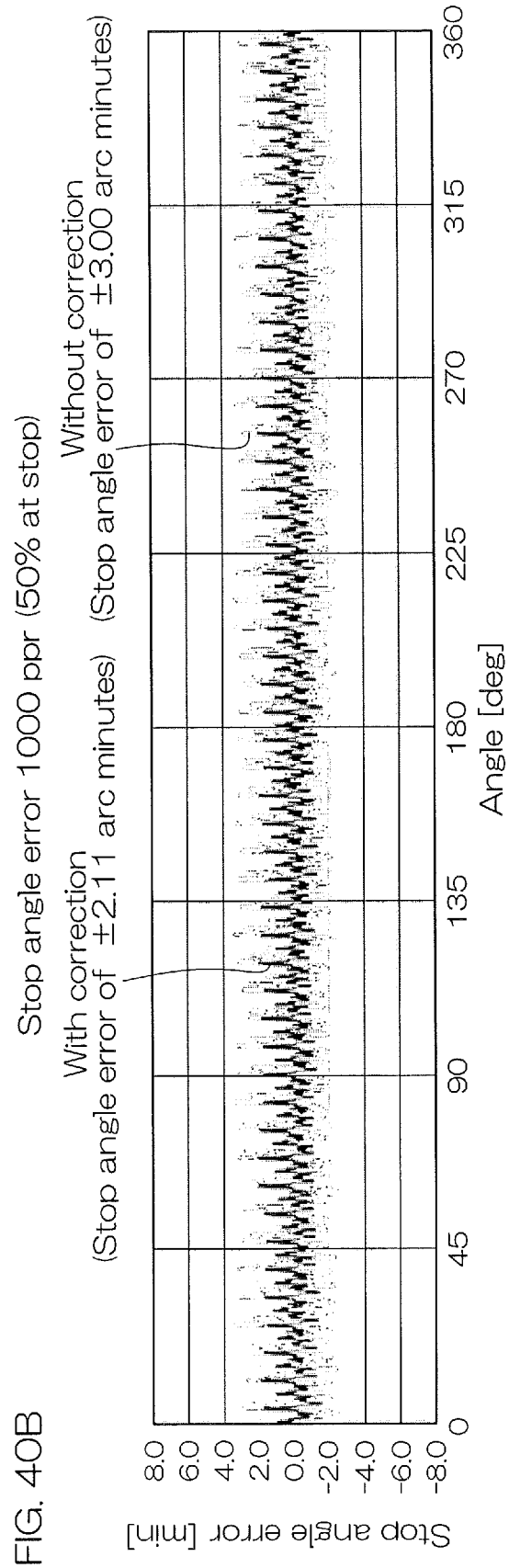

STEPPING MOTOR DRIVE DEVICE

TECHNICAL FIELD

The present invention relates to a driver for driving a stepping motor.

BACKGROUND ART

PTL 1 discloses a driver for driving a stepping motor. The driver includes an angle calculator which converts a command pulse to a command angle and determines a rotational coordinate system defined by the command angle. The rotational coordinate system is defined by a dp-axis and a qp-axis orthogonal to each other. The dp-axis and the qp-axis are rotated according to a change in command angle. A dp-axis current command is set to a value corresponding to a motor energizing current amplitude, while a qp-axis current command is set to zero. On the other hand, a rotor phase current is detected and coordinate-transformed to the rotational coordinate system to provide rotational coordinate system currents (detection currents). The phase current of the stepping motor is controlled so that these rotational coordinate system currents respectively coincide with the dp-axis current command and the qp-axis current command. The dp-qp rotational coordinate system defined by the command angle is angularly offset from a d-q rotational coordinate system defined by a d-axis extending in a rotor magnetic flux direction and a q-axis orthogonal to the d-axis. Therefore, the qp-axis component of the rotational coordinate system currents is correspondingly deviated from the qp-axis current command. A torque is generated according to the deviation to thereby rotate the rotor stepwise. PTL 1 states that the stepping motor driver does not require an operation for controlling the q-axis current according to the rotor angle or the generated torque, and provides a highly precise micro-step driving function with a simple and inexpensive construction.

When the stepping motor is driven with a sinusoidal current (e.g., by micro-step driving), rotational vibrations are liable to occur under certain conditions. The eigenfrequency of the motor is determined by the sum of a rotor inertia and a load inertia, and a torque generated by the motor. The rotational vibrations occur when the rotation speed of the motor is such that the sinusoidal current frequency for the motor driving is one half or one fourth the eigenfrequency.

Further, the stepping motor suffers from a phenomenon such that, when the motor is stopped by excitation of windings with a constant current, the stop position is deviated from a theoretical stop position. This is referred to as "stop angle error."

The problems of the rotational vibrations and the stop angle error are remarkable in a hybrid type stepping motor, particularly in a small-scale hybrid type stepping motor. In a slot magnet type stepping motor which includes magnets inserted between its stator small teeth and/or between its rotor small teeth, the problems of the rotational vibrations and the stop angle error are also remarkable.

PTL 2 discloses a method for suppressing the vibrations by generating an excitation current through micro-step driving with triangular pulses and changing a third harmonic component and a fifth harmonic component obtained by the Fourier transformation of the triangular pulses.

PTL 3 points out that the vibrations occur due to harmonic components of the counter electromotive force of the motor, and discloses a method for suppressing the harmonic components of the counter electromotive force by excitation phase compensation.

NPL 1 points out that the motor vibrations occur due to a cogging torque, and discloses a method for suppressing the cogging torque by excitation phase compensation.

CITATION LIST

Patent Literature

PTL 1: JP3503894
PTL 2: JP2003-9592A
PTL 3: JP2019-516339A

Nonpatent Literature

NPL 1: Hidetaka TAKEMURA, et al., Vibration Suppression of Stepping Motor Driven System Using Cogging Torque Compensator, Transactions of the Japan Society of Mechanical Engineers Series C, Vol. 78, No. 785 (2012-1), p. 74-81

SUMMARY OF INVENTION

Problem to be Solved by Invention

An embodiment of the present invention provides, from a viewpoint different from the conventional arts described above, a stepping motor driver capable of suppressing the vibrations of the stepping motor and capable of highly precisely driving the stepping motor with a simple construction using a rotational coordinate system.

An embodiment of the present invention provides a stepping motor driver capable of reducing the stop angle error of the stepping motor and capable of highly precisely driving the stepping motor with a simple construction using a rotational coordinate system.

Solution to Problem

According to one embodiment of the present invention, there is provided a stepping motor driver for driving a stepping motor according to a position angle command. The stepping motor driver includes: a current detector that detects a phase current of the stepping motor; an inverter that applies a current to a winding of the stepping motor; and a control unit that controls the inverter. A rotational coordinate system which is rotated according to the position angle command is defined by a dp-axis and a qp-axis orthogonal to each other. The control unit includes: a phase current coordinate transformer that transforms the phase current detected by the current detector into a dp-axis component and a qp-axis component in the rotational coordinate system based on the position angle command to generate a dp-axis detection current and a qp-axis detection current; a torque correction command generator that generates a torque correction command according to a torque correction waveform indicating a current waveform to be applied to the stepping motor in order to suppress the torque fluctuation of the stepping motor; a torque correction command coordinate transformer that transforms the torque correction command generated by the torque correction command generator into a dp-axis component and a qp-axis component in the rotational coordinate system based on the position angle command to generate a dp-axis torque correction component and a qp-axis torque correction component; an adder that superposes the dp-axis torque correction component and the qp-axis torque correction component generated by the torque correction command coordinate transformer respectively on a dp-axis fundamental current command and a qp-axis fundamental current command based on the rotational coordinate system to generate a dp-axis current command and a qp-axis current command; and a control command generator that compares the dp-axis detection current and the qp-axis detection current generated by the phase current coordinate transformer respectively with the dp-axis current command and the qp-axis current command generated by the adder and applies a control command to the inverter according to the result of the comparison.

With this arrangement, the rotational coordinate system is defined based on the position angle command. The torque correction command generated according to the torque correction waveform for the suppression of the torque fluctuation is coordinate-transformed to the rotational coordinate system based on the position angle command to provide the dp-axis torque correction component and the qp-axis torque correction component, which are respectively superposed on the dp-axis fundamental current command and the qp-axis fundamental current command to provide the dp-axis current command and the qp-axis current command. On the other hand, the phase current of the stepping motor is detected by the current detector, and is coordinate-transformed into the dp-axis detection current and the qp-axis detection current in the rotational coordinate system based on the position angle command. The dp-axis detection current and the qp-axis detection current are respectively compared with the dp-axis current command and the qp-axis current command, and the control command is applied to the inverter according to the result of the comparison. As a result, the current is applied to the winding of the stepping motor so as to conform to the position angle command and suppress the torque fluctuation, whereby the stepping motor is driven. This makes it possible to achieve highly precise driving with a simple construction utilizing the rotational coordinate system while suppressing vibrations attributable to the torque fluctuation.

According to an embodiment of the present invention, the dp-axis fundamental current command indicates the amplitude of the current to be applied to the stepping motor, and the qp-axis fundamental current command indicates zero.

According to an embodiment of the present invention, the torque correction waveform contains a reluctance torque correction waveform component which suppresses reluctance torque fluctuation. With this arrangement, vibrations attributable to the reluctance torque fluctuation can be suppressed.

The applicant of the present invention found that the rotational vibrations and the stop angle error of the stepping motor are attributable to the fluctuation of the rotor angle-dependent waveform of the torque (θ-T waveform) caused with respect to the excitation phases depending on the motor current value. Particularly, the applicant found that the sum of reluctance torques which has been considered ignorable in conventional theories related to the stepping motor affects the fluctuation of the θ-T waveform. In the embodiment of the present invention, therefore, the use of the reluctance torque correction waveform component which suppresses the reluctance torque fluctuation (more precisely, the excitation phase-dependent fluctuation) makes it possible to reduce the stop angle error while suppressing the rotational vibrations. That is, the correction with the use of the reluctance torque correction waveform component makes it possible to suppress or prevent the fluctuation of the reluctance torque waveform (θ-T waveform) with respect to the excitation phases. In particular, the stepping motor in which the reluctance torque is not ignorable can be smoothly driven on an open loop basis with suppressed vibrations.

The stepping motor driver may be configured so as to drive the stepping motor by an open-loop constant current control. The open-loop control may be such that neither position feedback nor speed feedback is involved.

In an embodiment of the present invention, the reluctance torque correction waveform component has a waveform profile such that an original waveform having a frequency twice that of a fundamental sinusoidal wave of an electrical angle cycle of the stepping motor and having a phase matched with that of the fundamental sinusoidal wave is full-wave-rectified to the same sign as or a different sign from that of the fundamental sinusoidal wave. The phase matching does not necessarily mean strict phase matching. Of course, the phase matching may be the strict phase matching but, in reality, the vibration suppressing effect is often improved by intentionally introducing a slight phase shift. Therefore, the phase matching herein means that the phase shift is permitted as long as the excitation phase-dependent fluctuation of the reluctance torque can be suppressed.

In an embodiment of the present invention, the original waveform is a sinusoidal waveform.

In an embodiment of the present invention, the reluctance torque correction waveform component has a waveform profile such that the original waveform is full-wave-rectified to the same sign as that of the fundamental sinusoidal wave when the amplitude of an angle-differentiated self-inductance of the stepping motor is greater than the amplitude of an angle-differentiated mutual inductance of the stepping motor, and the reluctance torque correction waveform component has a waveform profile such that the original waveform is full-wave-rectified to the different sign from that of the fundamental sinusoidal wave when the amplitude of the angle-differentiated self-inductance is smaller than the amplitude of the angle-differentiated mutual inductance.

In an embodiment of the present invention, the reluctance torque correction waveform component has a waveform profile calculated with the use of a ratio between the amplitude of the angle-differentiated self-inductance and the amplitude of the angle-differentiated mutual inductance of the stepping motor.

In an embodiment of the present invention, the reluctance torque correction waveform component has a waveform profile which varies according to a motor current supplied to the stepping motor.

In an embodiment of the present invention, the torque correction waveform contains a magnet torque correction waveform component for compensation for the nonlinearity of a magnet torque with respect to the current.

The nonlinearity of the magnet torque with respect to the current can cause the rotational vibrations of the motor. Therefore, the correction of the control current waveform with the use of the magnet torque correction waveform component makes it possible to further suppress the rotational vibrations and the stop angle error of the motor. The current correction for the nonlinearity of the magnet torque is particularly effective for a hybrid type stepping motor.

In an embodiment of the present invention, the magnet torque correction waveform component has a waveform profile which varies according to the motor current supplied to the stepping motor.

In an embodiment of the present invention, the magnet torque correction waveform component has a waveform profile which amplifies the amplitude of a peak portion of the fundamental sinusoidal wave of the electrical angle cycle of the stepping motor when being superposed on the fundamental sinusoidal wave.

In an embodiment of the present invention, the stepping motor is of a hybrid type or of a slot magnet type.

In an embodiment of the present invention, the torque correction command generator generates the torque correction command according to a torque correction waveform indicating a current waveform in a two-phase fixed coordinate system defined by an α-axis and a β-axis orthogonal to each other. In this case, the coordinate transformation by the torque correction command coordinate transformer is coordinate transformation from the two-phase fixed coordinate system to the rotational coordinate system.

In an embodiment of the present invention, the control command generator includes: a voltage command generator that compares the dp-axis detection current and the qp-axis detection current respectively with the dp-axis current command and the qp-axis current command to generate a dp-axis voltage command and a qp-axis voltage command; and a voltage command coordinate transformer that coordinate-transforms the dp-axis voltage command and the qp-axis voltage command generated by the voltage command generator from the rotational coordinate system to a motor fixed coordinate system defined by a plurality of phases of the stepping motor based on the position angle command to generate phase voltage commands for the respective phases of the stepping motor.

The foregoing and other objects, features, and effects of the present invention will become more apparent from the following description of embodiments with reference to the attached drawings.

BRIEF DESCRIPTION OF DRAWINGS

FIG. 37 is a diagram showing the measurement of the rotational vibrations of the slot magnet type stepping motors (with current correction) by way of example.

FIG. 38 is a waveform diagram showing the actual measurement values of the motor current of the slot magnet type stepping motor.

FIGS. 40A and 40B are diagrams showing the results of the measurement of the stop angle error when the slot magnet type stepping motor was operated by micro-step driving.

DESCRIPTION OF EMBODIMENTS

Figure 1:
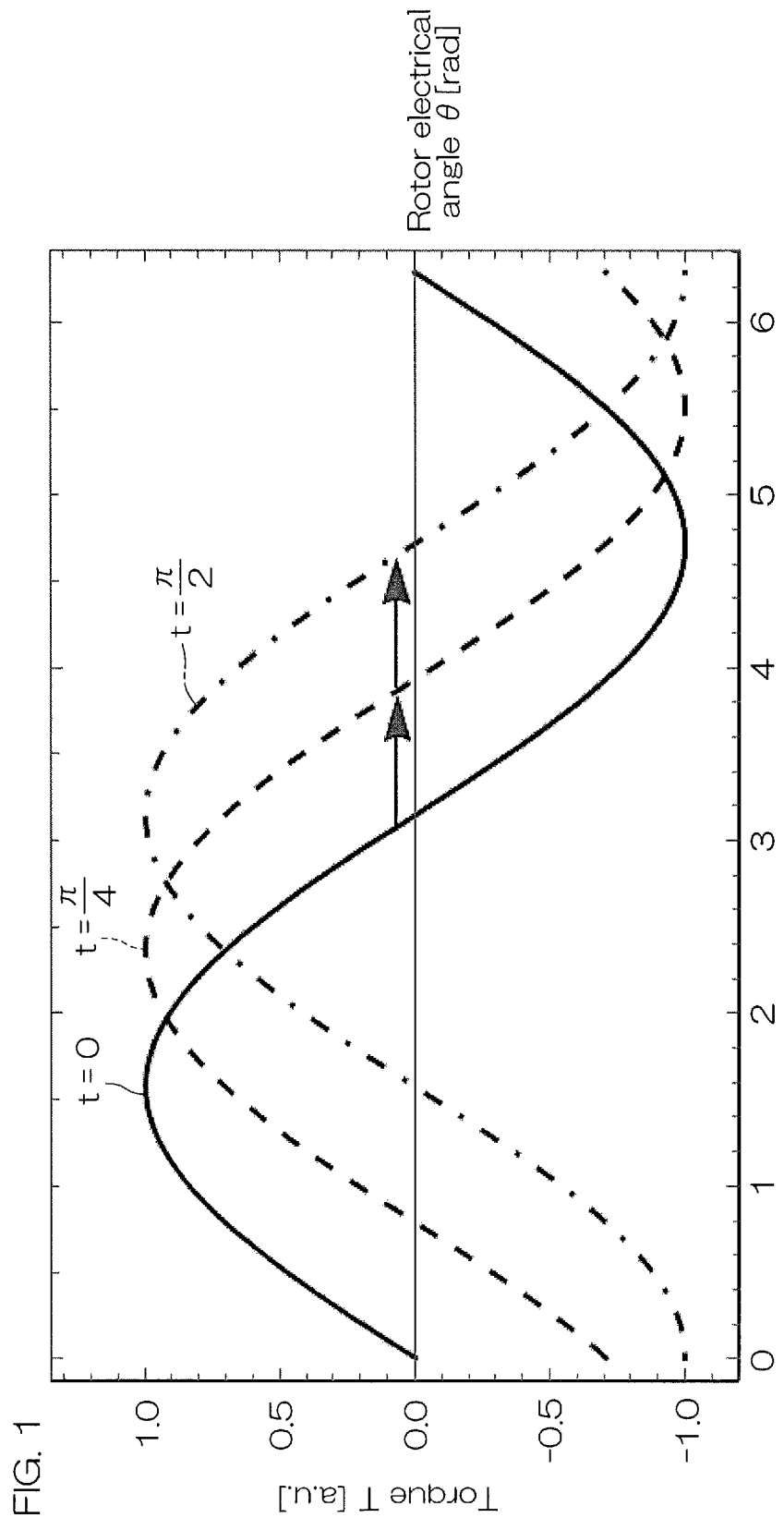
FIG. 1 is a waveform diagram showing a θ-T waveform of an ideal magnet torque.

The applicant of the present invention found that the rotor angle dependence (θ-T characteristic) of the torque fluctuates with respect to an excitation phase depending on a motor current value, and this accounts for why the rotational vibrations and/or the stop angle error are exacerbated. Particularly, the inventor found that the nonlinearity of the current value with respect to the generation torque affects the fluctuation of the θ-T waveform indicating the relationship between the rotor angle and the torque, and the reluctance torque which has been considered ignorable in the conventional theories related to the stepping motor also affects the fluctuation of the θ-T waveform. Based on these findings, the present application provides the following embodiment.

In this embodiment, specifically, a current waveform is applied such as to prevent the fluctuation of the reluctance torque waveform with respect to the excitation phase, thereby suppressing the rotational vibrations and/or the stop angle error. Where the motor of the type in which the reluctance torque is not ignorable is driven on an open loop basis, this arrangement ensures smooth driving without the vibrations.

[Consideration of Magnet Torque in Ideal Cases]

In synchronous motors in which the motor inductance is less angle-dependent, e.g., in surface magnet type motors, hybrid type stepping motors and some of embedded magnet type motors, the motor torque is dominantly generated by magnets.

The torque generated by the magnets is referred to as "magnet torque."

In the case of a two-phase motor, the magnet torque $T_M$ can be represented by the resultant of A-phase and B-phase θ-T waveforms. The A-phase θ-T waveform can be represented by a product $I_A \cdot \sin(\theta)$ of an A-phase current $I_A$ and a function $\sin(\theta)$ of a rotor position (specifically, a rotor angle θ), and the B-phase θ-T waveform can be represented by a product $I_B \cdot \cos(\theta)$ of a B-phase current $I_B$ and a function $\cos(\theta)$ of the rotor position. Therefore, the magnet torque $T_M$ is the sum of $I_A \cdot \sin(\theta)$ and $I_B \cdot \cos(\theta)$ as can be represented by the following expression (1). It is herein assumed that the torque constant is 1.

$$T_M = I_A \cdot \sin(\theta) + T_B \cdot \cos(\theta) \tag{1}$$

In the case of the stepping motor, it is known that relationships between the magnet torque and the currents are not linear. Therefore, second-order terms of the currents are introduced into the expression (1) with their coefficients each defined as p, whereby the following expression (2) is provided. The ideal magnet torque is represented by the above expression (1) with p=0.

$$T_M = I_A(1 - pI_A^2)\sin(\theta) + I_B(1 - pI_B^2)\cos(\theta) \tag{2}$$

Here, consideration is given to the ideal magnet torque, i.e., with p=0. It is herein assumed that the currents each vary in an ideal sinusoidal waveform of an angular speed ω with time, and are respectively represented by $I_A(t) = \cos(\omega t)$ and $I_B(t) = -\sin(\omega t)$ (wherein t is time). Then, the above expression (2) is converted as follows:

$$T_M(t, \theta) = \cos(\omega t)\sin(\theta) - \sin(\omega t)\cos(\theta) \tag{3}$$

$$= -\sin(\omega t - \theta)$$

In this case, θ-T waveforms are as shown in FIG. 1. Specifically, θ-T waveforms observed when ω=1 and t=0, π/4, π/2 are shown.

FIG. 1 indicates that a θ-T waveform is moved parallel as it is, and is free from torque pulsation with a certain load. Therefore, a rotational vibrating force attributable to the torque pulsation does not act, so that the motor is free from the rotational vibrations.

[Consideration of Reluctance Torque]

Even without the provision of the magnets, electromagnetic forces occur between iron cores due to magnetic fluxes generated by coils. A torque is generated by attraction with the electromagnetic forces. This is referred to as "reluctance torque." The reluctance torque is attributable to the θ-dependence of the motor inductance. With the sum of magnetic energies defined as U, with A-phase and B-phase self-inductances defined as $L_A$ and $L_B$, respectively, and with a mutual inductance defined as M, the reluctance torque $T_r$ can be represented by the following expression:

$$T_r(t, \theta) = -\frac{\partial U}{\partial \theta} \tag{4}$$

$$= -\frac{\partial}{\partial \theta}\left(\frac{1}{2}I_A(t)^2 L_A(\theta) + \frac{1}{2}I_B(t)^2 L_B(\theta) + I_A(t)I_B(t)M(\theta)\right)$$

$$= -\left(\frac{1}{2}I_A^2 \frac{dL_A}{d\theta} + \frac{1}{2}I_B^2 \frac{dL_B}{d\theta} + I_A I_B \frac{dM}{d\theta}\right)$$

A hybrid type stepping motor, for example, includes a rotor having a plurality of small teeth (rotor teeth) provided circumferentially equidistantly at a constant small tooth pitch, and a stator disposed in opposed relation to the rotor. More specifically, the rotor includes two rotor segments offset from each other by half the small tooth pitch about a rotation shaft and fixed to the rotation shaft. One of the rotor segments is magnetized to S-polarity, while the other rotor segment is magnetized to N-polarity. A plurality of small teeth (e.g., 50 small teeth) are disposed equidistantly at the constant small tooth pitch circumferentially of each of the rotor segments. The stator includes a plurality of main poles each having a plurality of small teeth (stator teeth) disposed at the same small tooth pitch as the rotor.

The two-phase stepping motor has A-phase, B-phase having a 90-degree phase shift with respect to the A-phase, /A-phase having a 180-degree phase shift with respect to the A-phase, and /B-phase having a 180-degree phase shift with respect to the B-phase. The stator has a plurality of main poles respectively having windings to which A-phase current, B-phase current, /A-phase current and /B-phase current are respectively applied, and each including stator teeth provided thereon in opposed relation to the rotor. When the stator teeth on the A-phase main pole are opposed to rotor teeth, the stator teeth on the B-phase main pole are offset from rotor teeth by a ¼ pitch (an electrical angle of 90 degrees), and the stator teeth on the /A-phase main pole are offset from rotor teeth by a 2/4 pitch (an electrical angle of 180 degrees). Further, the stator teeth on the /B-phase main pole are offset from rotor teeth by a ¾ pitch (an electrical angle of 270 degrees).

Figure 2:
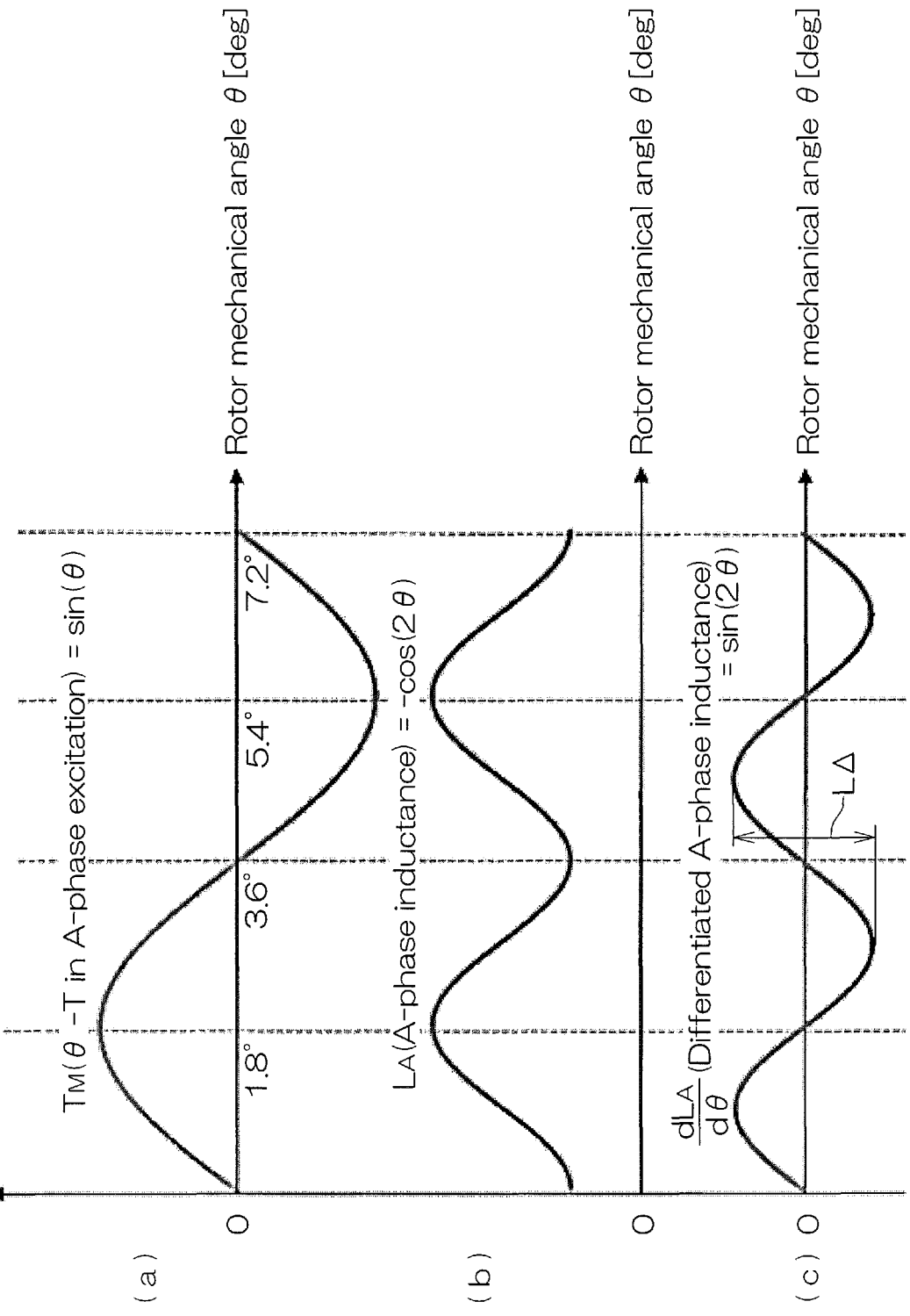
FIG. 2 is waveform diagrams showing relationships of a magnet torque, an inductance, and an angle-differentiated inductance with respect to a rotor angle.
Figure 3A:
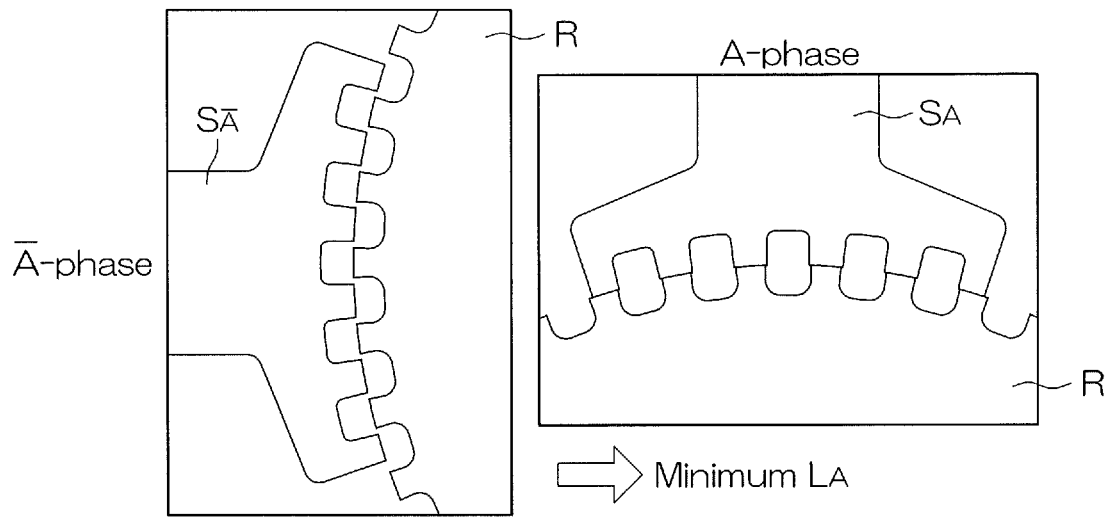
FIGS. 3A and 3B are diagrams for describing relationships between the state of a stepping motor and a self-inductance.
Figure 3B:
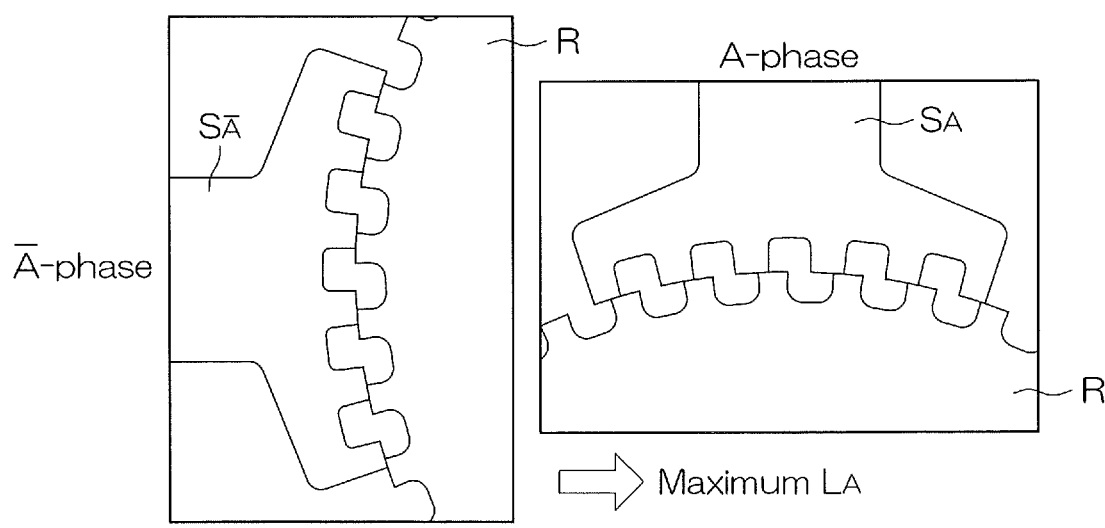

It is herein assumed that the A-phase is excited to the N-polarity and the /A-phase is excited to the S-polarity. At this time, the magnet torque $T_M$ can be represented by the sinusoidal function of the rotor angle θ as shown in FIG. 2(a). As shown in FIG. 3A, the small teeth of the A-phase stator main pole $S_A$ are opposed to the small teeth of the rotor R (more specifically, the S-polarity rotor segment) at an excitation stable point (at an electrical angle of 0 degree) and, in this state, the small teeth of the /A-phase stator main pole $S_{/A}$ are offset from the small teeth of the rotor R (more specifically, the S-polarity rotor segment) by a ½ pitch (by an electrical angle of 180 degrees). At this time, the A-phase self-inductance $L_A$ is minimum. The rotor R is rotated by an electrical angle of 90 degrees (where the number of the rotor teeth is 50, by a mechanical angle of 1.8 degrees) from this state and, when a state shown in FIG. 3B is reached, the magnet torque $T_M$ is maximized. At this time, the A-phase self-inductance $L_A$ is maximum. Therefore, it can be assumed that the phase of the A-phase self-inductance $L_A$ is as shown in FIG. 2(b). That is, the A-phase self-inductance $L_A$ fluctuates sinusoidally at a frequency twice that of the sinusoidal waveform of the magnet torque $T_M$. Then, it can be assumed that the phase of the angle-differentiated value $dL_A/d\theta$ of the A-phase self-inductance $L_A$ is as shown in FIG. 2(c). That is, it can be assumed that the angle-differentiated value $dL_A/d\theta$ of the A-phase self-inductance $L_A$ fluctuates sinusoidally at a frequency twice that of the sinusoidal waveform of the magnet torque $T_M$. By giving the same consideration to the B-phase self-inductance $L_B$ and the mutual inductance M, a relationship represented by the following expression can be derived:

$$\frac{dL_A}{d\theta} \propto \sin(2\theta),\ \frac{dL_B}{d\theta} \propto -\sin(2\theta),\ \frac{dM}{d\theta} \propto \cos(2\theta) \quad (5)$$

Where the amplitudes of the angle-differentiated values $dL_A/d\theta$, $dL_B/d\theta$ of the self-inductances $L_A$, $L_B$ are each defined as LΔ and the amplitude of the angle-differentiated value $dM/d\theta$ of the mutual inductance M is defined as MΔ, the reluctance torque $T_r(t,\theta)$ can be represented by the following expression:

$$T_r(t,\theta) = \frac{L_\Delta}{2}(I_A^2 - I_B^2)\sin(2\theta) + M_\Delta I_A I_B \cos(2\theta) \quad (6)$$

Figure 4A:
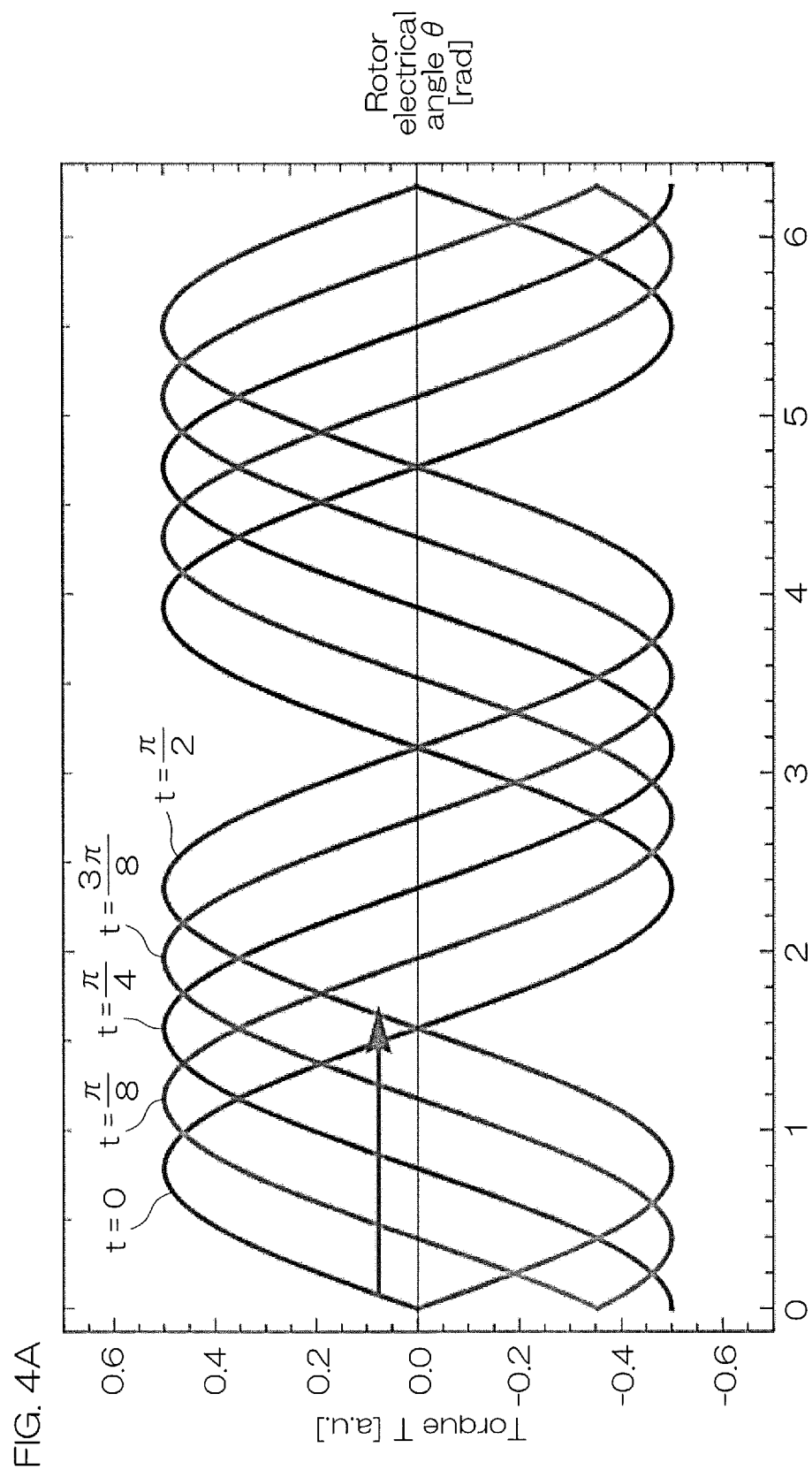
FIG. 4A is a waveform diagram showing θ-T waveforms of a reluctance torque when the amplitude of an angle-differentiated self-inductance is equal to the amplitude of an angle-differentiated mutual inductance.

When MΔ=LΔ, the reluctance torque $T_r$ for an ideal sinusoidal current waveform is as shown in FIG. 4A. In FIG. 4A, θ-T waveforms of the reluctance torque $T_r$ at t=0, π/8, π/4, 3π/8 and π/2 are shown. As shown, the θ-T waveform is moved at the same speed in the same direction as the waveform of the magnet torque $T_M$ while maintaining its waveform profile. Therefore, if the motor can be rotated with the ideal sinusoidal current waveform when MΔ=LΔ, the total torque waveform of the magnet torque $T_M$ and the reluctance torque $T_r$ is invariable with time, and the parallel movement speed of the waveform is constant (specifically, if ω is constant, the parallel movement speed is constant). Therefore, the motor is free from vibrational behavior.

Figure 4B:
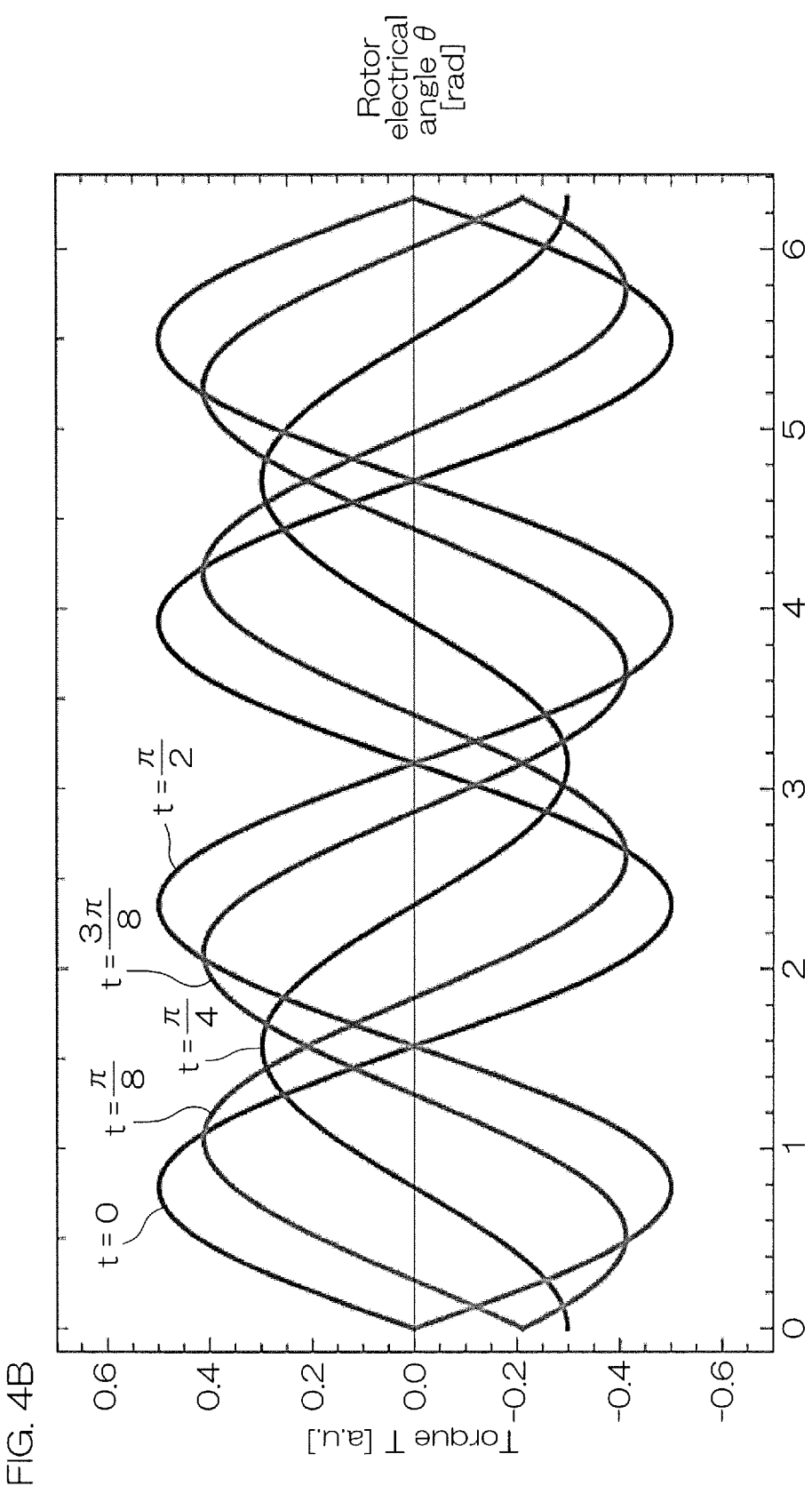
FIG. 4B is a waveform diagram showing θ-T waveforms of the reluctance torque when the amplitude of the angle-differentiated self-inductance is not equal to the amplitude of the angle-differentiated mutual inductance.

When MΔ=LΔ/2, on the other hand, the reluctance torque $T_r$ for the ideal sinusoidal current waveform is as shown in FIG. 4B. In FIG. 4B, θ-T waveforms of the reluctance torque $T_r$ at t=0, π/8, π/4, 3π/8 and π/2 are shown. As shown, the reluctance torque $T_r$ fluctuates with time. Since the total torque also correspondingly fluctuates with time, a vibrating force occurs. In addition, as shown in FIG. 4B, zero-torque points are present at nonequal intervals in the θ-T waveforms at t=0, π/8, π/4, 3π/8 and π/2 defined at an equal time interval. This implies that the vibrating force may occur even with no load, and the vibrations may correspondingly occur.

Therefore, the motor currents are determined such that the θ-T waveform of the reluctance torque $T_r$ is invariable in profile with time for given values of the amplitude parameters LΔ, MΔ. For this, the reluctance torque $T_r$ is not represented by a two-variable function $T_r(t,\theta)$ of t and θ, but is desirably represented by a single-variable function $T_r(\omega t - \theta)$ of (ωt−θ), like the magnet torque $T_M$. That is, the reluctance torque $T_r$ is desirably represented by $T_r(t,\theta)=T_r(\omega t-\theta)$. This indicates that a waveform at a given time t is such that a waveform observed at a time t=0 is moved as it is by ωt. An advection equation is known as a differential equation giving such a solution. This is employed to provide the following expression:

$$Tr(t,\theta) = Tr(\omega t - \theta) \Rightarrow \frac{\partial Tr}{\partial t} + \omega \frac{\partial Tr}{\partial \theta} = 0 \quad (7)$$

The above expression (6) is put in the left side of the expression (7), thereby providing the following expression:

$$\Rightarrow \frac{\partial Tr}{\partial t} + \omega \frac{\partial Tr}{\partial \theta} = \{\omega L_\Delta(I_A^2 - I_B^2) + M_\Delta(I_A \dot{I}_B + \dot{I}_A I_B)\}\cos(2\theta) + \quad (8)$$
$$\{L_\Delta(\dot{I}_A I_A - \dot{I}_B I_B) - 2\omega M_\Delta(I_A I_B)\}\sin(2\theta)$$

Since this is required to be zero with a given θ, the following expressions are provided:

$$\begin{cases} \omega L_\Delta(I_A^2 - I_B^2) + M_\Delta(I_A I_B + I_A I_B) = 0 & (9) \\ L_\Delta(I_A I_A - I_B I_B) - 2\omega A I_\Delta(I_A I_B) = 0 & (10) \end{cases}$$

Thereby, the following expressions are provided:

$$\omega L_\Delta(I_A^2 - I_B^2) + M_\Delta \frac{d}{dt}(I_A I_B) = 0 \tag{11}$$

$$\frac{L_\Delta}{2}\frac{d}{dt}(I_A^2 - I_B^2) - 2\omega M_\Delta(I_A I_B) = 0 \tag{12}$$

These are combined together to provide the following simultaneous equations:

$$\frac{d^2}{dt^2}(I_A I_B) = -A\omega^2 I_A I_B \tag{13}$$

$$\frac{d^2}{dt^2}(I_A^2 - I_B^2) = -A\omega^2(I_A^2 - I_B^2) \tag{14}$$

These are solved as follows, wherein $A_1$, $A_2$, $\delta_1$ and $\delta_2$ are constants.

$$I_A I_B = A_1 \cos(2\omega t + \delta_1) \tag{15}$$

$$I_A^2 - I_B^2 = A_2 \cos(2\omega t + \delta_2) \tag{16}$$

These are solved for $I_A$, thereby providing the following expression:

$$I_A^4 - I_A^2 A_2 \cos(2\omega t + \delta_2) - A_1^2 \cos^2(2\omega t + \delta_1) = \tag{17}$$

$$0 \Rightarrow I_A = \pm \frac{1}{\sqrt{2}} \sqrt{A_2^2 \cos(2\omega t + \delta_2) \pm \sqrt{A_2^2 \cos^2(2\omega t + \delta_2) + 4A_1^2 \cos^2(2\omega t + \delta_1)}}$$

Similarly, these are solved for $I_B$, thereby providing the following expression:

$$I_B^4 + I_B^2 A_2 \cos(2\omega t + \delta_2) - A_1^2 \cos^2(2\omega t + \delta_1) = \tag{18}$$

$$0 \Rightarrow I_B = \pm \frac{1}{\sqrt{2}} \sqrt{-A_2 \cos(2\omega t + \delta_2) \pm \sqrt{A_2^2 \cos^2(2\omega t + \delta_2) + 4A_1^2 \cos^2(2\omega t + \delta_1)}}$$

$I_A$ and $I_B$ in the expressions (17) and (18) are put in the expression (6) for the determination of the reluctance torque $T_r$, and undetermined coefficients are determined so as to satisfy $T_r = -\alpha \sin(2(\omega t - \theta))$. Then, the following expression is provided:

$$T_r(t,0) = \frac{L_\Delta}{2}(A_2 \cos(2\omega t + \delta_2))\sin(2\theta) + M_\Delta(A_1 \cos(2\omega t + \delta_1))\cos(2\theta) = \tag{19}$$

$$-\alpha \sin(2(\omega t - \delta)) \Rightarrow A_1 = -\frac{\alpha}{M_\Delta},$$

$$A_0 = \frac{2\alpha}{L_\Delta},$$

$$\delta_1 = -\frac{\pi}{2},$$

$$\delta_2 = 0$$

This is put in the expressions (17) and (18), whereby the A-phase current $I_A$ and the B-phase current $I_B$ are determined as follows:

$$I_A = \pm \sqrt{\frac{\alpha}{L_\Delta}} \sqrt{\cos(2\omega t) \pm \sqrt{\cos^2(2\omega t) + \left(\frac{L_\Delta}{M_\Delta}\right)^2 \sin^2(2\omega t)}} \tag{20}$$

$$I_B = \pm \sqrt{\frac{\alpha}{L_\Delta}} \sqrt{-\cos(2\omega t) \pm \sqrt{\cos^2(2\omega t) + \left(\frac{L_\Delta}{M_\Delta}\right)^2 \sin^2(2\omega t)}} \tag{21}$$

Values in the roots need to be constantly positive because $I_A$ and $I_B$ are real numbers, and net currents in each current cycle need to be zero. Therefore, solutions which satisfy these conditions are as follows:

$$I_A(t) = \begin{cases} \sqrt{\frac{\alpha}{L_\Delta}} \sqrt{\cos(2\omega t) + \sqrt{\cos^2(2\omega t) + \left(\frac{L_\Delta}{M_\Delta}\right)^2 \sin^2(2\omega t)}} & \left(0 < \omega t \le \frac{\pi}{2} \text{ or } \frac{2\pi}{2} < \omega t \le 2\pi\right) \\ -\sqrt{\frac{\alpha}{L_\Delta}} \sqrt{\cos(2\omega t) + \sqrt{\cos^2(2\omega t) + \left(\frac{L_\Delta}{M_\Delta}\right)^2 \sin^2(2\omega t)}} & \left(\frac{\pi}{2} < \omega t < \frac{2\pi}{2}\right) \end{cases} \tag{22}$$

$$I_B(t) = \begin{cases} -\sqrt{\frac{\alpha}{L_\Delta}} \sqrt{-\cos(2\omega t) + \sqrt{\cos^2(2\omega t) + \left(\frac{L_\Delta}{M_\Delta}\right)^2 \sin^2(2\omega t)}} & (0 < \omega t \le \pi) \\ \sqrt{\frac{\alpha}{L_\Delta}} \sqrt{-\cos(2\omega t) + \sqrt{\cos^2(2\omega t) + \left(\frac{L_\Delta}{M_\Delta}\right)^2 \sin^2(2\omega t)}} & (\pi < \omega t < 2\pi) \end{cases} \tag{23}$$

Figure 5A:
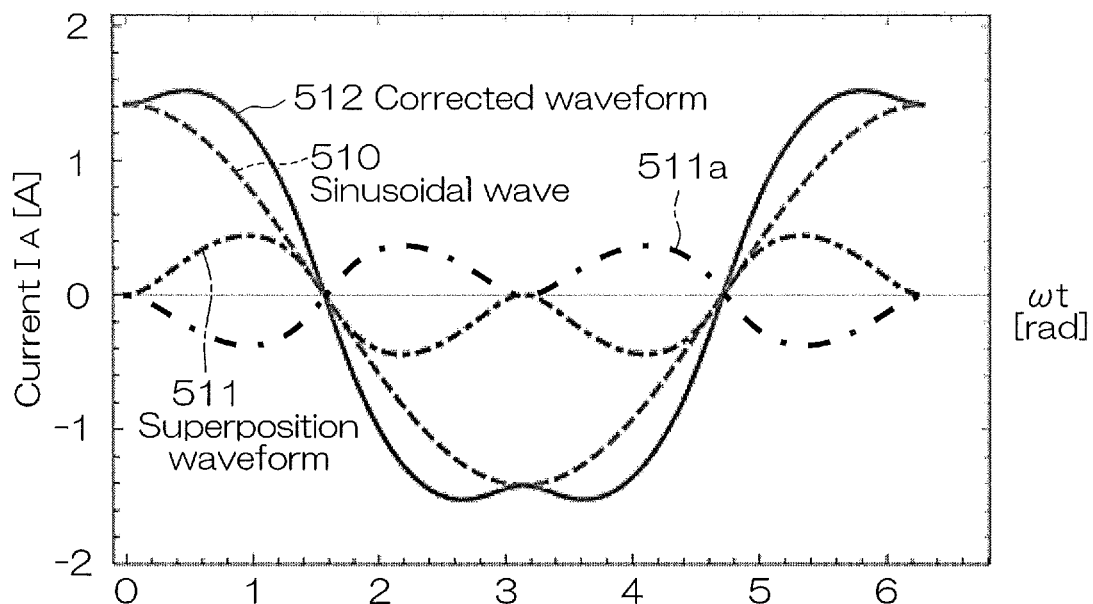
FIGS. 5A and 5B are waveform diagrams for describing current waveforms for suppressing the fluctuation of the θ-T waveform of the reluctance torque according to the excitation phase.
Figure 5B:
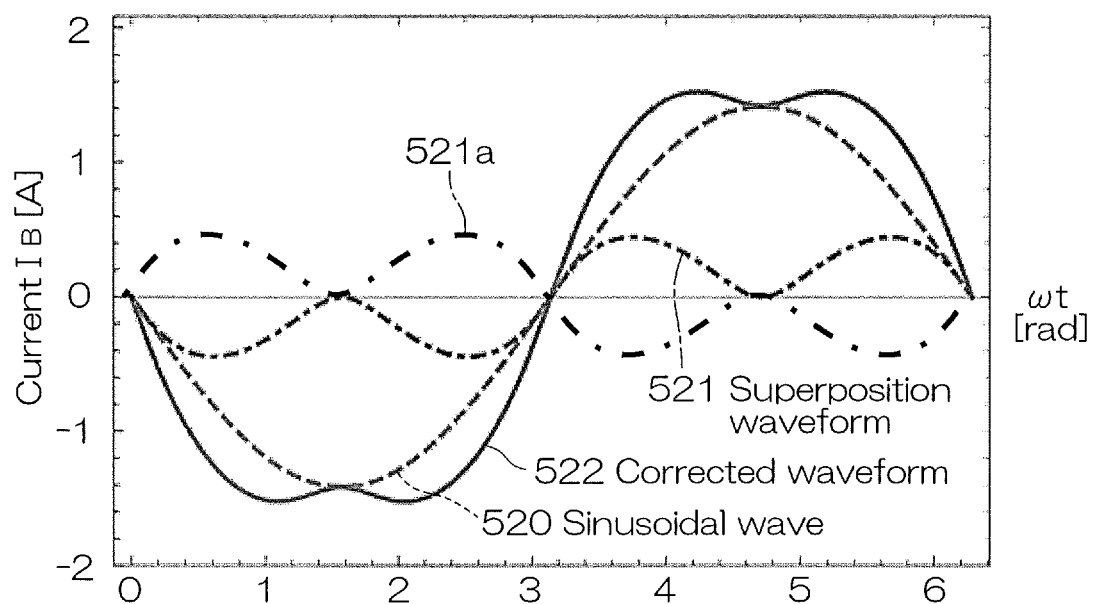

The waveforms of the A-phase current $I_A$ and the B-phase current $I_B$ when $M\Delta = L\Delta/2$ are respectively shown by a line 512 in FIG. 5A and by a line 522 in FIG. 5B. It is herein assumed that $\omega = 1$ and $L\Delta = 1$. In the above expressions (22) and (23), a is the amplitude of the reluctance torque and, therefore, is set to $\alpha = 1$. The amplitudes of the currents are each approximately $\sqrt{(2\alpha/L\Delta)}$.

The waveforms of the A-phase current $I_A(=\sqrt{(2\alpha/L\Delta)}\cdot\cos\omega t)$ and the B-phase current $I_B$ $(=-\sqrt{(2\alpha/L\Delta)}\cdot\sin\omega t)$ when $M\Delta = L\Delta$ are respectively shown by a line 510 in FIG. 5A and by a line 520 in FIG. 5B. These are sinusoidal waveforms. A difference between the sinusoidal current waveform shown by the line 510 in FIG. 5A and the waveform of the A-phase current $I_A$ (line 512) is referred to as "superposition waveform" and shown by a line 511 in FIG. 5A. By superposing the superposition waveform of the line 511 on the sinusoidal current waveform of the line 510, the waveform of the A-phase current $I_A$ shown by the line 512 is provided. Similarly, a difference between the sinusoidal current waveform shown by the line 520 in FIG. 5B and the waveform of the B-phase current $I_B$ (line 522) is referred to as "superposition waveform" and shown by a line 521 in FIG. 5B. By superposing the superposition waveform of the line 521 on the sinusoidal current waveform of the line 520, the waveform of the B-phase current $I_B$ shown by the line 522 is provided. The superposition waveforms (lines 511 and 521) are each such that a sinusoidal waveform having a frequency twice that of the sinusoidal current waveform (line 510, 520) with LΔ=MΔ is rectified to the same sign as that of the sinusoidal current waveform (line 510, 520).

Figure 6:
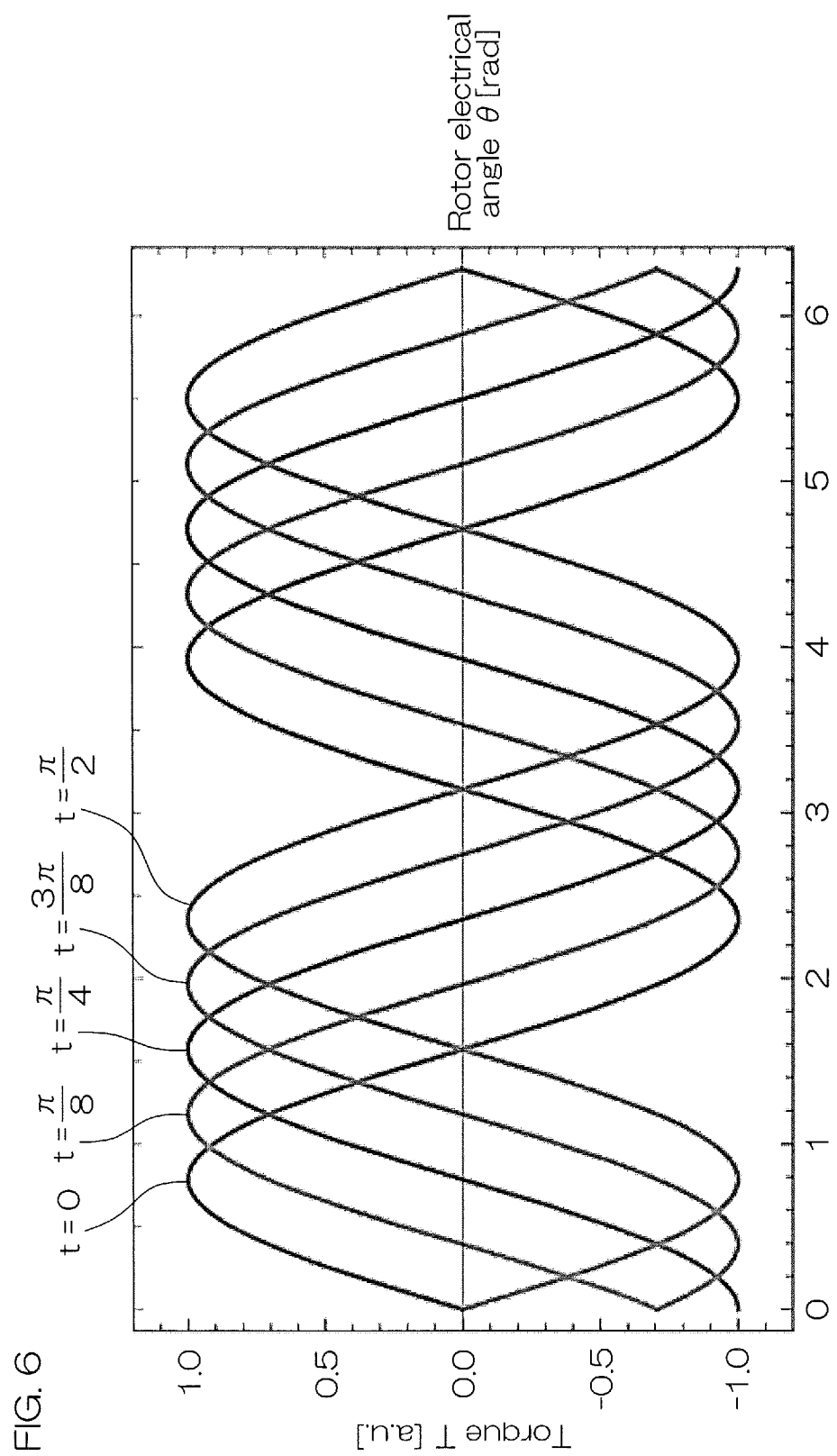
FIG. 6 is a waveform diagram for describing that the fluctuation of the θ-T waveform of the reluctance torque can be eliminated by current correction.

FIG. 6 shows θ-T waveforms of the reluctance torque $T_r$ when MΔ=LΔ/2. In FIG. 6, θ-T waveforms of the reluctance torque $T_r$ at t=0, π/8, π/4, 3π/8 and π/2 are shown. The waveform of the reluctance torque $T_r$ is invariable in profile with time unlike that shown in FIG. 4B for the motor driving with the sinusoidal currents.

When the motor is excited, the amplitudes LΔ, MΔ of the angle-differentiated inductances are dependent on the motor currents. Therefore, the fluctuation of the motor current-dependent amplitudes LΔ, MΔ is preferably taken into consideration for the calculation of the respective phase currents to be supplied to the motor. In an actual application, however, the root calculating operations in the expressions (22) and (23) are complicated, so that fundamental superposition waveforms with the amplitudes LΔ, MΔ set as constants may be tabulated. Then, the superposition waveforms (lines 511 and 521 in FIGS. 5A and 5B) to be respectively superposed on the fundamental sinusoidal waves of the motor electrical angle cycle (lines 510 and 520 in FIGS. 5A and 5B) may be prepared by adjusting the amplitudes of the fundamental superposition waveforms according to the motor currents. Even in this case, the vibrations of the stepping motor can be sufficiently suppressed. When LΔ<MΔ, this can be achieved by inverting the signs of the superposition waveforms (see lines 511a and 521a in FIGS. 5A, 5B).

The superposition waveforms are not necessarily required to have the exact waveform profiles derived from the expressions (22) and (23). As shown by the lines 511 and 521 in FIGS. 5A and 5B, the superposition waveforms each have a waveform profile such that a harmonic waveform having a frequency twice that of the fundamental sinusoidal wave of the motor electrical angle cycle (line 510, 520) as the original waveform is full-wave-rectified to the same sign as the fundamental sinusoidal wave. The original waveform is considered to have a sinusoidal waveform profile before being full-wave-rectified into the superposition waveform, but is not sinusoidal in the strict sense. Exactly saying, therefore, the superposition waveforms may each have a waveform profile such that a harmonic-like waveform of the fundamental sinusoidal wave (original waveform) is full-wave-rectified to the same sign as the fundamental sinusoidal wave. Of course, the superposition waveforms may, each have a waveform profile such that the strict harmonic waveform having a frequency twice that of the fundamental sinusoidal wave is full-wave-rectified to the same sign as the fundamental sinusoidal wave. Even in this case, a certain vibration suppressing effect can be expected.

When LΔ<MΔ, the superposition waveform (see the line 511a, 521a in FIG. 5A, 5B) has a sign inverted from that of the superposition waveform of the line 511, 521 in FIG. 5A, 5B. In this case, therefore, the superposition waveform has a waveform profile such that the harmonic waveform (more strictly, the harmonic-like waveform) having a frequency twice that of the fundamental sinusoidal wave is full-wave-rectified to a different sign from that of the fundamental sinusoidal wave.

Description will be given to why the superposition waveform is inverted when the amplitude relationship between LΔ and MΔ is inverted.

With LΔ/MΔ=β in the above expression (22) indicating the A-phase current $I_A$, the second term in the double root is subjected to first-order Maclaurin expansion. Then, the double root in the expression (22) is represented as follows:

$$\sqrt{\cos(2\omega t) + \sqrt{\cos^2(2\omega t) + \beta^2 \cos^2(2\omega t)}} \cong \qquad (22a)$$

$$\sqrt{\cos(2\omega t) + 1} + \frac{\sin^2(2\omega t)}{2\sqrt{\cos(2\omega t) + 1}} \cdot (\beta - 1) =$$

$$\sqrt{2}\left\{\cos(\omega t) + \frac{\sin^2(2\omega t)}{4\cos(\omega t)} \cdot (\beta - 1)\right\}$$

Figure 5C:
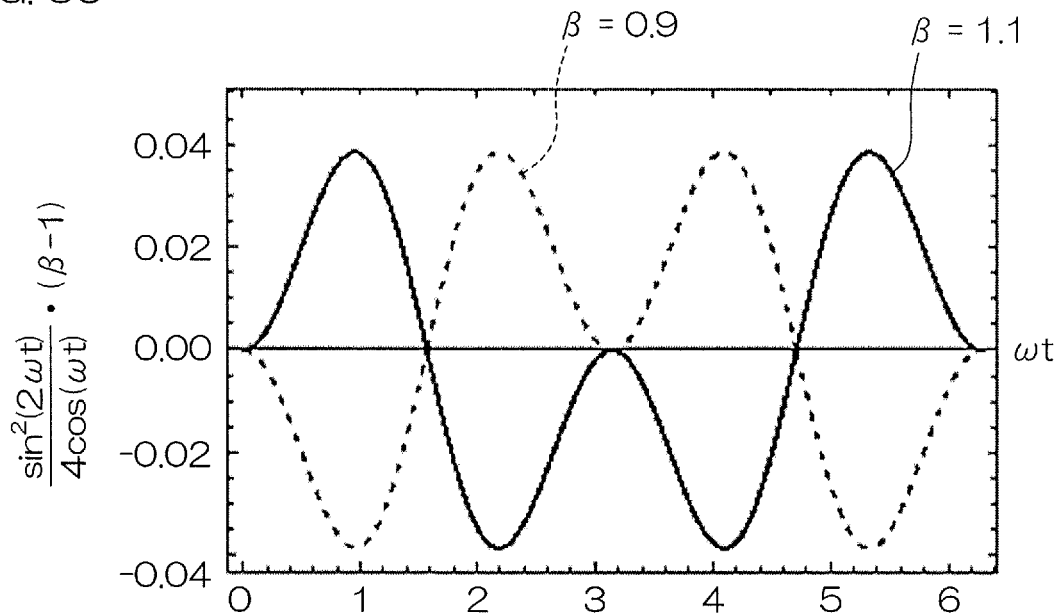
FIGS. 5C and 5D are waveform diagrams for describing the inversion of superposition waveforms depending on an amplitude relationship between the angle-differentiated self-inductance and the angle-differentiated mutual inductance.

The first term is a solution obtained when β=1, and provides a sinusoidal waveform having a frequency ωt. The second term is a correction term for a deviation from β=1. Second terms obtained when β=1.1 (MΔ<LΔ) and when β=0.9 (LΔ<MΔ) are shown by a solid line and a broken line, respectively, in FIG. 5C. The waveform shown by the solid line in FIG. 5C for β=1.1 (MΔ<LΔ) corresponds to the superposition waveform shown by the line 511 in FIG. 5A. The waveform shown by the broken line in FIG. 5C for β=0.9 (LΔ<MΔ) is a waveform inverted from the waveform (solid line) for β=1.1 (MΔ<LΔ). This waveform corresponds to the superposition waveform shown by the line 511a in FIG. 5A (the inversion of the waveform of the line 511).

Similarly, consideration is given to the B-phase current. With LΔ/MΔ=β in the above expression (23) indicating the B-phase current $I_B$, the second term in the double root is subjected to first-order Maclaurin expansion. Then, the double root in the expression (23) is represented as follows:

$$-\sqrt{-\cos(2\omega t) + \sqrt{\cos^2(2\omega t) + \beta^2 \cos^2(2\omega t)}} \cong \qquad (23a)$$

$$\sqrt{2}\left\{-\sin(\omega t) + \frac{\sin^2(2\omega t)}{4\sin(\omega t)} \cdot (\beta - 1)\right\}$$

(ωt≠nπ+π/2, n is an integer)

Figure 5D:
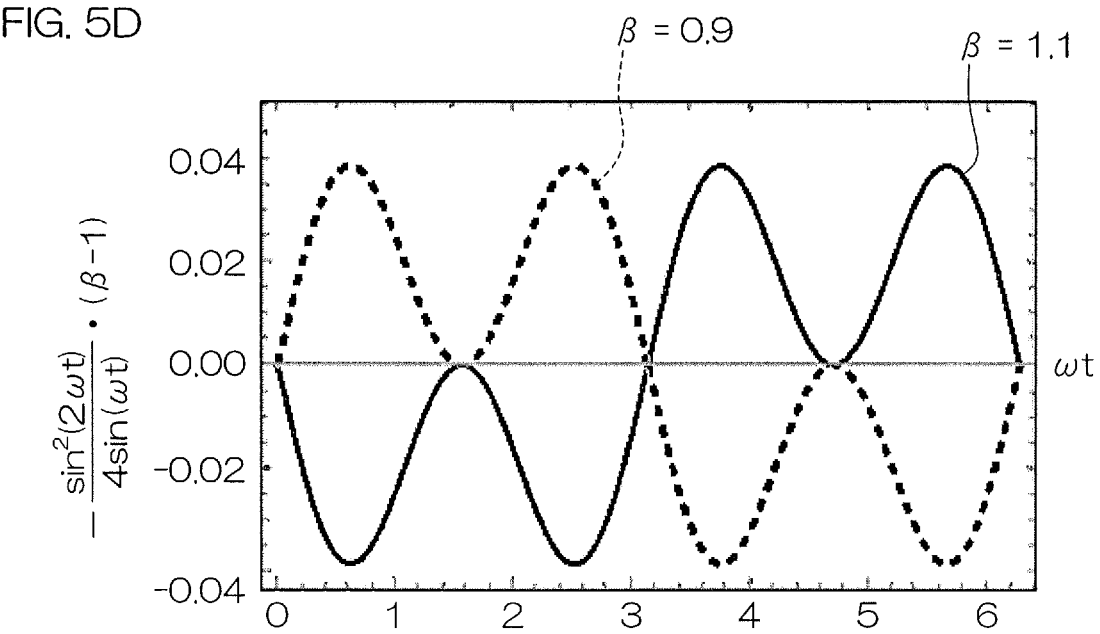

Second terms obtained when β=1.1 (MΔ<LΔ) and when β=0.9 (LΔ<MΔ) are shown by a solid line and a broken line, respectively, in FIG. 5D. The waveform shown by the solid line in FIG. 5D for β=1.1 (MΔ<LΔ) corresponds to the superposition waveform shown by the line 521 in FIG. 5B. The waveform shown by the broken line in FIG. 5D for β=0.9 (LΔ<MΔ) is a waveform inverted from the waveform (solid line) for β=1.1 (MΔ<LΔ). This waveform corresponds to the superposition waveform shown by the line 521a in FIG. 5B (the inversion of the waveform of the line 521).

This indicates that the inversion of the amplitude relationship between LΔ and MΔ can be coped with by inverting the superposition waveforms.

[Magnet Torque in Consideration of Nonlinearity]

Figure 7:
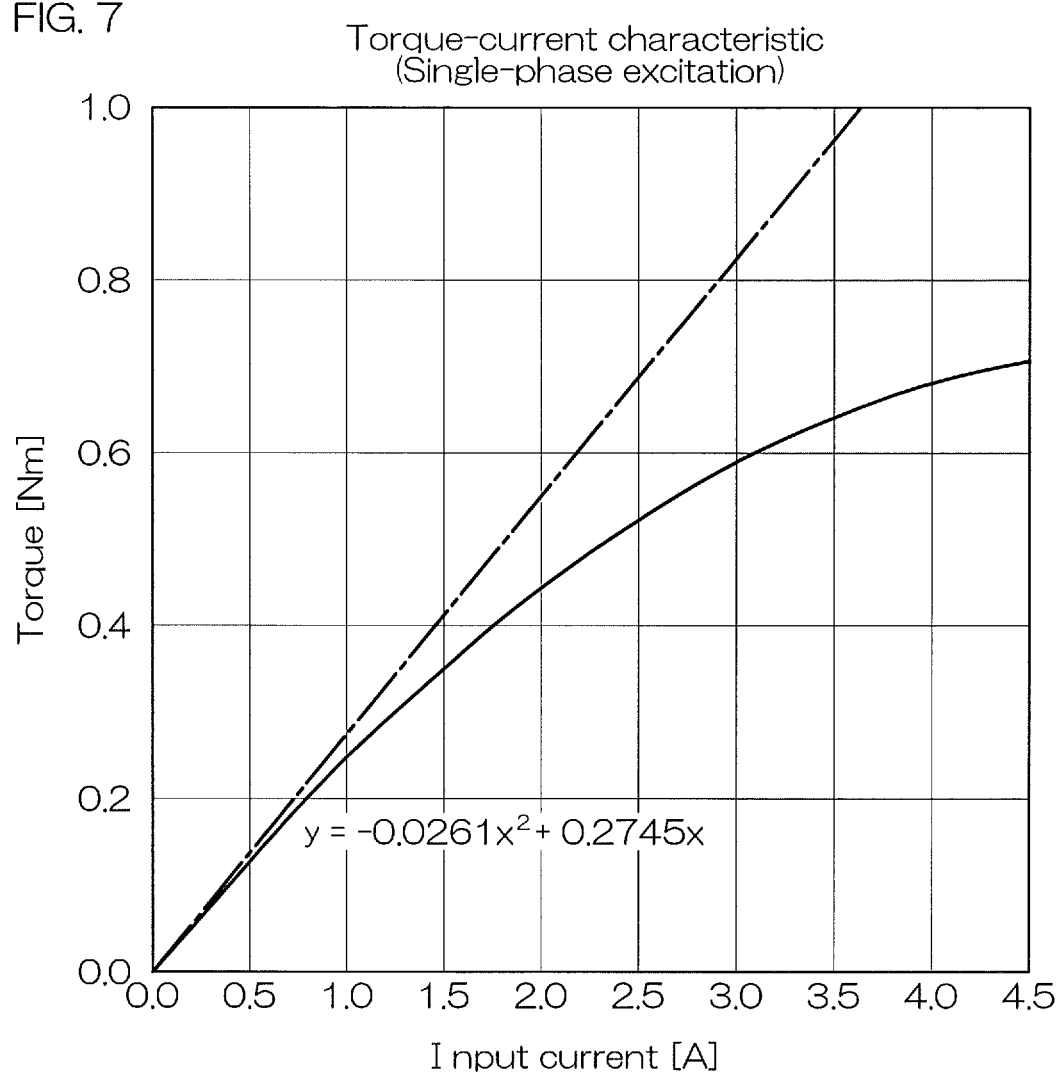
FIG. 7 is a characteristic diagram showing a torque-current characteristic of a hybrid type stepping motor.

Consideration will be given to current correction to be performed when the magnet torque is nonlinear with respect to the current. It is known that there often occurs a phenomenon that the torque is nonlinear with respect to the current in the stepping motor. FIG. 7 shows an example of the torque-current characteristic of the two-phase hybrid type stepping motor. The characteristic of the torque with respect to the input current has a nonlinear torque profile. A quadratic polynomial equation is fitted to this torque profile, wherein a first-order coefficient is defined as a torque constant $k_t$ and a second-order coefficient is defined as $p \cdot k_t$. With the torque constant applied to the expression (2), the magnet torque which is nonlinear with respect to the current is represented as followed:

$$T_M = k_t(I_A(1-pI_A^2)\sin(\theta) + I_B(1-pI_B^2)\cos(\theta)) \qquad (24)$$

This equation is solved in the same manner as the equation for the reluctance torque. Then, the following expressions are provided:

$$\begin{cases} \frac{d^2}{dt^2}(I_A(1-pI_A^2)) = \omega^2 I_A(1-I_A^2) \\ \frac{d^2}{dt^2}(I_B(1-pI_B^2)) = \omega^2 I_B(1-I_B^2) \end{cases} \quad (25)$$

$$\begin{cases} I_A(1-pI_A^2) = \alpha\cos(\omega t + \delta_1) \\ I_B(1-pI_B^2) = \alpha\cos(\omega t + \delta_2) \end{cases} \quad (26)$$

According to Cardano's formula, one of the solutions to $x^3 - px - q = 0$ is as follows:

$$\omega^2 \left\{ \frac{1}{2}\left(q + \sqrt{\frac{-D}{27}}\right) \right\}^{\frac{1}{2}} + \frac{\omega p}{3}\left\{ \frac{1}{2}\left(q + \sqrt{\frac{-D}{27}}\right) \right\}^{\frac{1}{2}}$$

wherein $D = 4p^3 - 27q^2$, $\omega = \frac{-1 + \sqrt{3}\,i}{2}$, $p \neq 0$

Based on comparison with the cubic equation (22) to be solved, the coefficients are defined as follows. Then, the solutions are provided as represented by the following expressions (27) and (28), wherein $\delta = \delta_1$ or $\delta_2$.

$$p \to \frac{1}{p}, q \to -\frac{\alpha\cos(\omega t + \delta)}{p}$$

$$I_A\text{comp} = \quad (27)$$

$$-\frac{1-i\sqrt{3}}{2^{2/3}\left(-27\alpha p^2\cos(\omega t) + \sqrt{-108p^3 + 729\alpha^2 p^4\cos^2(\omega t)}\right)^{1/3}} +$$

$$\frac{(1-i\sqrt{3})\left(-27\alpha p^2\cos(\omega t) + \sqrt{-108p^3 + 729\alpha^2 p^4\cos^2(\omega t)}\right)^{1/3}}{6 \times 2^{1/3} p}$$

$$I_B\text{comp} = \quad (28)$$

$$-\frac{1-i\sqrt{3}}{2^{2/3}\left(-27\alpha p^2\sin(\omega t) + \sqrt{-108p^3 + 729\alpha^2 p^4\sin^2(\omega t)}\right)^{1/3}} +$$

$$\frac{(1-i\sqrt{3})\left(-27\alpha p^2\sin(\omega t) + \sqrt{-108p^3 + 729\alpha^2 p^4\sin^2(\omega t)}\right)^{1/3}}{6 \times 2^{1/3} p}$$

In analogy to the current phases for the ideal magnet torque described above, $\delta_1$ and $\delta_2$ are set to $\delta_1=0$ and $\delta_2=\pi/2$ so that the waveform of the magnet torque can be sinusoidal.

$I_A$comp and $I_B$comp of the expressions (27) and (28) are respectively assigned to $I_A$ and $I_B$ in the expression (24). Then, the following expression is provided.

$$T_M = \alpha k_t(\cos(\omega t)\sin(\theta) - \sin(\omega t)\cos(\theta)) = -\alpha k_t \sin(\omega t - \theta) \quad (29)$$

wherein $\alpha$ is the amplitude of the input current. When the discriminant D is D<0, i.e., when the following relationship is satisfied, the solution has imaginary parts.

$$D < 0 \Rightarrow p > \frac{4}{27} \frac{1}{\alpha^2 \cos^2(\omega t + \delta)} \quad (30)$$

The final solutions related to the currents are represented by the following expressions, which each provide a continuous profile with the real part Re and the imaginary part Im added together.

$$I_A = \text{Re}(I_A\text{comp}) + Im(I_A\text{comp}) \quad (31)$$

$$I_B = \text{Re}(I_B\text{comp}) + Im(I_B\text{comp}) \quad (32)$$

Consideration will be given to the current correction to be performed, for example, in the case of FIG. 7. The torque constant is $k_t$=0.2745 (N·m/A), and the second-order coefficient of the torque is p=0.095 (N·m/A$^2$). When D=0, the excitation current $\alpha$ is represented by the following expression. At this time, the current waveform is as shown by a line 802 in FIG. 8. From a phenomenological viewpoint, it can be understood that the excitation current waveform is close to a triangular waveform when a current value at a current peak portion is increased for compensation for the torque reduction in the single-phase excitation.

$$\alpha = \sqrt{\frac{4}{27} \times \frac{1}{0.005}} = 1.248[A] \quad (33)$$

Figure 8:
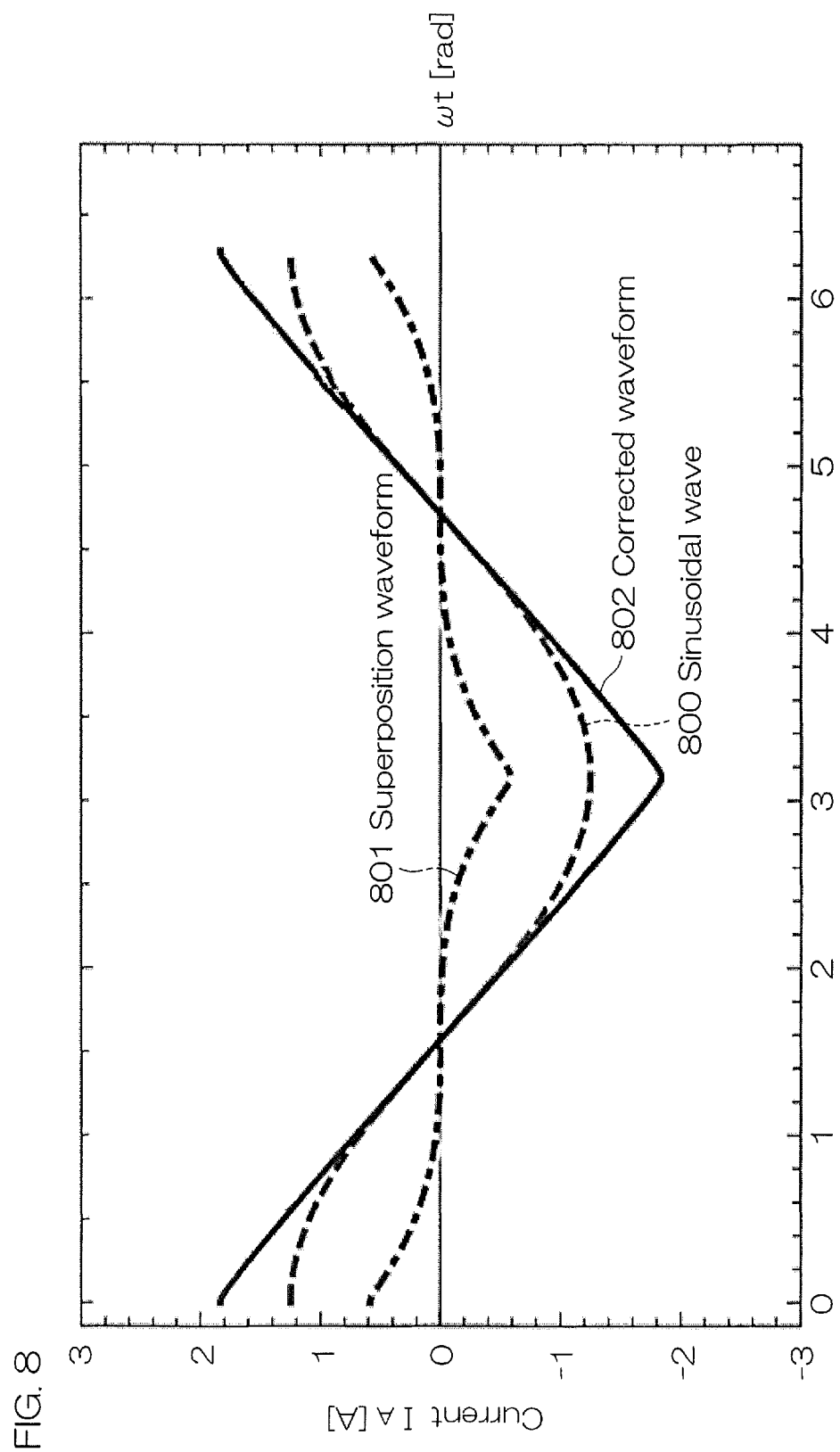
FIG. 8 is a waveform diagram for describing one example of the current correction for compensation for the nonlinearity of the magnet torque with respect to the current.

In FIG. 8, a line 800 indicates a sinusoidal current waveform ($\alpha$·sin $\omega$t) before the correction, wherein $\omega$=1. A superposition waveform corresponding to a difference between the line 802 and the line 800 is shown by a line 801. The superposition waveform of the line 801 is superposed on the sinusoidal current waveform of the line 800, whereby a corrected current waveform of the line 802 is provided.

Figure 9:
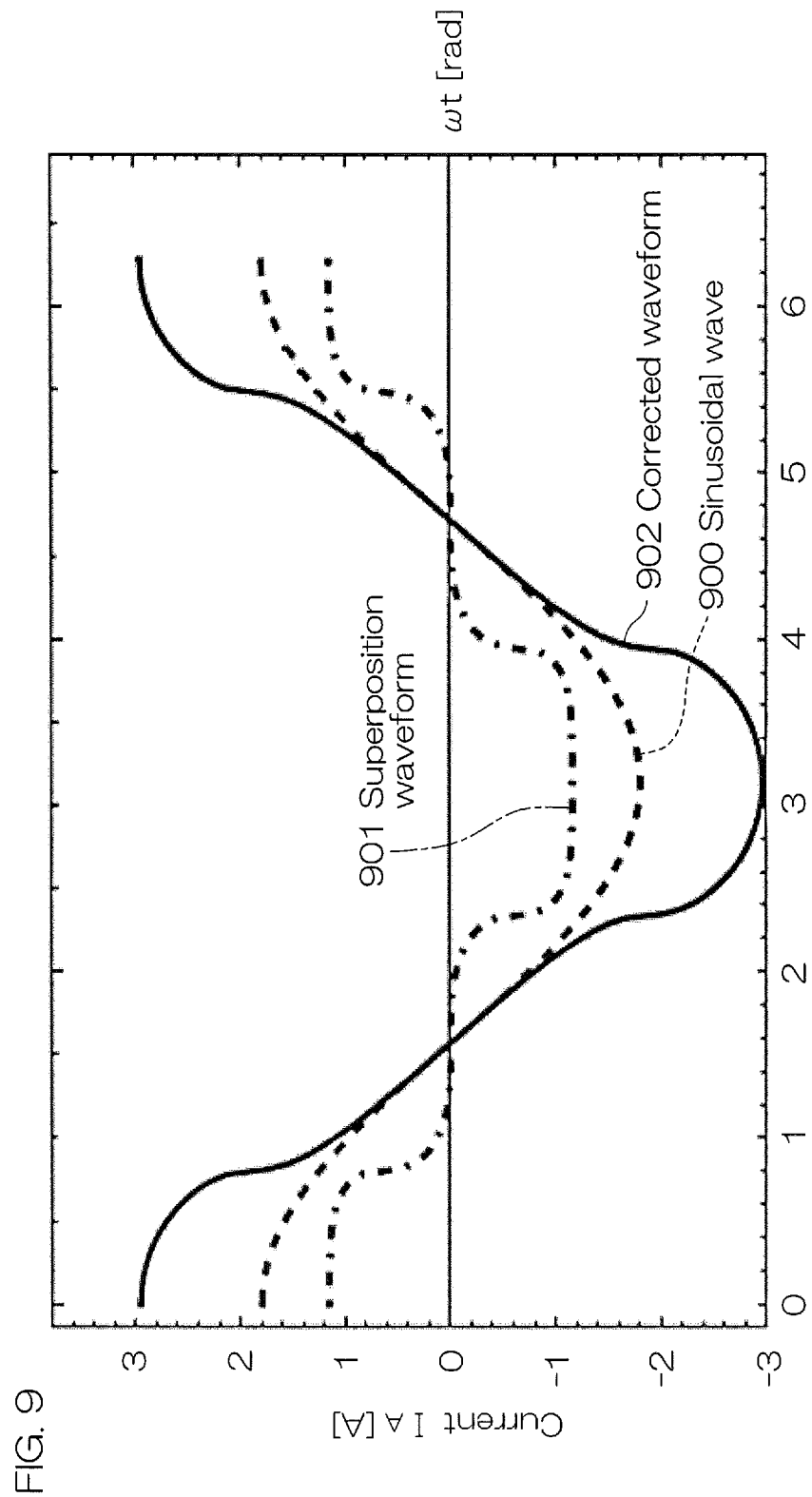
FIG. 9 is a waveform diagram for describing, another example of the current correction for compensation for the nonlinearity of the magnet torque with respect to the current.

A corrected current waveform obtained when D>0, e.g., when the excitation current $\alpha$ is $\alpha$=1.8 (A), is shown by a line 902 in FIG. 9. A sinusoidal current waveform ($\alpha$·sin $\omega$t) before the correction is shown by a line 900 in FIG. 9. A superposition waveform corresponding to a difference between the line 902 and the line 900 is shown by a line 901. The superposition waveform of the line 901 is superposed on the sinusoidal current waveform of the line 900, whereby a corrected current waveform of the line 902 is provided. This indicates that, where the excitation current is increased, the current value at a peak portion need to be further increased.

The superposition waveforms (lines 801 and 901) for the compensation for the nonlinearity of the magnet torque each have a waveform profile that amplifies the amplitude of the peak portion of the sinusoidal current waveform (line 800, 900).

Description will be given to a case in which the correction described above is applied to the two-phase hybrid type stepping motor as a specific example. The vibrations of the hybrid type stepping motor can be reduced to a lower level by the current correction for correcting the reluctance torque. Where the current correction for correcting the nonlinearity term of the magnet torque is additionally employed, a further reduced vibration level can be achieved.

Figure 10:
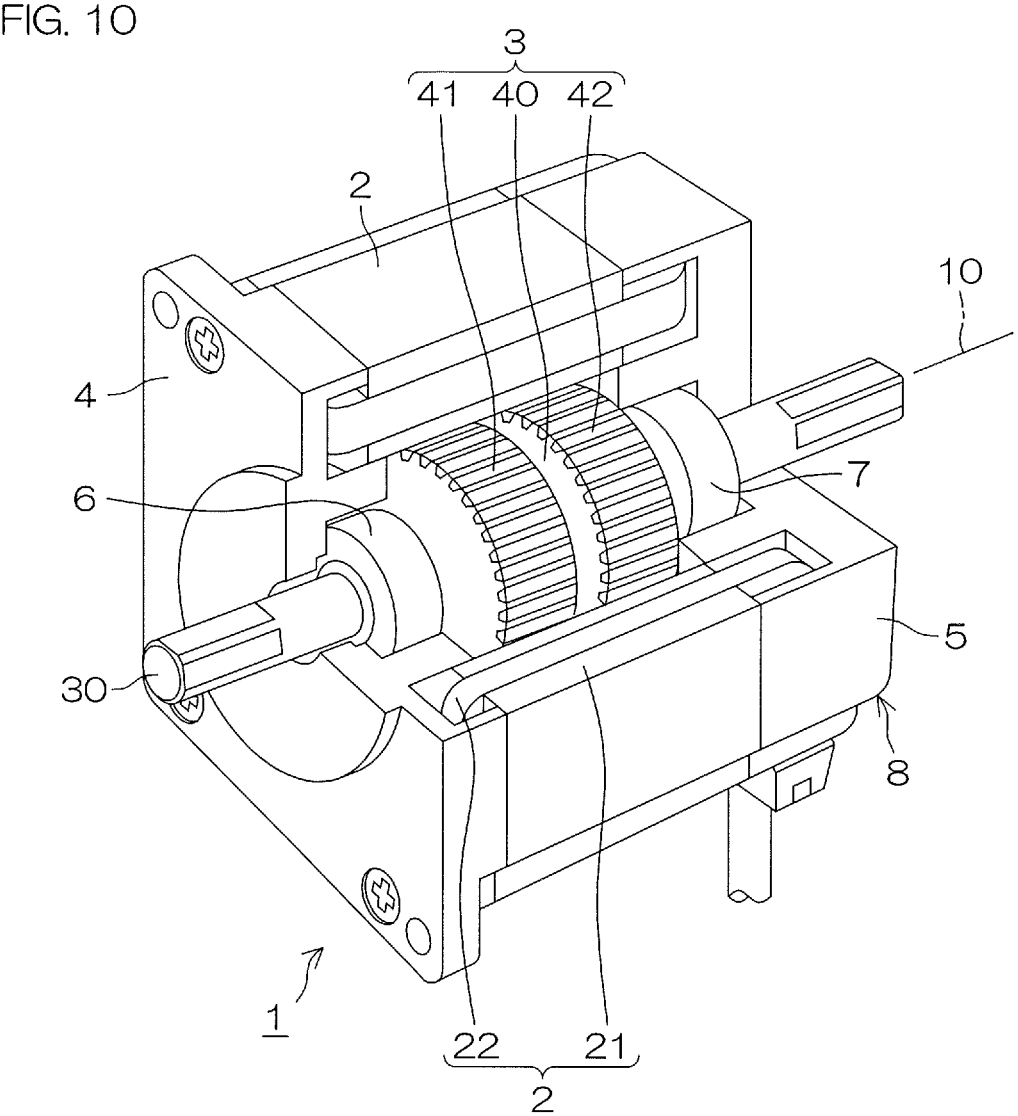
FIG. 10 is a perspective view for describing the structure of a two-phase hybrid type stepping motor by way of example.

FIG. 10 is a perspective view for describing the structure of the two-phase hybrid stepping motor by way of example. The stepping motor 1 includes a stator 2, a rotor 3, a motor flange 4, a bracket 5, and a pair of bearings 6, 7.

The stator 2 includes a stator iron core 21 and windings 22. The motor flange 4 and the bracket 5 are fixed to opposite ends of the stator iron core 21, and these constitute a motor case 8.

The rotor 3 is disposed within the motor case 8 rotatably about a rotation axis 10. The rotor 3 includes a rotation shaft 30 extending along the rotation axis 10, and rotor iron cores supported by the rotation shaft 30. The rotation shaft 30 is supported rotatably by the pair of bearings 6, 7. One of the bearings (bearing 6) is attached to the motor flange 4, and the other bearing 7 is attached to the bracket 5.

Figure 11:
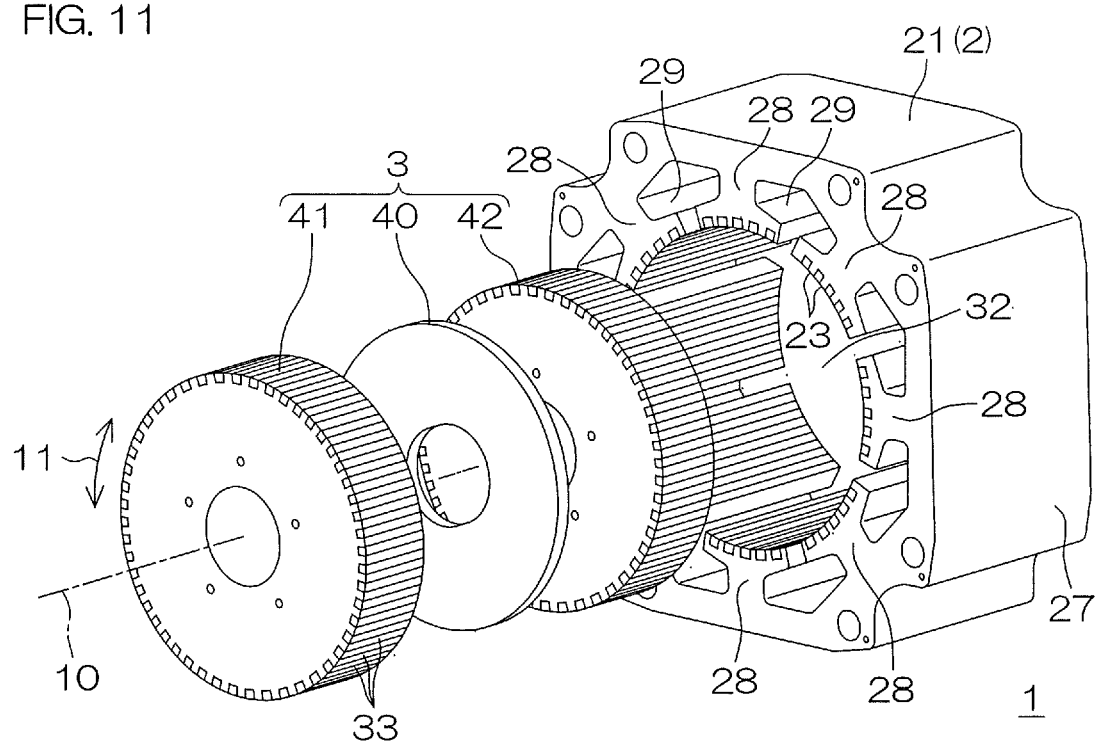
FIG. 11 is an exploded perspective view for describing the structures of a stator and a rotor of the hybrid type stepping motor.

FIG. 11 is an exploded perspective view for describing the structures of the stator 2 and the rotor 3. The rotor 3 includes the rotation shaft 30 extending along the rotation axis 10 (see FIG. 10), a disk-shaped permanent magnet 40 supported by the rotation shaft 30, and a pair of rotor segments (iron cores) 41, 42 disposed on opposite sides of the permanent magnet 40. The permanent magnet 40 is magnetized along the rotation axis 10. The permanent magnet 40 is held between the pair of rotor segments 41, 42.

A multiplicity of pole teeth (small teeth, rotor teeth) 33 (e.g., 50 pole teeth) are provided equidistantly at a predetermined rotor tooth pitch in a circumferential direction 11 about the rotation axis 10 on the peripheral surface of each of the rotor segments 41, 42. The rotor teeth 33 are linear projections extending parallel to the rotation axis 10. The rotor teeth 33 may be each slightly inclined with respect to the rotation axis 10.

The pair of rotor segments 41, 42 have substantially the same structure. The rotor segments 41, 42 are offset from each other by half the rotor tooth pitch, and fixed to the rotation shaft 30. Therefore, the rotor teeth 33 of the rotor segment 42 are located between respective adjacent pairs of the rotor teeth 33 of the rotor segment 41 as seen along the rotation axis 10.

Figure 12:
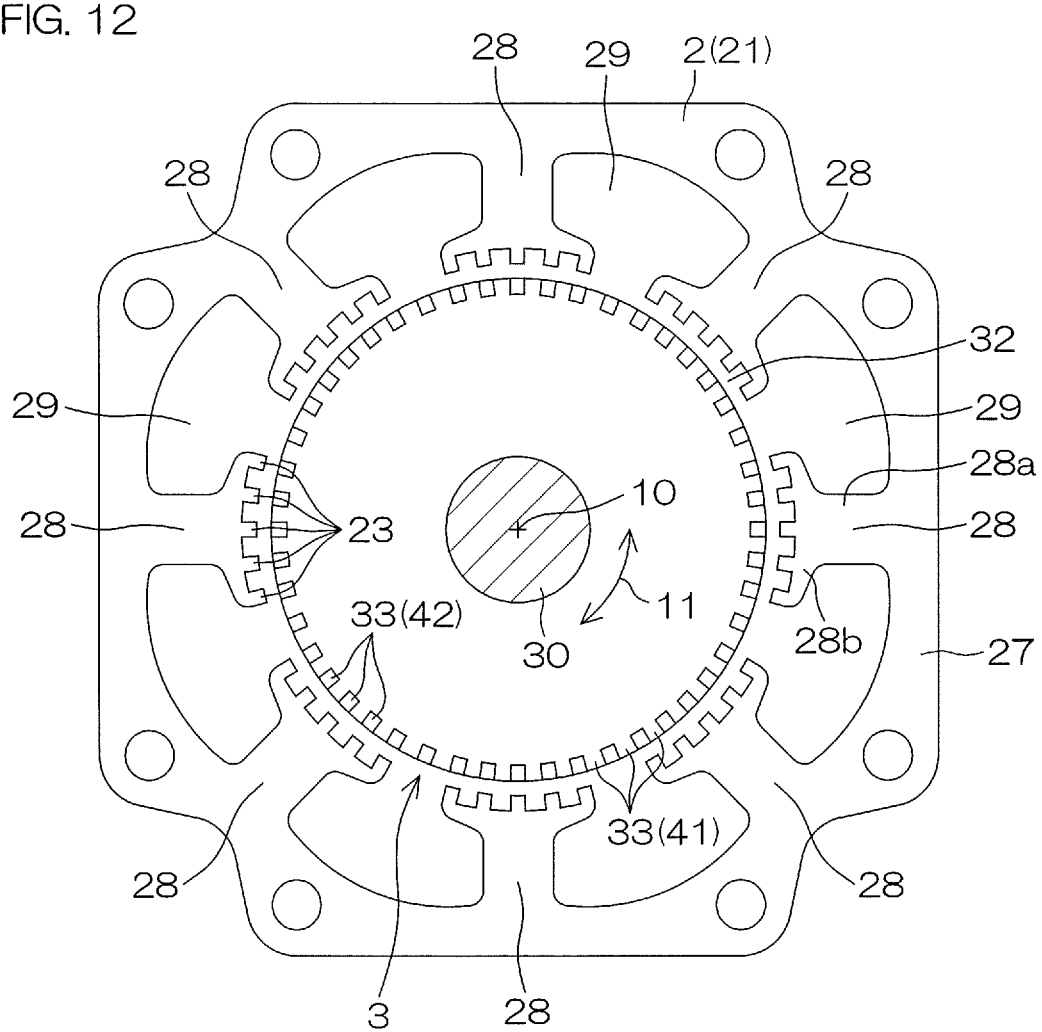
FIG. 12 is a diagram showing the structure of the stator as seen along a rotation axis.

FIG. 12 shows the structure of the stator 2 (the stator iron core 21) as seen along the rotation axis 10. The stator 2 has a generally quadrilateral frame shape as seen along the rotation axis 10. The stator 2 has a rotor accommodation space 32 defined in a center portion thereof, and the rotor 3 is disposed in the rotor accommodation space 32. The rotor accommodation space 32 has a hollow cylindrical shape defined about the rotation axis 10. The stator 2 has a frame-shaped back yoke 27, and a plurality of main poles 28 (magnetic poles) (in this embodiment, eight main poles) each projecting from the back yoke 27 toward the rotation axis 10. The main poles 28 are spaced from each other in the circumferential direction 11 around the rotation axis 10. The main poles 28 are linear projections extending parallel to the rotation axis 10.

The main poles 28 each have a support portion 28a having a proximal end connected to the back yoke 27, and an opposed portion 28b connected to a distal end of the support portion 28a. The opposed portion 28b faces the rotor accommodation space 32 and, therefore, is opposed to the rotor 3. The opposed portion 28b extends in circumferentially opposite directions from the support portion 28a. Thus, winding slots 29 are provided between respective circumferentially-adjacent pairs of the main poles 28. The windings 22 (see FIG. 10) are disposed in these winding slots 29. More specifically, the windings 22 are respectively wound around the main poles 28, and are accommodated in the winding slots 29 between respective adjacent pairs of the main poles 28. The opposed portion 28b has an opposition surface which is opposed to the rotor 3. The opposition surface is formed with a plurality of stator teeth 23 (small teeth) which project toward the rotation axis 10. The stator teeth 23 are linear projections extending along the rotation axis 10. The stator teeth 23 are provided equidistantly at a predetermined stator tooth pitch in the circumferential direction 11. Where the rotor teeth 33 are inclined with respect to the rotation axis 10, the stator teeth 23 are correspondingly inclined with respect to the rotation axis 10.

Figure 13:
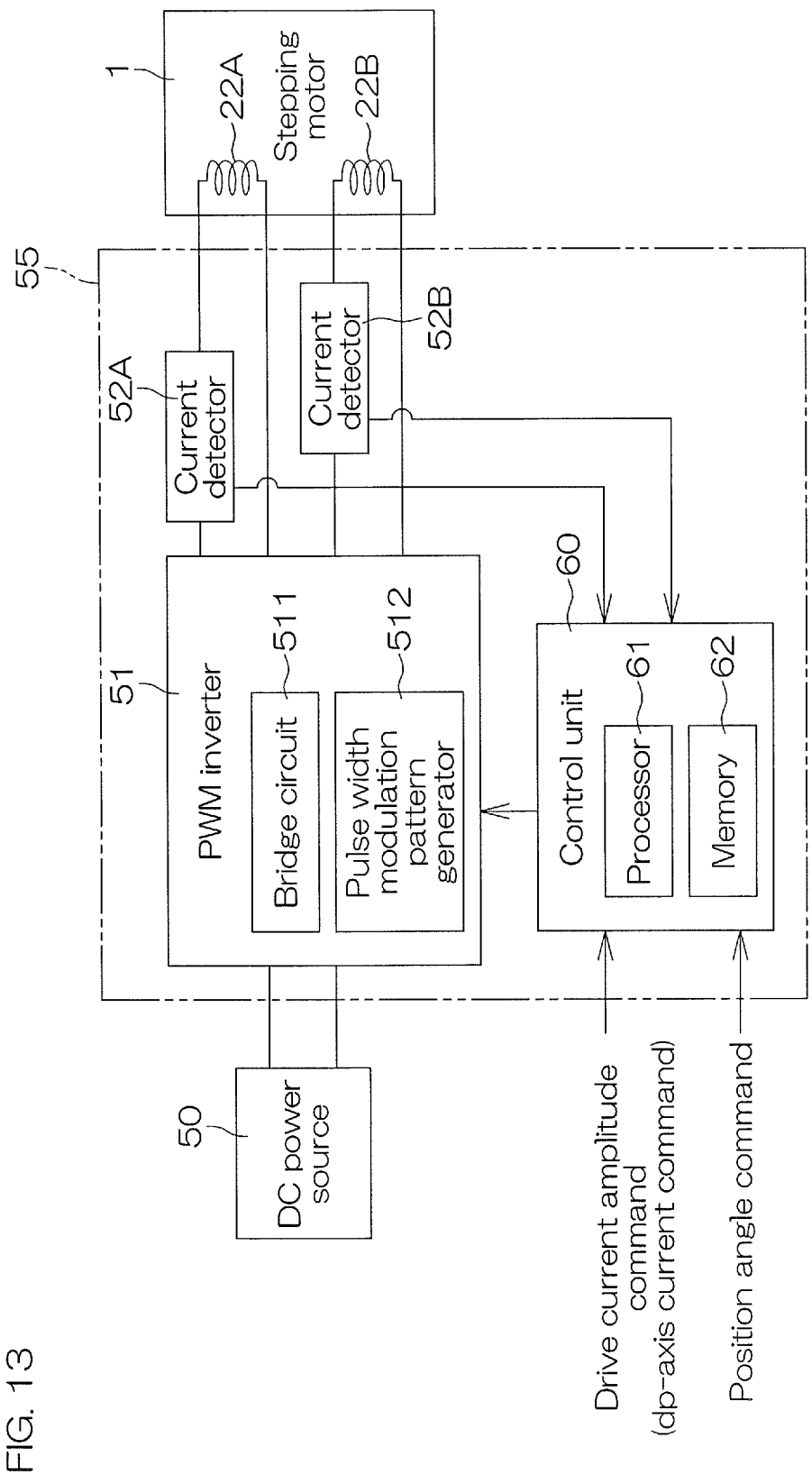
FIG. 13 is a block diagram for describing an exemplary electrical configuration for the control and the driving of the stepping motor.

FIG. 13 is a block diagram for describing the electrical configuration for the control and the driving of the stepping motor by way of example. Electric power is supplied from a DC power source 50 to the stepping motor 1 via a driving circuit section 55. The driving circuit section 55 is an example of the stepping motor driver, and includes a PWM inverter 51, current detectors 52A, 52B, and a control unit 60. The PWM inverter 51 supplies the electric power from the DC power source 50 to an A-phase winding 22A and a B-phase winding 22B of the stepping motor 1. The PWM inverter 51 is controlled by the control unit 60. The PWM inverter 51 includes a plural-phase bridge circuit 511 for the plural phase windings 22A, 22B of the stepping motor 1, and a pulse width modulation pattern generator 512 that generates PWM (pulse width modulation) control signals which turn on and off switching elements (power devices) of the bridge circuit 511. The control unit 60 applies an A-phase voltage command and a B-phase voltage command to the PWM inverter 51. The pulse width modulation pattern generator 512 generates the PWM control signals according to the voltage commands. The current detectors 52A, 52B respectively detect the phase currents (motor currents) flowing through the A-phase winding 22A and the B-phase winding 22B of the stepping motor 1.

The control unit 60 monitors the detection signals of the current detectors 52A, 52B, and performs a constant current control operation on the stepping motor 1. More specifically, the control unit 60 drives the stepping motor 1 by an open-loop constant current control without the position feedback and the speed feedback. The control unit 60 typically includes a processor 61 (CPU) and a memory 62, and is configured so that the processor 61 executes a program stored in the memory 62 to perform a plurality of functions. The memory 62 may include one or more storage media. The memory 62 preferably includes storage media which is rewritable and is capable of retaining data even during the off of the power source. The processor 61 performs data transaction with the memory 62, performs computation, and generates the voltage commands for controlling the PWM inverter 51. The processor 61 controls the PWM inverter 51 according to a drive current amplitude command and a position angle command which are applied from the outside or internally generated, thereby achieving the driving (more specifically, the micro-step driving) of the stepping motor 1 according to the drive current amplitude command and the position angle command.

The control unit 60 achieves the micro-step driving through vector control by applying sinusoidal currents $i_\alpha$, $i_\beta$ differing in phase by an electrical angle of 90 degrees to the A-phase winding 22A and the B-phase winding 22B, respectively.

Figure 14:
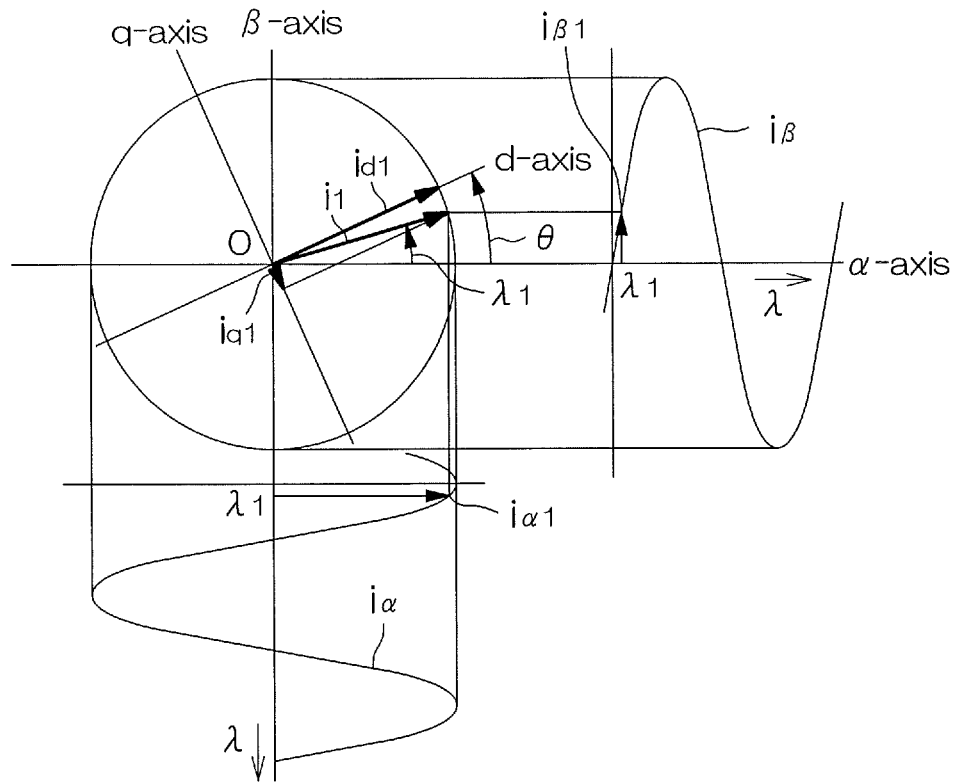
FIG. 14 is a diagram for describing a relationship between a two-phase α-β fixed coordinate system and a d-q rotational coordinate system based on a rotor rotation angle.

FIG. 14 shows a relationship between a d-q rotational coordinate system and an α-β coordinate system (two-phase fixed coordinate system) defined by an α-axis and a β-axis orthogonal to each other. The d-q rotational coordinate system is defined by a d-axis extending in the rotor magnetic flux direction of the stepping motor 1 and a q-axis orthogonal to the d-axis, and is rotated according to the rotation angle θ (electrical angle) of the rotor. The currents $i_\alpha$, $i_\beta$ differing in phase by an electrical angle of 90 degrees and sinusoidally changing according to the electrical angle λ are applied to the A-phase winding 22A and the B-phase winding 22B, respectively. When $i_\alpha = i_{\alpha 1}$ and $i_\beta = i_{\beta 1}$, a resultant current vector $i_1$ rotated from the α-axis by an angle $\lambda_1$ is provided. Then, the resultant current vector $i_1$ is mapped on the d-axis and the q-axis, whereby a d-axis current component $i_{d1}$ and a q-axis current component $i_{q1}$ are provided according to the rotor rotation angle θ. Thus, the motor torque is generated, which is proportional to the q-axis current component $i_{q1}$.

Further, the control unit 60 controls the stepping motor 1 through vector control utilizing a rotational coordinate system which is rotated according to the position angle command. This rotational coordinate system is defined by a dp-axis and a qp-axis which are coordinate axes orthogonal to each other and rotated according to the position angle command. The rotational coordinate system is hereinafter referred to as "dp-qp rotational coordinate system."

Figure 15:
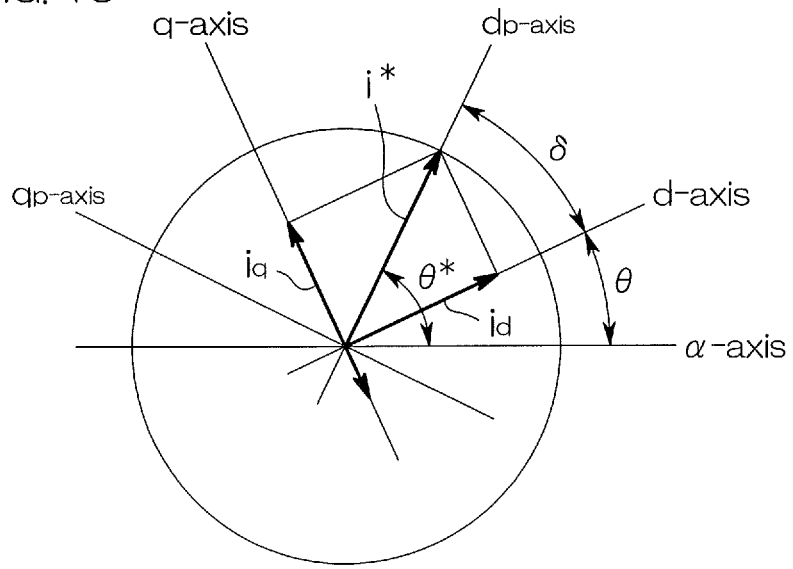
FIG. 15 is a diagram for describing a relationship between the d-q rotational coordinate system and a dp-qp rotational coordinate system which is a command coordinate system based on a position command angle.

FIG. 15 shows a relationship between the dp-qp rotational coordinate system (command coordinate system) and the d-q rotational coordinate system (rotor coordinate system). The dp-axis and the qp-axis of the dp-qp rotational coordinate system respectively correspond to the d-axis and the q-axis of the d-q rotational coordinate system. An angle difference δ occurs between the dp-qp rotational coordinate system and the d-q rotational coordinate system according to a difference between the rotor rotation angle θ and the position angle command θ*. For example, the control unit 60 generates the position angle command θ* so that a dp-axis current command $i_{dp}$* equals to a current amplitude value and a qp-axis current command $i_{qp}$* equals to zero. Thus, the dp-axis forms an angle θ* with respect to the 06-axis, and a command current vector i* having a dp-axis component alone is generated. Then, the command current vector i* is mapped on the d-axis and the q-axis, whereby a d-axis current component $i_d$ and a q-axis current component $i_q$ are provided. Thus, the motor torque is generated, which is proportional to the q-axis current component $i_q$.

On the other hand, the phase currents $i_\alpha$, $i_\beta$ of the A-phase winding 22A and the B-phase winding 22B are detected, and coordinate-transformed to the dp-qp rotational coordinate system to provide a dp-axis current component $i_{dp}$ and a qp-axis current component $i_{qp}$. Then, a current feedback control is performed so that the dp-axis current component $i_{dp}$ matches with the dp-axis current command $i_{dp}$* (which is equal to the current amplitude value) and the qp-axis current component $i_{qp}$ matches with the qp-axis current command $i_{qp}$* (which is equal, to zero), whereby the rotor stops at a position having a deviation angle balanced with a motor load for the position angle command θ*.

Therefore, the rotor can be rotated stepwise by a step angle Δθ by changing the position angle command θ* by the step angle Δθ. The step angle Δθ can be smaller than a fundamental step angle which is determined by the structure of the stepping motor 1. Thus, the micro-step driving can be achieved.

Figure 16:
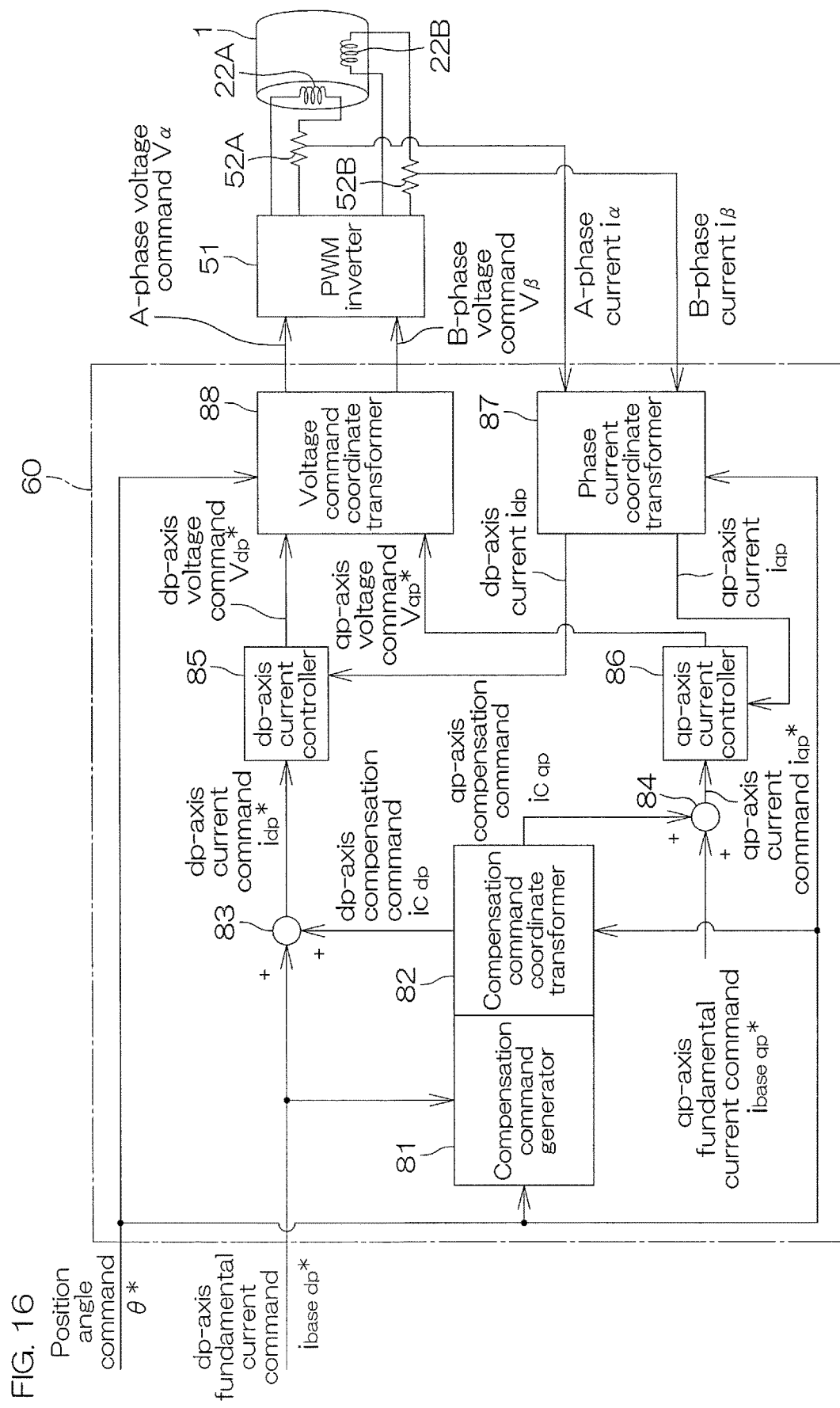
FIG. 16 shows an exemplary control block for the control of the stepping motor.

FIG. 16 is a block diagram for describing the functional configuration of the control unit 60 related to the driving of the stepping motor 1. The functions of the respective parts of the control unit 60 shown in FIG. 16 may be performed on a software basis by the processor 61 which executes the program stored in the memory 62. Some or all of the functions may be performed on a hardware basis by electric/electronic circuits.

The control unit 60 drives the stepping motor 1 according to the position angle command θ* and the drive current amplitude command. The drive current amplitude command is used as a dp-axis fundamental current command $i_{basedp}$*. A qp-axis fundamental current command $i_{baseqp}$* may be applied from the outside of the control unit 60 but, in this embodiment, a constant qp-axis fundamental current command $i_{baseqp}$* (which is typically equal to zero) is used, so that there is no external input.

The control unit 60 includes a compensation command generator 81, a compensation command coordinate transformer 82, a first adder 83, a second adder 84, a dp-axis current controller 85, a qp-axis current controller 86, a phase current coordinate transformer 87, and a voltage command coordinate transformer 88. The dp-axis current controller 85, the qp-axis current controller 86 and the voltage command coordinate transformer 88 constitute the control command generator which applies a control command to the PWM inverter 51.

The compensation command generator 81 is an example of the torque correction command generator. The compensation command generator 81 generates a compensation command (torque correction command) in the α-β coordinate system. The compensation command coordinate transformer 82 is an example of the torque correction command coordinate transformer. The compensation command coordinate transformer. 82 coordinate-transforms the compensation command generated by the compensation command generator 81 to the dp-qp rotational coordinate system to generate a dp-axis compensation command $i_{Cdp}$ and a qp-axis compensation command $i_{Cqp}$, which are examples of the dp-axis torque correction component and the qp-axis torque correction component, respectively. The coordinate transformation is performed based on the position angle command θ*. The first adder 83 superposes the dp-axis compensation command $i_{Cdp}$ on the dp-axis fundamental current command $i_{basedp}$* to thereby generate a dp-axis current command $i_{dp}$* corrected for compensation for the torque fluctuation. The dp-axis current command $i_{dp}$* is applied to the dp-axis current controller 85. The second adder 84 superposes the qp-axis compensation command $i_{Cqp}$ on the qp-axis fundamental current command $i_{baseqp}$* to thereby generate a qp-axis current command $i_{qp}$* corrected for compensation for the torque fluctuation. The qp-axis current command $i_{qp}$* is applied to the qp-axis current controller 86.

The A-phase current is and the B-phase current $i_\beta$ respectively detected by the A-phase current detector 52A and the B-phase current detector 52B are inputted to the phase current coordinate transformer 87. The phase current coordinate transformer 87 transforms the A-phase current ios and the B-phase current $i_\beta$ to the dp-qp rotational coordinate system to generate the dp-axis current $i_{dp}$ (dp-axis detection current) and the qp-axis current $i_{qp}$ (qp-axis detection current). The coordinate transformation is performed based on the position angle command θ*. The dp-axis current $i_{dp}$ is applied to the dp-axis current controller 85. The qp-axis current $i_{qp}$ is applied to the qp-axis current controller 86. The coordinate transformation is represented by the following expression (34):

$$\begin{bmatrix} i_{dp} \\ i_{qp} \end{bmatrix} = \begin{bmatrix} \cos\theta^* & \sin\theta^* \\ -\sin\theta^* & \cos\theta^* \end{bmatrix} \begin{bmatrix} i_\alpha \\ i_\beta \end{bmatrix} \qquad (34)$$

The dp-axis current controller 85 is a voltage command generator which compares the dp-axis current $i_{dp}$ with the dp-axis current command $i_{dp}$* and generates a dp-axis voltage command $V_{dp}$* according to the result of the comparison. More specifically, a deviation of the dp-axis current $i_{dp}$ from the dp-axis current command $i_{dp}$* is determined. The dp-axis voltage command $V_{dp}$* is determined by computation such as amplification of the deviation.

Similarly, the qp-axis current controller 86 is a voltage command generator which compares the qp-axis current $i_{qp}$ with the qp-axis current command $i_{qp}$* and generates a qp-axis voltage command $V_{qp}$* according to the result of the comparison. More specifically, a deviation of the qp-axis current $i_{qp}$ from the qp-axis current command $i_{qp}$* is determined. The qp-axis voltage command $V_{qp}$* is determined by computation such as amplification of the deviation.

The voltage command coordinate transformer 88 coordinate-transforms the dp-axis voltage command $V_{dp}$* and the qp-axis voltage command $V_{qp}$* respectively generated by the dp-axis current controller 85 and the qp-axis current controller 86 to the α-β coordinate system to generate an A-phase voltage command $V_\alpha$ and a B-phase voltage command $V_\beta$. The coordinate transformation is performed based on the position angle command θ*. The A-phase voltage command $V_\alpha$ and the B-phase voltage command $V_\beta$ are applied to the PWM inverter 51. In this case, the coordinate transformation is represented by the following expression (35):

$$\begin{bmatrix} V_\alpha \\ V_\beta \end{bmatrix} = \begin{bmatrix} \cos\theta^* & -\sin\theta^* \\ \sin\theta^* & \cos\theta^* \end{bmatrix} \begin{bmatrix} V_{dp}^* \\ V_{qp}^* \end{bmatrix} \quad (35)$$

The pulse width modulation pattern generator 512 provided in the PWM inverter 51 generates the PWM control signals (current control signal) according to the A-phase voltage command $V_\alpha$ and the B-phase voltage command $V_\beta$. The switching elements provided in the bridge circuit 511 of the PWM inverter 51 are controlled by the PWM control signals.

Figure 17:
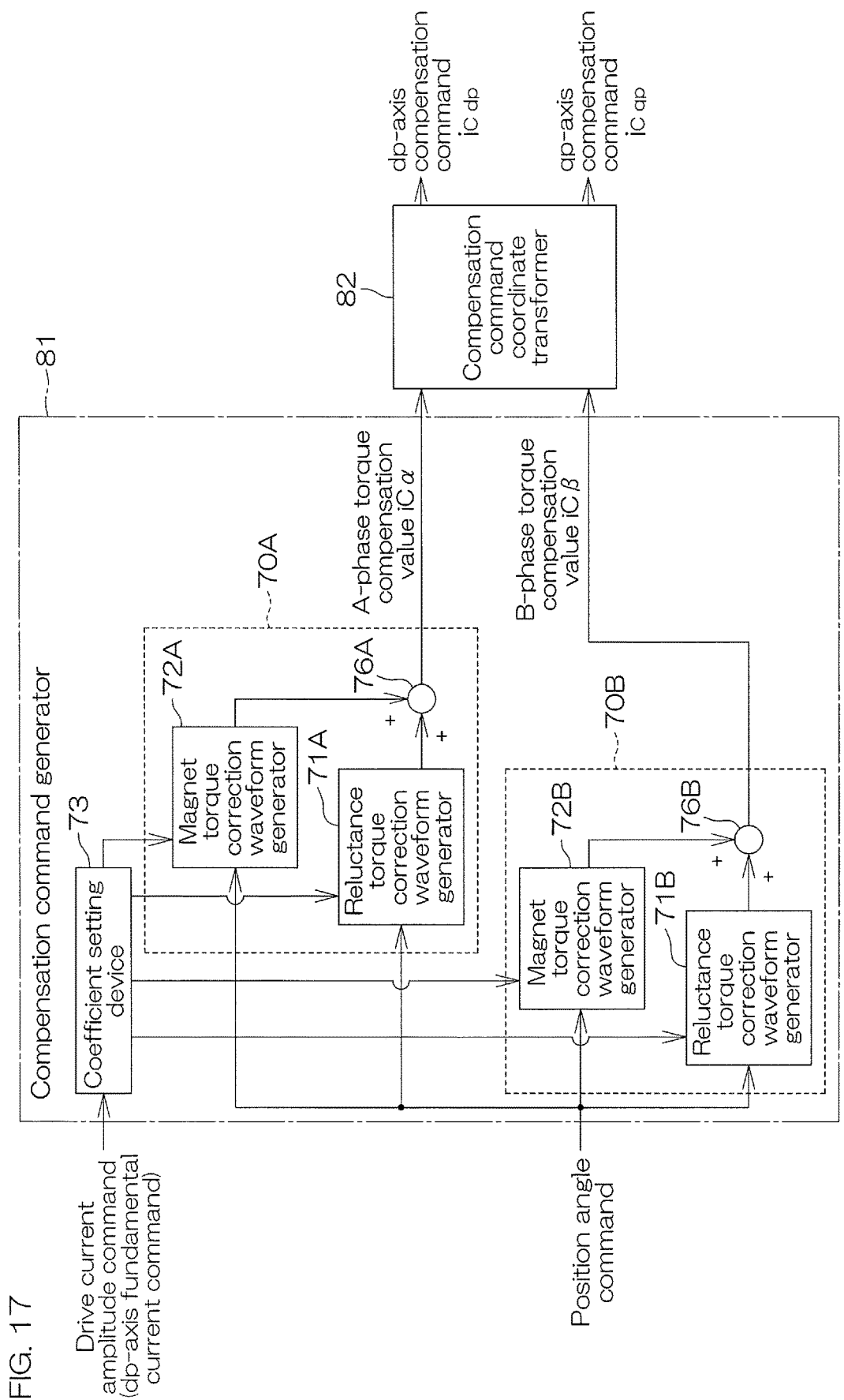
FIG. 17 is a block diagram for describing an exemplary functional configuration of a compensation command generator.

FIG. 17 is a block diagram for describing a specific example of the configuration of the compensation command generator 81. The compensation command generator 81 includes a coefficient setting device 73, an A-phase compensation value computing section 70A and a B-phase compensation value computing section 70B. The A-phase compensation value computing section 70A includes an A-phase reluctance torque correction waveform generator 71A, an A-phase magnet torque correction waveform generator 72A and an A-phase adder 76A. Similarly, the B-phase compensation value computing section 70B includes a B-phase reluctance torque correction waveform generator 71B, a B-phase magnet torque correction waveform generator 72B and a B-phase adder 76B.

Figure 18:
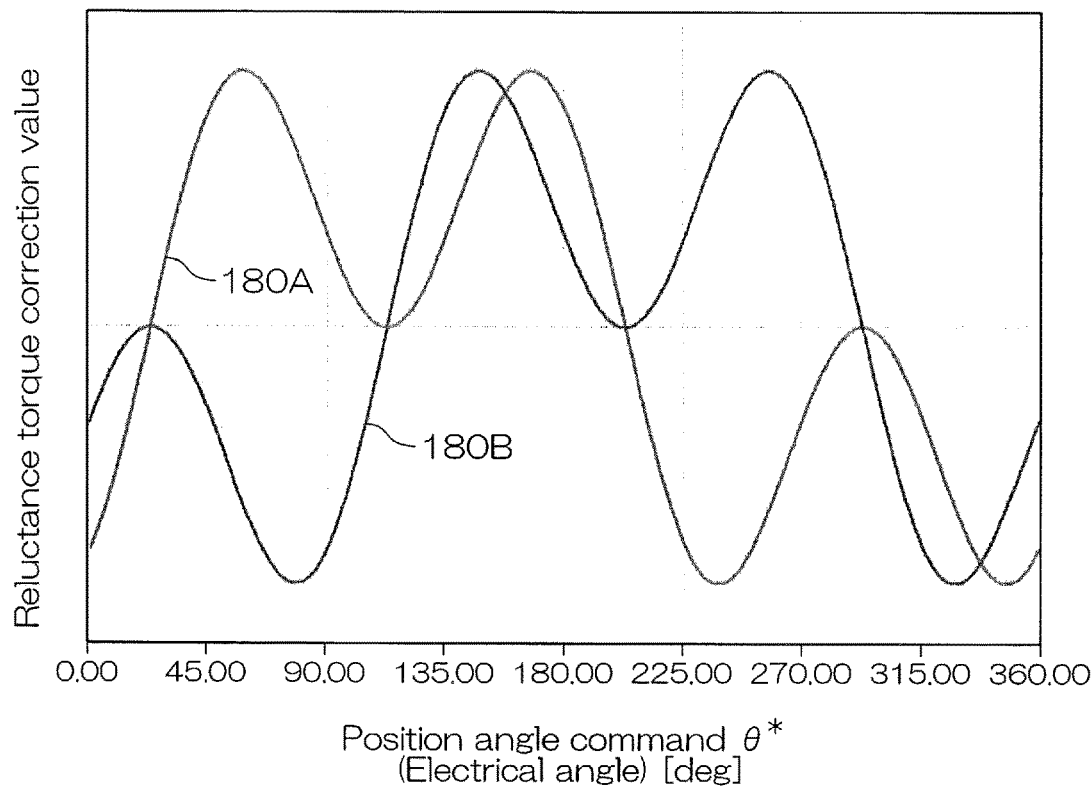
FIG. 18 is a waveform diagram showing specific examples of a reluctance torque correction waveform.

The A-phase reluctance torque correction waveform generator 71A generates an A-phase reluctance torque correction waveform (reluctance torque correction waveform component) for the correction of the A-phase current for the reluctance torque. This reluctance torque correction waveform is the superposition waveform shown by the line 511 in FIG. 5A. Similarly, the B-phase reluctance torque correction waveform generator 71B generates a B-phase reluctance torque correction waveform (reluctance torque correction waveform component) for the correction of the B-phase current for the reluctance torque. This reluctance torque correction waveform is the superposition waveform shown by the line 521 in FIG. 5B. The reluctance torque correction waveform generators 71A, 71B may each include a table which indicates a fundamental correction waveform for the superposition waveform, and this table may be stored in the memory 62. The fundamental correction waveform may be expressed in the form of a table containing fundamental correction values for various position angle commands θ*. The fundamental correction waveform is multiplied by a reluctance torque correction coefficient set by the coefficient setting device 73, whereby the reluctance torque correction waveform is generated as corresponding to the superposition waveform (line 511, 521). More specifically, the reluctance torque correction waveform generators 71A, 71B each generate a value corresponding to the position angle command θ* on the reluctance torque correction waveform as a reluctance torque correction value. Specific examples of the A-phase reluctance torque correction waveform and the B-phase reluctance torque correction waveform are respectively shown by lines 180A and 180B in FIG. 18.

Figure 19:
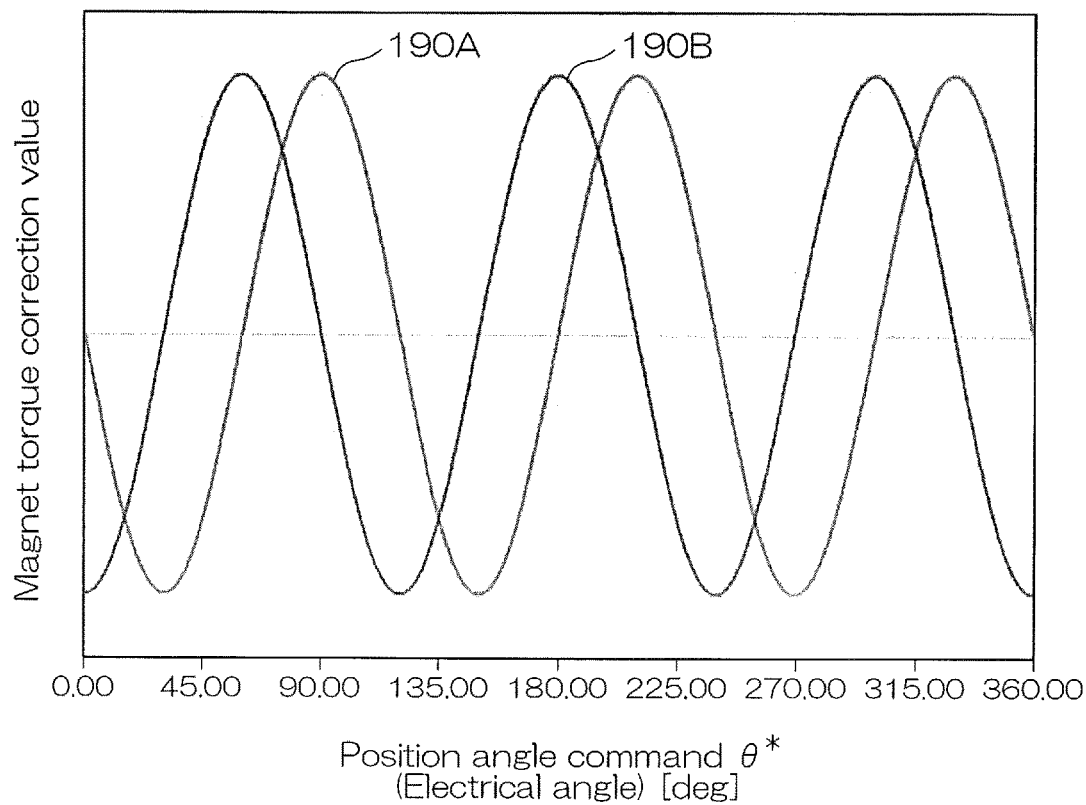
FIG. 19 is a waveform diagram showing specific examples of a magnet torque correction waveform.

The A-phase magnet torque correction waveform generator 72A generates an A-phase magnet torque correction waveform (magnet torque correction waveform component) for the correction of the A-phase current for the nonlinearity term of the magnet torque. Similarly, the B-phase magnet torque correction waveform generator 72B generates a B-phase magnet torque correction waveform (magnet torque correction waveform component) for the correction of the B-phase current for the nonlinearity term of the magnet torque. These magnet torque correction waveforms correspond to the superposition waveforms shown by the lines 801 and 901 in FIGS. 8 and 9. The magnet torque correction waveform generators 72A, 72B each generate the magnet torque correction waveform corresponding to the superposition waveform (line 801, 901) according to a magnet torque correction coefficient set by the coefficient setting device 73. The magnet torque correction waveform generators 72A, 72B may each include a table which indicates a fundamental correction waveform for the superposition waveform, and this table may be stored in the memory 62. The fundamental correction waveform may be expressed in the form of a table containing fundamental correction values for various position angle commands θ*. The fundamental correction waveform is multiplied by the magnet torque correction coefficient set by the coefficient setting device 73, whereby the magnet torque correction waveform is generated as corresponding to the superposition waveform (line 801, 901). More specifically, the magnet torque correction waveform generators 72A, 72B each generate a value corresponding to the position angle command on the magnet torque correction waveform as a magnet torque correction value. Specific examples of the A-phase magnet torque correction waveform and the B-phase magnet torque correction waveform are respectively shown by lines 190A and 190B in FIG. 19.

The coefficient setting device 73 generates various coefficients based on the dp-axis current command $i_{dp}$* (drive current amplitude command). Specifically, the coefficient setting device 73 generates the reluctance torque correction coefficient for defining the amplitudes of the reluctance torque correction waveforms to be generated by the reluctance torque correction waveform generators 71A, 71B based on the dp-axis current command $i_{dp}$*. By thus generating the reluctance torque correction coefficient based on the dp-axis current command $i_{dp}$*, the reluctance torque correction waveforms can be properly generated according to the motor current for the reduction of the influence of the reluctance torque fluctuation.

Specifically, the reluctance torque correction coefficient corresponds to $(L\Delta/M\Delta - 1) \times \sqrt{(\alpha/L\Delta)}$. By the multiplication by $(L\Delta/M\Delta - 1)$ (corresponding to (β−1) in the above expressions (22a) and (23a)), the sign of the reluctance torque correction coefficient is inverted according to the relationship between the amplitudes LΔ and MΔ of the angle-differentiated inductances. Where the reluctance torque correction waveform generators 71A, 71B respectively generate the fundamental correction waveforms corresponding to the superposition waveforms of the lines 511 and 521 in FIGS. 5A and 5B, for example, a positive reluctance torque correction coefficient is generated for LΔ-MΔ, and a negative reluctance torque correction coefficient is generated for LΔ<MΔ.

The amplitudes LΔ and MΔ of the angle-differentiated inductances vary according to the motor current. The values variable according to the current are determined by the design of each stepping motor 1. Therefore, the values of LΔ and MΔ which are variable according to the motor current can be preliminarily determined based on the analysis of the design of the stepping motor 1 or measurement performed after the production of the stepping motor 1. Since the value of the reluctance torque correction coefficient variable with respect to the motor current can be determined based on the values of LΔ and MΔ thus determined, the value of the reluctance torque correction coefficient may be preliminarily tabulated. Thus, the reluctance torque correction coefficient which is properly variable with respect to the motor current can be generated. Of course, a table containing the values of LΔ and MΔ with respect to the motor current may be prepared, and the reluctance torque correction coefficient may be determined as corresponding to the drive current amplitude command (which is virtually equivalent to the motor current) by computation based on the table.

The coefficient setting device 73 further generates the magnet torque correction coefficient for the correction for the nonlinearity term of the magnet torque based on the dp-axis current command $i_{dp}^*$ (drive current amplitude command). Specifically, the coefficient setting device 73 generates α and p in the expressions (27) and (28) as the magnet torque correction coefficient, and applies the magnet torque correction coefficient to the magnet torque correction waveform generators 72A, 72B. The magnet torque correction waveform generators 72A, 72B generate the magnet torque correction waveforms (corresponding to the superposition waveforms 801, 901 in FIGS. 8, 9) based on the applied magnet torque correction coefficient.

The adder 76A superposes the A-phase reluctance torque correction waveform on the A-phase magnet torque correction waveform to generate an A-phase composite correction waveform. More specifically, a value corresponding to the position angle command θ* on the A-phase composite correction waveform is generated as an A-phase torque compensation value $i_{C\alpha}$. Similarly, the adder 76B superposes the B-phase reluctance torque correction waveform on the B-phase magnet torque correction waveform to generate a B-phase composite correction waveform. More specifically, a value corresponding to the position angle command θ* on the B-phase composite correction waveform is generated as a B-phase torque compensation value $i_{C\beta}$.

The compensation command coordinate transformer 82 coordinate-transforms the A-phase torque compensation value $i_{C\alpha}$ and the B-phase torque compensation value $i_{C\beta}$ to the dp-qp rotational coordinate system based on the position angle command θ* to generate the dp-axis compensation command $i_{Cdp}$ and the qp-axis compensation command $i_{Cqp}$. In this case, the coordinate transformation is represented by the following expression (36):

$$\begin{bmatrix} i_{Cdp} \\ i_{Cqp} \end{bmatrix} = \begin{bmatrix} \cos\theta^* & \sin\theta^* \\ -\sin\theta^* & \cos\theta^* \end{bmatrix} \begin{bmatrix} i_{C\alpha} \\ i_{C\beta} \end{bmatrix} \quad (36)$$

Figure 20:
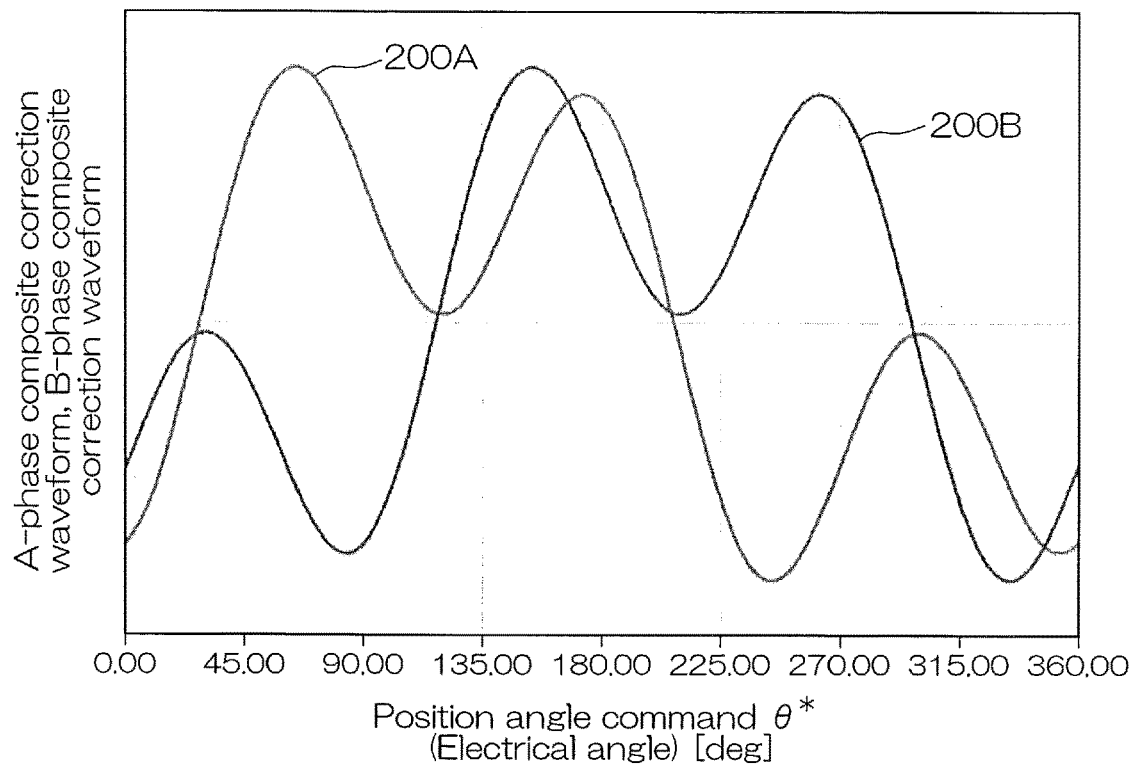
FIG. 20 is a waveform diagram showing specific examples of a composite correction waveform obtained by combining the reluctance torque correction waveform with the magnet torque correction waveform.
Figure 21:
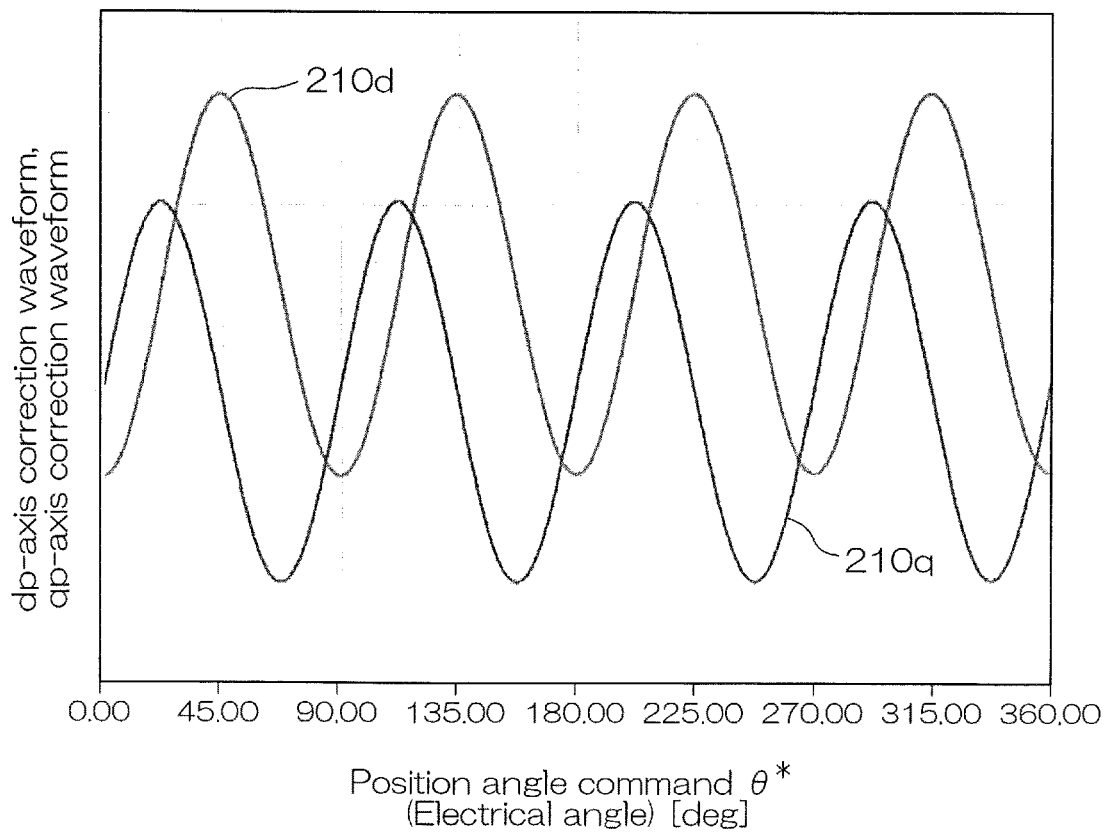
FIG. 21 is a waveform diagram showing specific examples of a dp-axis correction waveform and a qp-axis correction waveform obtained by coordinate-transforming the composite waveform to the rotational coordinate system.
Figure 22:
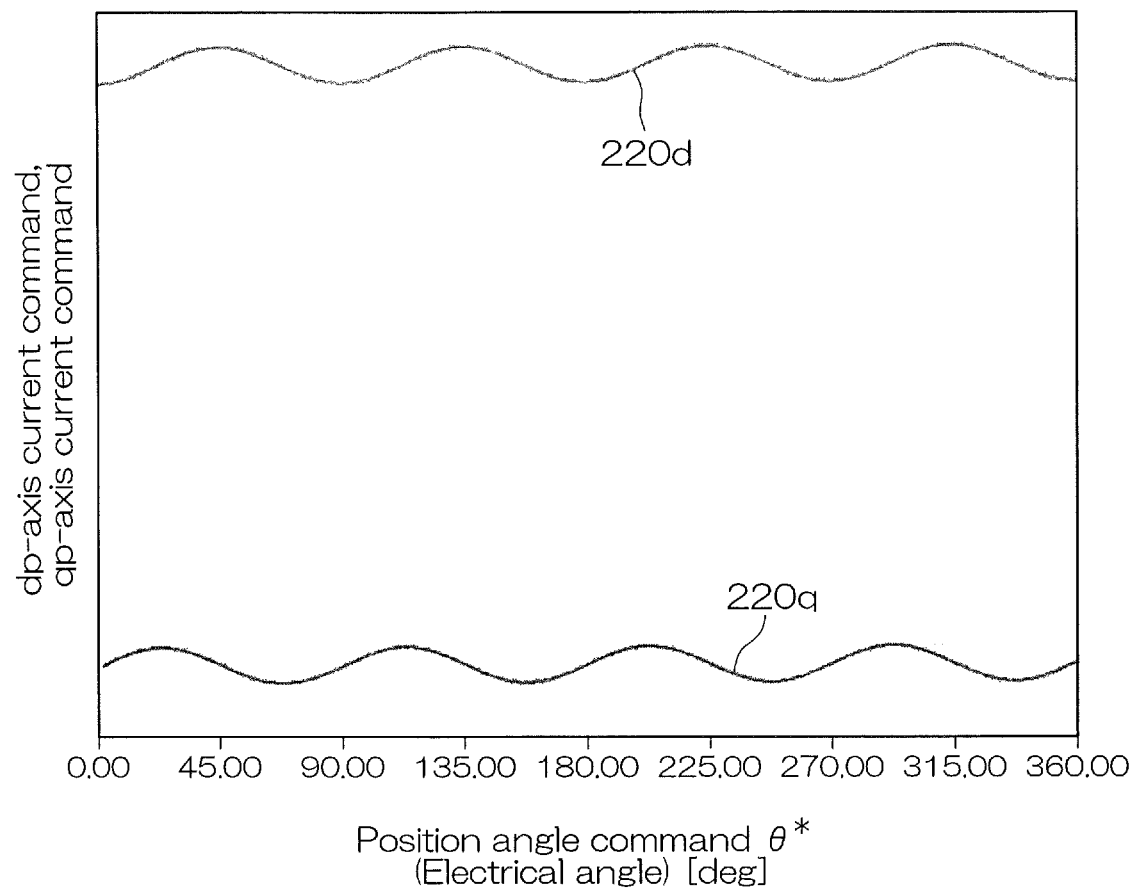
FIG. 22 is a waveform diagram showing specific examples of a dp-axis current command waveform and a qp-axis current command waveform obtained by correcting a fundamental current command with the dp-axis correction waveform and the qp-axis correction waveform.

Examples of the A-phase composite correction waveform and the B-phase composite correction waveform are respectively shown by lines 200A and 200B in FIG. 20. Further, examples of the dp-axis correction waveform and the qp-axis correction waveform obtained by transforming the A-phase composite correction waveform and the B-phase composite correction waveform to the dp-qp rotational coordinate system are respectively shown by lines 210d and 210q in FIG. 21. Further, the waveform of the dp-axis current command $i_{dp}^*$ obtained by correcting the dp-axis fundamental current command $i_{basedp}^*$ with the dp-axis correction waveform is shown by a line 220d in FIG. 22, and the waveform of the qp-axis current command $i_{qp}^*$ obtained by correcting the qp-axis fundamental current command $i_{baseqp}^*$ with the qp-axis correction waveform is shown by a line 220q in FIG. 22.

Only one of the feature of the current correction for the reluctance torque and the feature of the current correction for the nonlinearity term of the magnet torque may be incorporated with the other omitted. Where the feature of the current correction for the reluctance torque is omitted, the reluctance torque correction waveform generators 71A, 71B and the adder 76A, 76B may be omitted from the configuration shown in FIG. 17. Where the feature of the current correction for the nonlinearity term of the magnet torque is omitted, the magnet torque correction waveform generators 72A, 72B and the adders 76A, 76B may be omitted from the configuration shown in FIG. 17.

Figure 23:
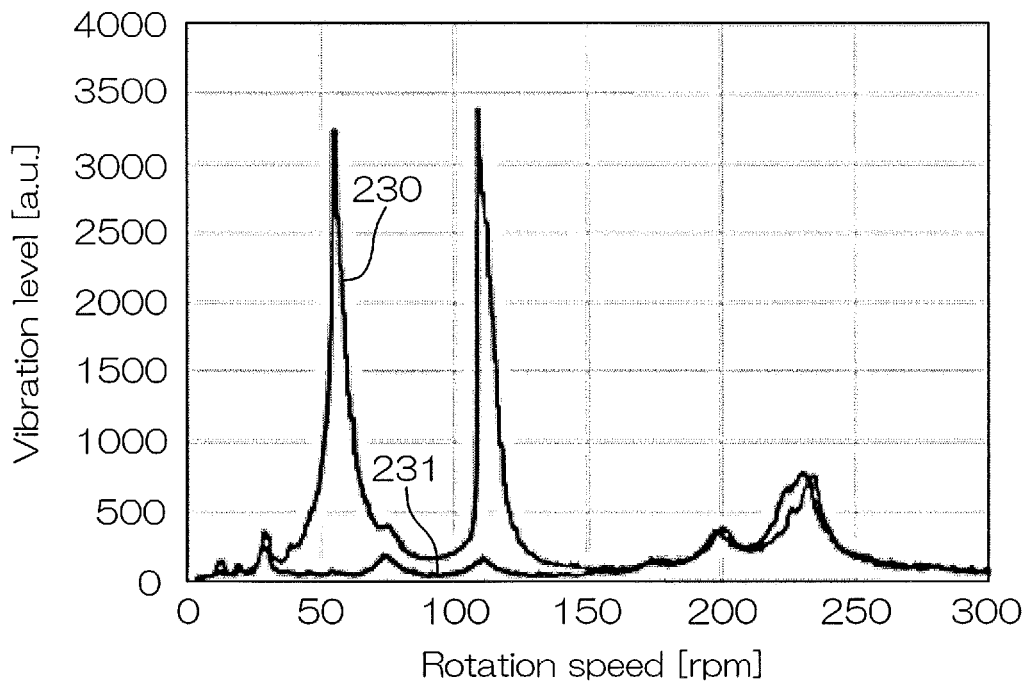
FIG. 23 is a diagram showing the measurement of the rotational vibrations of the stepping motor by way of example.
Figure 24:
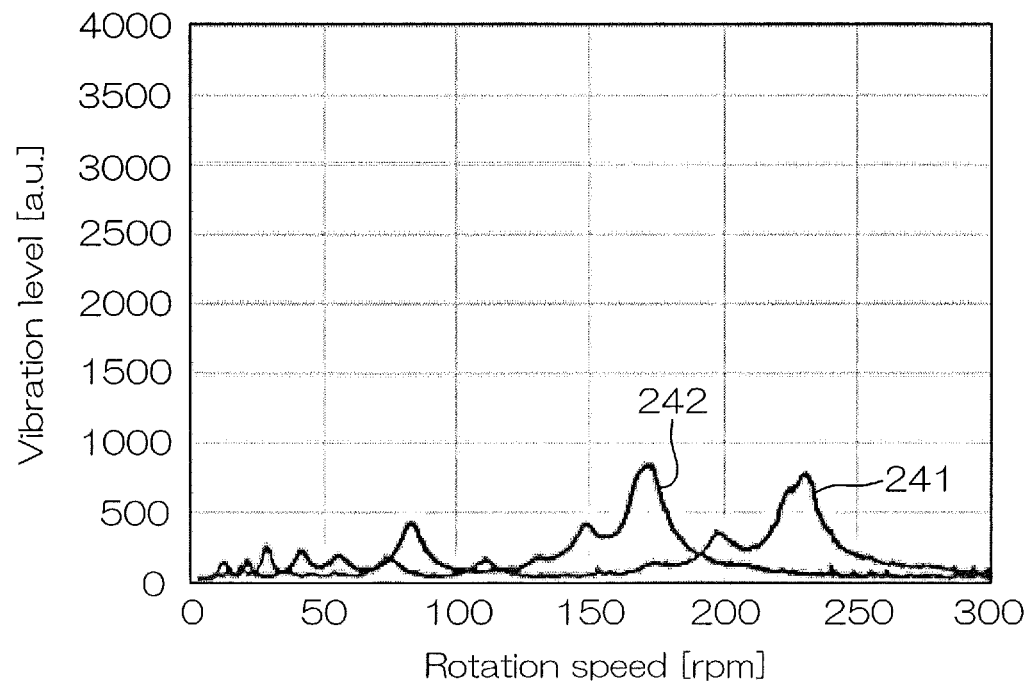
FIG. 24 is a diagram showing the measurement of the rotational vibrations of the stepping motor by way of example.

The measurement of the rotational vibrations observed in the arrangement shown in FIGS. 10 to 22 is shown in FIGS. 23 and 24 by way of example. The stepping motor 1 used for the measurement is a two-phase hybrid type stepping motor having a mounting angle size of 28 mm, a motor length of 32 mm, an excitation maximum static torque of 0.1 N·m, a rotor inertia moment of $9.2 \times 10^{-7}$ kg·m², and a rotor tooth number of 50. A line 230 in FIG. 23 indicates a relationship between the rotation speed and the rotational vibration level observed when neither the current correction for the reluctance torque nor the current correction for the magnet torque was performed. A line 231 in FIG. 23 indicates a relationship between the rotation speed and the rotational vibration level observed when the current correction for the reluctance torque and the current correction for the magnet torque were performed. Lines 241 and 242 in FIG. 24 indicate relationships between the rotation speed and the rotational vibration level observed when the aforementioned current corrections were performed. The line 241 indicates a measurement result obtained when the motor was driven with a rated current, and the line 242 indicates a measurement result obtained when the drive current was 50% of the rated current.

Without the corrections, as indicated by the line 230 in FIG. 23, the rotational vibration level is high when the rotation speed is about 60 rpm and about 120 rpm. The frequency component of the vibrations observed at this time is 200 Hz at a peak, and this is the eigenfrequency of the rotor. When the rotation speed is 60 rpm, the frequency of the motor current fundamental wave is 50 Hz. When the rotation speed is 120 rpm, the frequency of the motor current fundamental wave is 100 Hz. As shown, the vibrations occur when the rotation speed is about 60 rpm and the frequency of the current fundamental wave is one fourth the eigenfrequency of the rotor (fourth-order vibrations). Further, the vibrations occur when the rotation speed is about 120 rpm and the frequency of the current fundamental wave is one half the eigenfrequency of the rotor (second-order vibrations).

With the current corrections, as shown by the line 231 in FIG. 23, the rotational vibration level is significantly low. Even if the drive current is changed, as shown in FIG. 24, the vibrations are suppressed by changing the current correction value according to the drive current.

Description will be given to a case in which the aforementioned corrections are applied to a slot magnet type stepping motor as another specific example. In the slot magnet type stepping motor, a lower vibration level can be achieved by the aforementioned current correction for the reluctance torque. In the slot magnet type stepping motor, the current correction for the nonlinearity term of the magnet torque is not necessarily required and, even without this current correction, a lower vibration level can be achieved.

Figure 25:
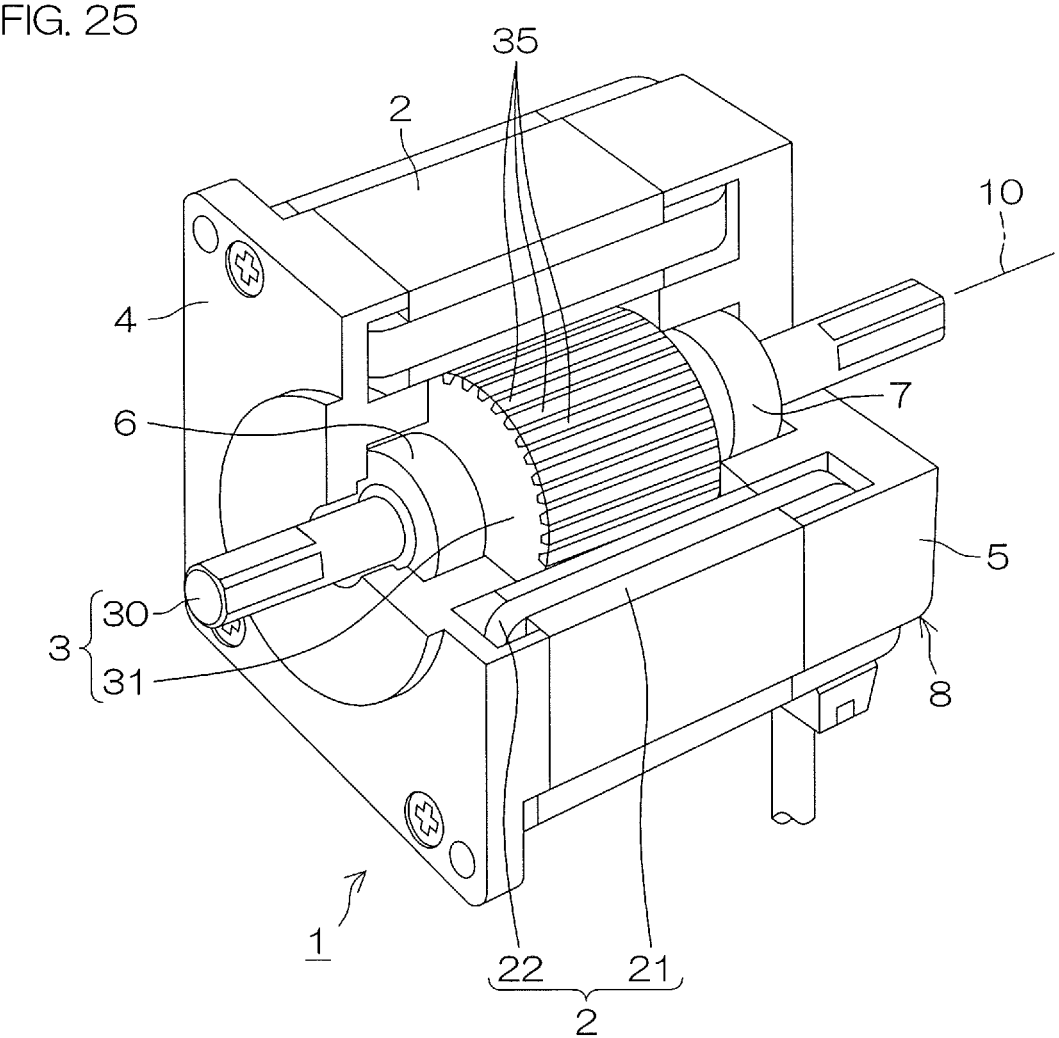
FIG. 25 is a perspective view for describing the structure of a two-phase slot magnet type stepping motor by way of example.

FIG. 25 shows the structure of the slot magnet type stepping motor by way of example. In FIG. 25, components corresponding to those shown in FIG. 10 and the like are denoted by the same reference characters for convenience, but this does not necessarily mean that the components shown in FIG. 25 are substantially the same as the components shown in FIG. 10 and the like.

The stepping motor 1 includes a stator 2, a rotor 3, a motor flange 4, a bracket 5, and a pair of bearings 6, 7.

The stator 2 includes a stator iron core 21 and windings 22. The motor flange 4 and the bracket 5 are fixed to opposite ends of the stator iron core 21, and these constitute a motor case 8.

The rotor 3 is disposed within the motor case 8 rotatably about a rotation axis 10. The rotor 3 includes a rotation shaft 30 disposed along the rotation axis 10, and a rotor iron core 31 supported by the rotation shaft 30. The rotation shaft 30 is supported rotatably by the pair of bearings 6, 7. One of the bearings (bearing 6) is attached to the motor flange 4, and the other bearing 7 is attached to the bracket 5.

Figure 26:
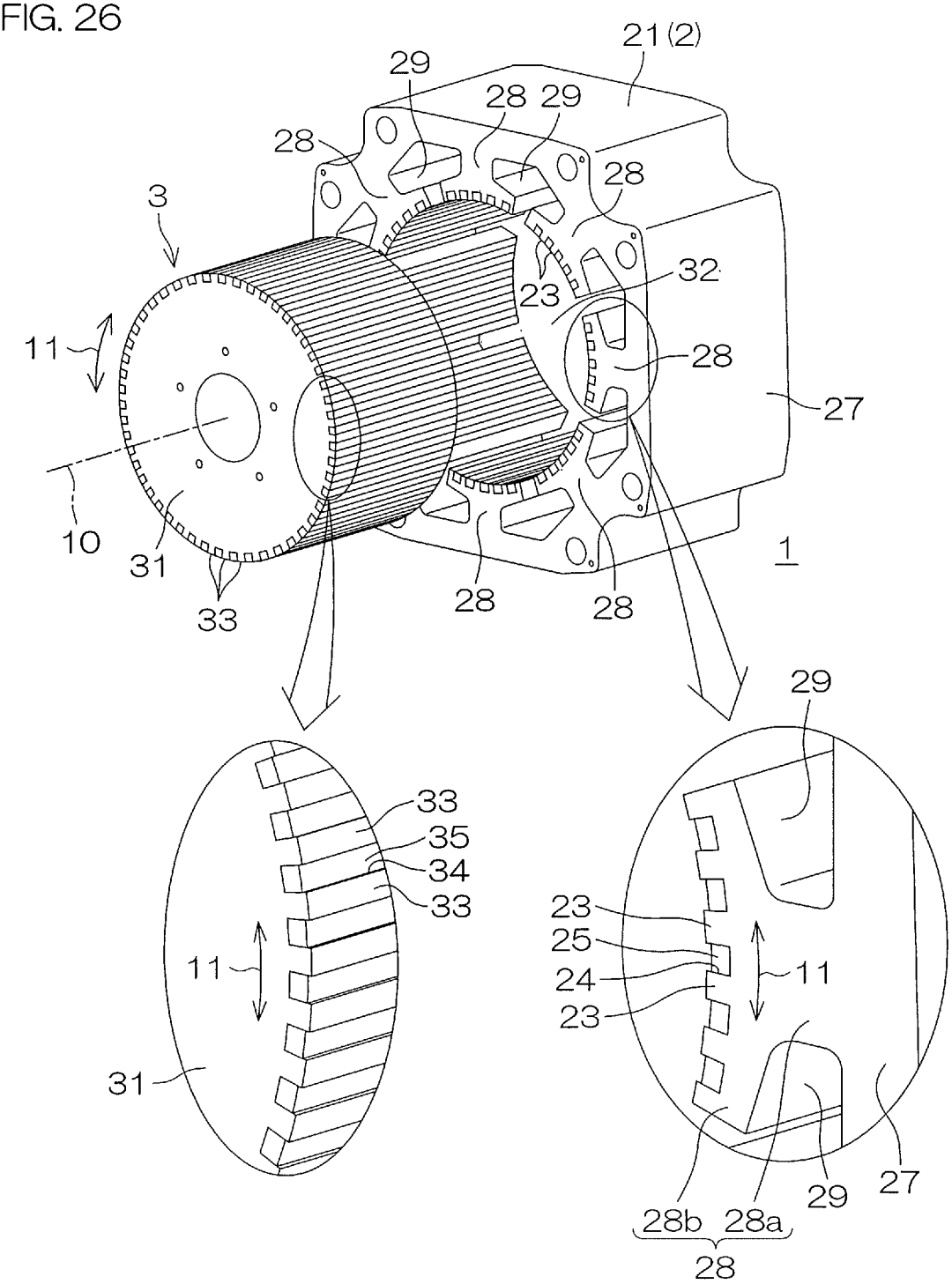
FIG. 26 is an exploded perspective view for describing the structures of a stator and a rotor of the slot magnet type stepping motor.

FIG. 26 is an exploded perspective view for describing the structures of the stator 2 and the rotor 3.

Rotor teeth 33 are provided equidistantly at a predetermined tooth pitch in a circumferential direction 11 on the outer peripheral surface of the rotor iron core 31. The rotor teeth 33 each extend parallel to the rotation axis 10. Alternatively, the rotor teeth 33 may be each inclined with respect to the rotation axis 10.

Rotor slots 34 are provided between respective adjacent pairs of the rotor teeth 33. Rotor slot magnets 35 are respectively inserted in the rotor slots 34. The rotor slot magnets 35 are rod-shaped hard magnetic inserts (typically, permanent magnet pieces) respectively extending along the rotor slots 34. The rotor slot magnets 35 are respectively fixed within the rotor slots 34, for example, with an adhesive.

The stator iron core 21 includes a frame-shaped back yoke 27, and a plurality of main poles 28. The main poles 28 each extend from the back yoke 27 toward the rotor iron core 31, and are spaced from each other in the circumferential direction 11 to surround the rotor iron core 31. Thus, the main poles 28 define a rotor accommodation space 32 having a generally hollow cylindrical shape about the rotation axis 10. The windings 22 (see FIG. 25, not shown in FIG. 26) are respectively wound around the main poles 28.

The main poles 28 each have a support portion 28a connected to the back yoke 27, and an opposed portion 28b connected to a distal end of the support portion 28a. The opposed portion 28b faces the rotor accommodation space 32 and, therefore, is opposed to the rotor iron core 31. The opposed portion 28b extends in circumferentially opposite directions from the support portion 28a. Thus, winding slots 29 are provided between respective circumferentially-adjacent pairs of the main poles 28. The windings 22 are disposed in these winding slots 29. The opposed portion 28b has an opposition surface which is opposed to the rotor iron core 31. The opposition surface is formed with a plurality of stator teeth 23 which project toward the rotation axis 10. The stator teeth 23 are provided equidistantly at a predetermined tooth pitch in the circumferential direction 11. The stator teeth 23 extend along the rotation axis 10 so as to correspond to the rotor teeth 33. Where the rotor teeth 33 are inclined with respect to the rotation axis 10, the stator teeth 23 are correspondingly inclined with respect to the rotation axis 10.

Stator slots 24 are provided between respective adjacent pairs of the stator teeth 23. Stator slot magnets 25 are respectively inserted in the stator slots 24. The stator slot magnets 25 are rod-shaped hard magnetic inserts (typically, permanent magnet pieces) respectively extending along the stator slots 24. The stator slot magnets 25 are respectively fixed within the stator slots 24, for example, with an adhesive.

The rotor slot magnets 35 and the stator slot magnets 25 are each magnetized radially of the rotation axis 10. The expression "radially of the rotation axis 10" means "perpendicularly to the rotation axis 10." Therefore, the rotor slot magnets 35 are each magnetized along the depth of the rotor slot 34. Further, the stator slot magnets 25 are each magnetized along the depth of the stator slot 24. The rotor slot magnets 35 respectively have the same magnetization directions as the stator slot magnets 25 radially of the rotation axis 10. With the rotor slot magnets 35 respectively opposed to the stator slot magnets 25, therefore, the polarities of the rotor slot magnets 35 are opposite from the polarities of the opposed stator slot magnets 25.

Figure 27:
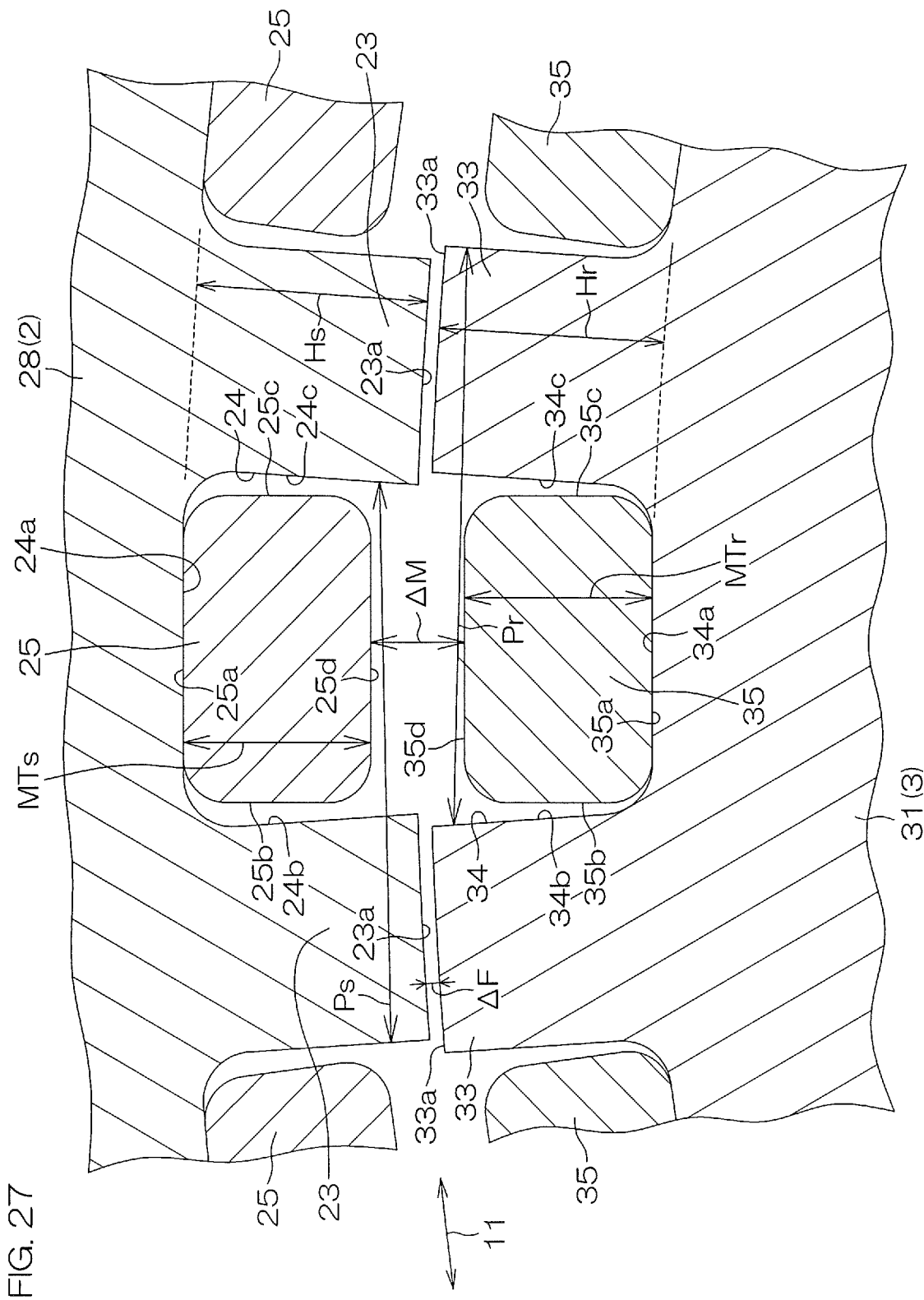
FIG. 27 is a partially enlarged sectional view showing rotor teeth and stator teeth of the slot magnet type stepping motor on an enlarged scale.

FIG. 27 is a partial enlarged sectional view showing the rotor teeth 33 and the stator teeth 23 on an enlarged scale.

The rotor teeth 33 are linear projections each extending in a direction intersecting the circumferential direction 11 (movement direction). The rotor teeth 33 each project radially outward (away from the rotation axis 10) as having a generally constant width in a sectional plane perpendicular to the rotation axis 10. The rotor teeth 33 each have atop surface 33a facing away from the rotation axis 10. The top surfaces 33a of the rotor teeth 33 extend in the circumferential direction 11 about the rotation axis 10. The rotor teeth 33 have substantially congruent sectional shapes, and are arranged equidistantly at a predetermined rotor tooth pitch Pr in the sectional plane perpendicular to the rotation axis 10. The rotor slots 34 provided between the respective adjacent pairs of the rotor teeth 33 are each defined by a pair of generally parallel side surfaces 34b, 34c of the rotor teeth 33 and a bottom surface 34a present between the side surfaces 34b and 34c, and each have a generally rectangular sectional shape. The bottom surface 34a extends in the circumferential direction 11 about the rotation axis 10. The rotor teeth 33 each have a height (hereinafter referred to as "rotor tooth height Hr") as measured from the bottom surface 34a of the rotor slot 34 to the top surface 33a of the rotor tooth 33.

The rotor slot magnets 35 are rod-shaped inserts (typically, permanent magnet pieces) each made of a hard magnetic material and extending along the rotation axis 10. In this embodiment, the rotor slot magnets 35 each have a generally rectangular sectional shape as taken perpendicularly to the rotation axis 10. The rotor slot magnets 35 each have a bottom surface 35a opposed to the bottom surface 34a of the rotor slot 34, a top surface 35d (opposition surface) located opposite from the bottom surface 35a away from the rotation axis 10, and a pair of side surfaces 35b, 35c extending between the bottom surface 35a and the top surface 35d. Edge portions of the bottom surface 35a and the top surface 35d connected to the side surfaces 35b, 35c are chamfered to be arcuately curved in section. The bottom surface 35a of the rotor slot magnet 35 is bonded (fixed) to the bottom surface 34a of the rotor slot 34, for example, with the adhesive.

The top surface 35d of the rotor slot magnet 35 serves as the opposition surface which is opposed to the stator 2. In this embodiment, the top surface 35d is recessed from a virtual cylindrical surface defined by connecting the outer peripheral surfaces (top surfaces 33a) of the rotor teeth 33 toward the rotation axis 10. That is, a magnet thickness (rotor magnet thickness) MTr which is equivalent to a distance between the bottom surface 35a and the top surface 35d is smaller than the depth of the rotor slot 34 (which is equivalent to the rotor tooth height Hr). Thus, the rotor slot magnets 35 are respectively entirely accommodated in the rotor slots 34. The top surfaces 35d are substantially parallel to the virtual cylindrical surface. In a strict sense, the top surfaces 35d may each be a flat surface, which may be parallel to a plane defined by connecting opening edges of the corresponding rotor slot 34. In this embodiment, the rotor slot magnets 35 respectively inserted in the rotor slots 34 have substantially the same shape and size.

The stator teeth 23 are linear projections each extending in the direction intersecting the circumferential direction 11 (movement direction). The stator teeth 23 respectively extend parallel to the rotor teeth 33. The stator teeth 23 each project radially inward (toward the rotation axis 10) as having a generally constant width in the sectional plane perpendicular to the rotation axis 10. The stator teeth 23 each have a top surface 23a facing toward the rotation axis 10. The top surfaces 23a of the stator teeth 23 extend in the circumferential direction 11 about the rotation axis 10. The stator teeth 23 have substantially congruent sectional shapes, and are arranged equidistantly at a predetermined stator tooth pitch Ps in the sectional plane perpendicular to the rotation axis 10. The stator slots 24 provided between the respective adjacent pairs of the stator teeth 23 are each defined by a pair of generally parallel side surfaces 24b, 24c of the stator teeth 23 and a bottom surface 24a present between the side surfaces 24b and 24c, and each have a generally rectangular sectional shape. The bottom surface 24a extends in the circumferential direction 11 about the rotation axis 10. The stator teeth 23 each have a height (hereinafter referred to as "stator tooth height Hs") as measured from the bottom surface 24a of the stator slot 24 to the top surface 23a of the stator tooth 23.

The stator slot magnets 25 are rod-shaped inserts (typically, permanent magnet pieces) each made of a hard magnetic material and extending along the rotation axis 10. In this embodiment, the stator slot magnets 25 each have a generally rectangular sectional shape as taken perpendicularly to the rotation axis 10. The stator slot magnets 25 each have a bottom surface 25a opposed to the bottom surface 24a of the stator slot 24, a top surface 25d (opposition surface) located opposite from the bottom surface 25a on the side of the rotation axis 10, and a pair of side surfaces 25b, 25c extending between the bottom surface 25a and the top surface 25d. Edge portions of the bottom surface 25a and the top surface 25d connected to the side surfaces 25b, 25c are chamfered to be arcuately curved in section. The bottom surface 25a of the stator slot magnet 25 is bonded (fixed) to the bottom surface 24a of the stator slot 24, for example, with the adhesive.

The top surface 25d of the stator slot magnet 25 serves as the opposition surface which is opposed to the rotor 3. In this embodiment, the top surface 25d is recessed from a virtual cylindrical surface defined by connecting the inner peripheral surfaces (top surfaces 23a) of the stator teeth 23 away from the rotation axis 10. That is, a magnet thickness (stator magnet thickness) MTs which is equivalent to a distance between the bottom surface 25a and the top surface 25d is smaller than the depth of the stator slot 24 (which is equivalent to the stator tooth height Hs). Thus, the stator slot magnets 25 are respectively entirely accommodated in the stator slots 24. The top surfaces 25d are substantially parallel to the virtual cylindrical surface. In a strict sense, the top surfaces 25d may each be a flat surface, which may be parallel to a plane defined by connecting opening edges of the corresponding stator slot 24. In this embodiment, the stator slot magnets 25 respectively inserted in the stator slots 24 have substantially the same shape and size.

The rotor slot magnets 35 and the stator slot magnets 25 have substantially the same shape and size.

When the rotor tooth 33 and the stator tooth 23 are opposed to each other, a predetermined gap (space) is defined between the rotor tooth 33 and the stator tooth 23 in an opposition direction, i.e., radially (in the depth direction of the slots 34, 24). This gap is referred to as iron gap $\Delta F$. When the rotor slot 34 and the stator slot 24 are opposed to each other, a predetermined gap is defined between the rotor slot magnet 35 and the stator slot magnet 25 in an opposition direction, i.e., radially (in the depth direction of the slots 34, 24). This gap is referred to as magnet gap $\Delta M$.

The slot magnet type stepping motor generally has a significantly improved holding torque as compared with the hybrid type stepping motor. Where the ratio between the self-inductance and the mutual inductance is significantly changed depending on the shapes and the positional arrangement of the magnets, on the other hand, the rotational vibrations and the stop angle error are liable to be exacerbated. Particularly, the ratio (hereinafter referred to as "gap ratio $\Delta M/\Delta F$") of the magnet gap $\Delta M$ (inter-magnet gap, which is an air gap between the stator slot magnet 25 and the rotor slot magnet 35) with respect to the iron gap $\Delta F$ (inter-iron gap, which is an air gap between the stator 2 and the rotor 3 (rotor core)) has a significant influence.

Figure 28A:
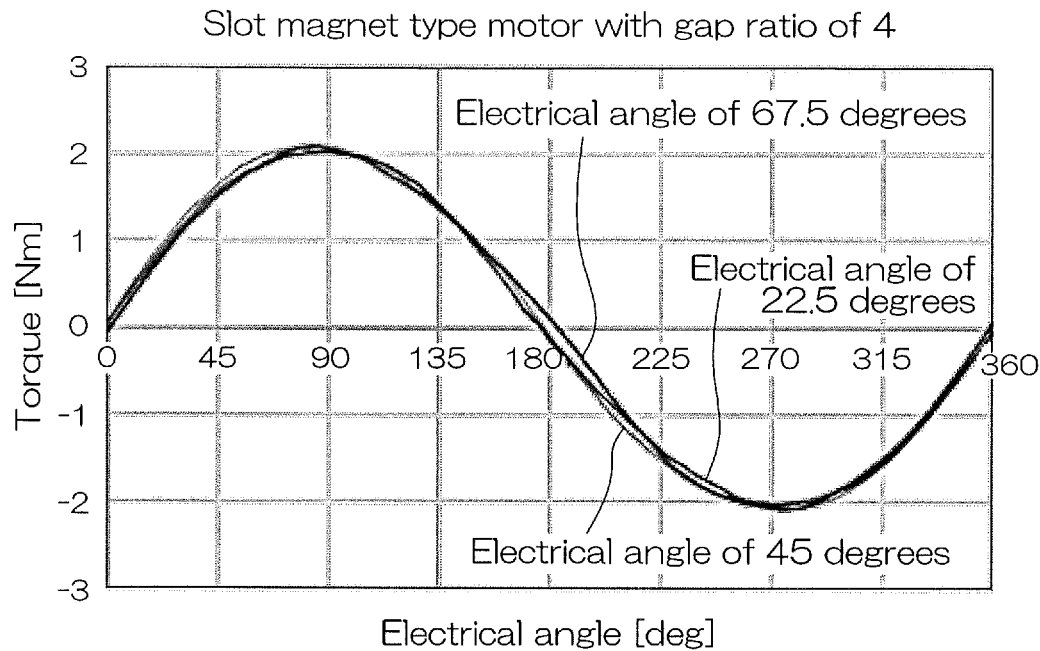
FIGS. 28A and 28B are diagrams showing the results of the magnetic analysis of θ-T waveforms of slot magnet type stepping motors respectively having gap ratios of 4 and 8.
Figure 28B:
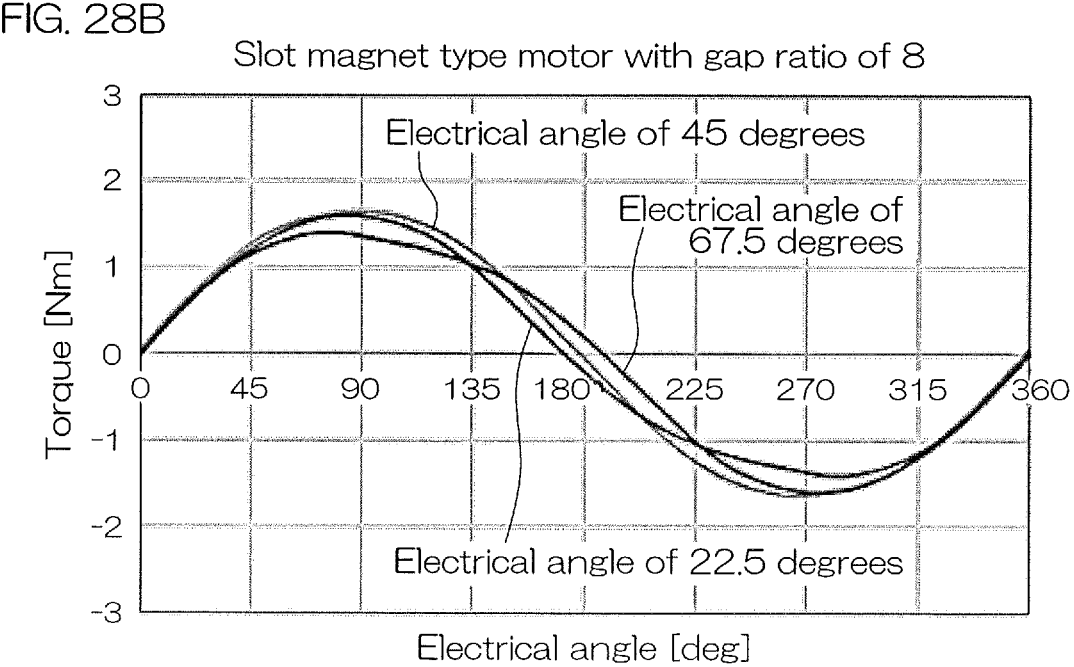

FIGS. 28A and 28B show the results of the magnetic analysis of the θ-T waveforms of slot magnet type stepping motors. On assumption that the current is a sinusoidal current, the rotor angle dependence of the torque was determined when the excitation was caused at specific electrical angles, i.e., $\pi/8$, $\pi/4$ and $3\pi/8$. In FIGS. 28A and 28B, the torque zero point is illustrated as coinciding with the electrical angle zero point for easier visual understanding of the fluctuation of the waveforms. A two-phase slot magnet type stepping motor having a mounting angle size of 60 mm, a motor length of 40 mm, a rotor inertia moment of $370 \times 10^{-7}$ kg·m², and a rotor tooth number of 50 was used for the analysis. Two such slot magnet type motors were prepared, which had significantly different characteristics with their magnet thicknesses MTr, MTs set differently. One of the slot magnet type stepping motors had a gap ratio $\Delta M/\Delta F$ of 4, and its characteristic is shown in FIG. 28A. The other slot magnet type stepping motor had a gap ratio $\Delta M/\Delta F$ of 8, and its characteristic is shown in FIG. 28B. The former had a holding torque of 2.0 N·m, and the latter had a holding torque of 1.3 N·m. A hybrid type stepping motor having the same physical construction, for example, has a holding torque of 1.1 N·m.

A comparison between FIGS. 28A and 28B indicates that, in the case of the slot magnet type motor having a gap ratio $\Delta M/\Delta F$ of 8, the waveform fluctuation significantly varies depending on the excitation phase. This results in exacerbation of the rotational vibrations and the stop angle error.

Figure 29A:
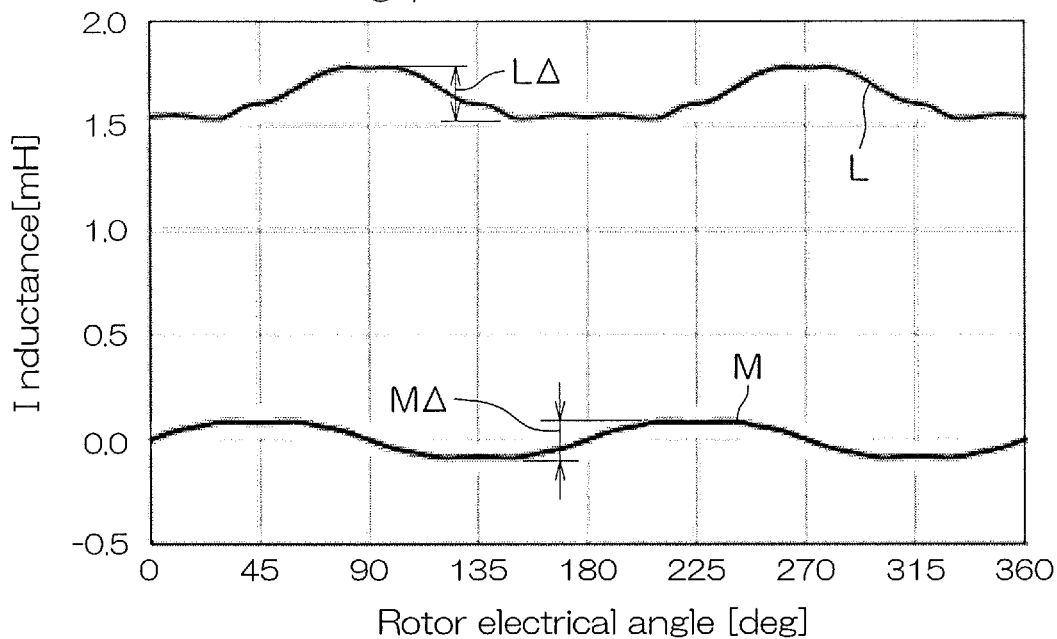
FIGS. 29A and 29B are diagrams showing the results of the analysis of the self-inductance and the mutual inductance of the slot magnet type stepping motor having a gap ratio of 4.
Figure 29B:
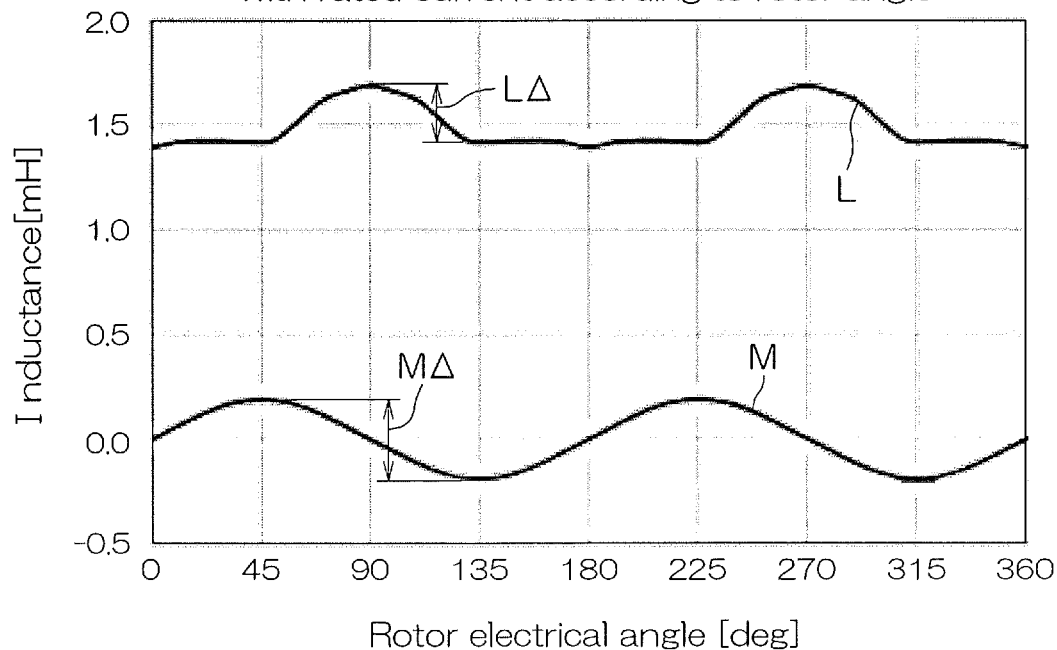
Figure 30A:
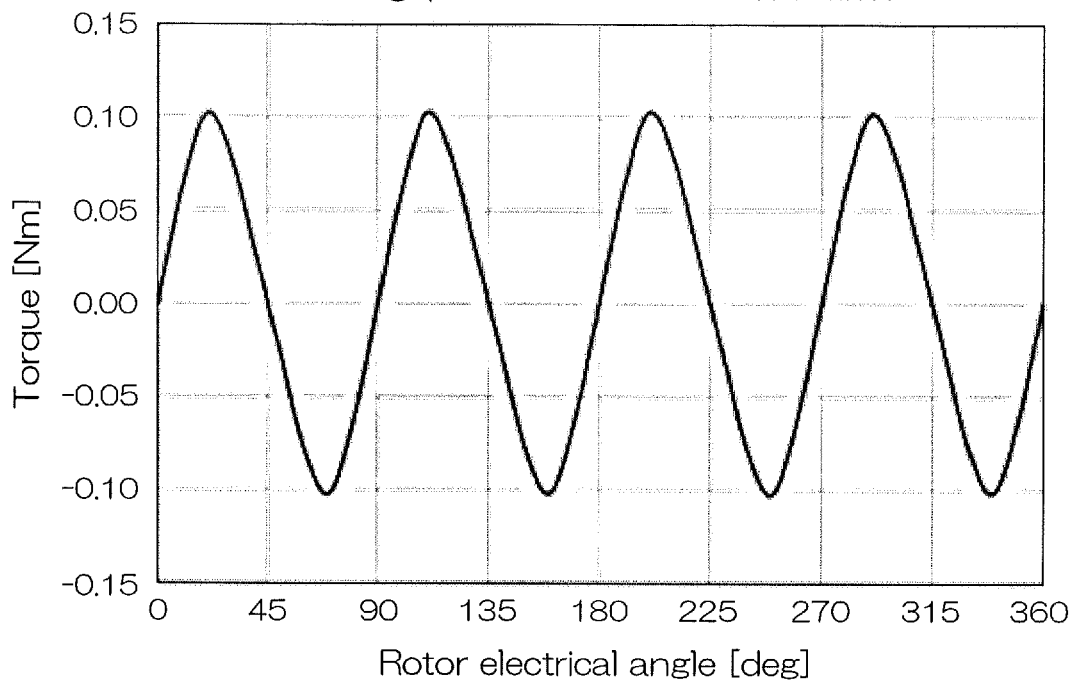
FIGS. 30A and 30B are diagrams showing the results of the torque analysis of the slot magnet type stepping motor having a gap ratio of 4.
Figure 30B:
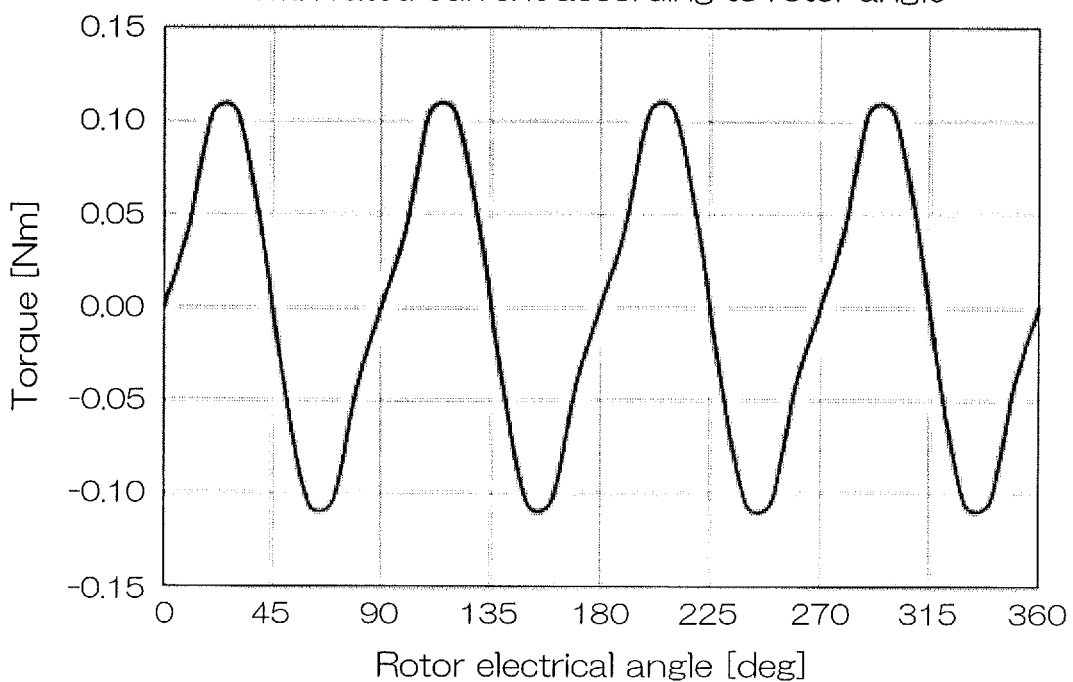

FIG. 29A shows the results of the analysis of the self-inductance L and the mutual inductance M obtained when the rotor was slowly rotated in a non-excitation state in the slot magnet type motor having a gap-ratio ΔM/ΔF of 4. FIG. 29B shows the results of the analysis of the self-inductance L and the mutual inductance M obtained when the rotor was slowly rotated with a d-axis current set at a rated current value and with a q-axis current set at zero in the same motor. FIG. 30A shows the result of the torque analysis corresponding to FIG. 29A (in the non-excitation state). Further, FIG. 30B shows the result of the torque analysis corresponding to FIG. 29B (in the d-axis excitation with the rated current). The torque in the non-excitation state (FIG. 30A) is a detent torque.

FIGS. 29A and 29B indicate that the self-inductance L and the mutual inductance M each have 2θ-angle dependence for each electrical angle and, particularly, the amplitude of the mutual inductance M is greater in the d-axis excitation with the rated current than in the non-excitation. The angle-differentiated values of the inductances L, M are proportional to the reluctance torque. Where the inductances L, M are each regarded as a sinusoidal waveform, however, the amplitudes of the inductances L, M are substantially equal to the amplitudes of the angle-differentiated values of the inductances L, M. That is, it may be considered that the amplitudes of the inductances affect the reluctance torque. Therefore, the amplitude of the self-inductance L and the amplitude of the mutual inductance M are used as LΔ and MΔ, respectively, in the expression (6). FIG. 30B indicates that torque ripples occur during the excitation with the rated current. This means that the torque is not zero at an ideal stable point in FIGS. 28A and 28B and acts as the vibrating force.

Figure 31A:
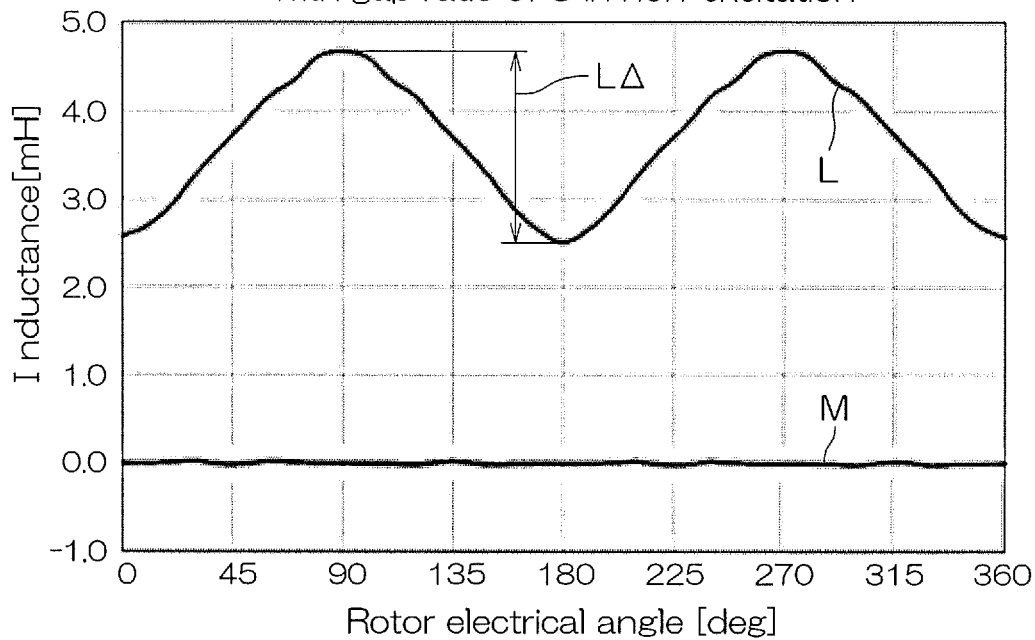
FIGS. 31A and 31B are diagrams showing the results of the analysis of the self-inductance and the mutual inductance of the slot magnet type stepping motor having a gap ratio of 8.
Figure 31B:
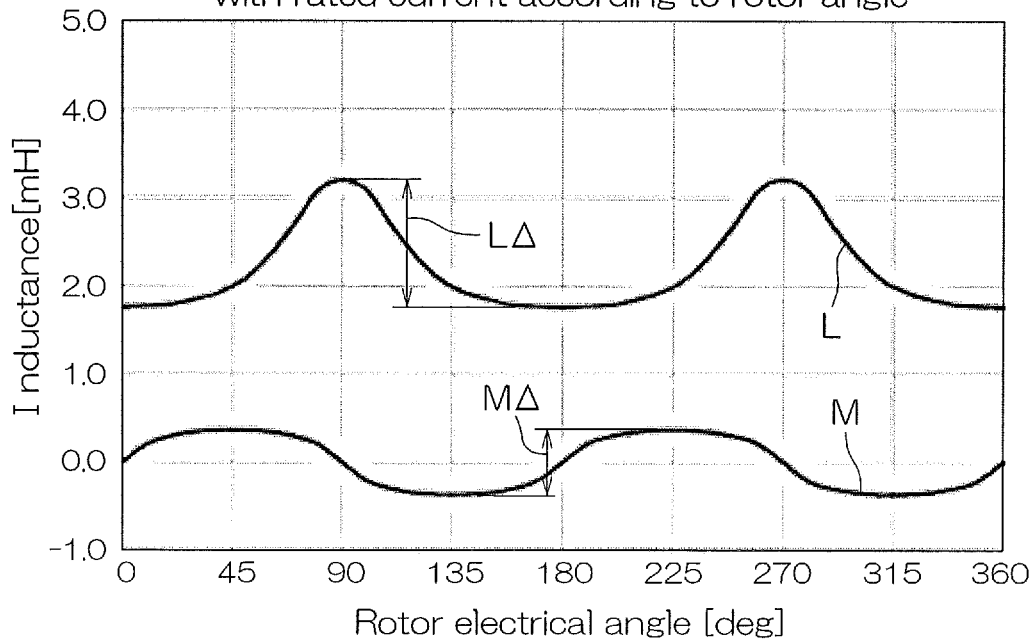
Figure 32A:
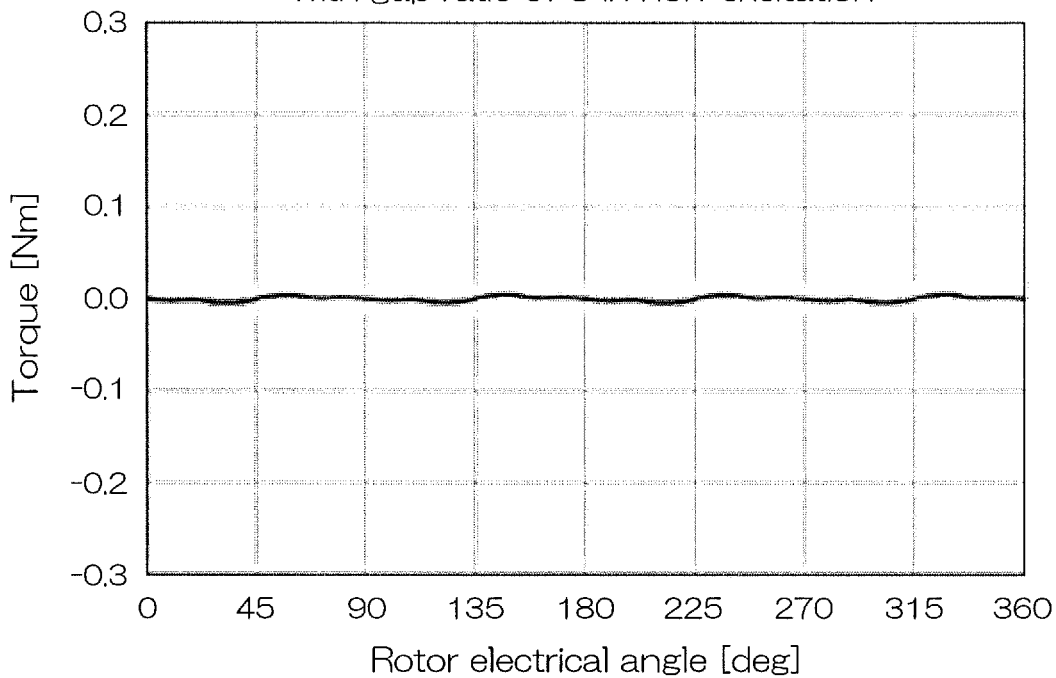
FIGS. 32A and 32B are diagrams showing the results of the torque analysis of the slot magnet type stepping motor having a gap ratio of 8.
Figure 32B:
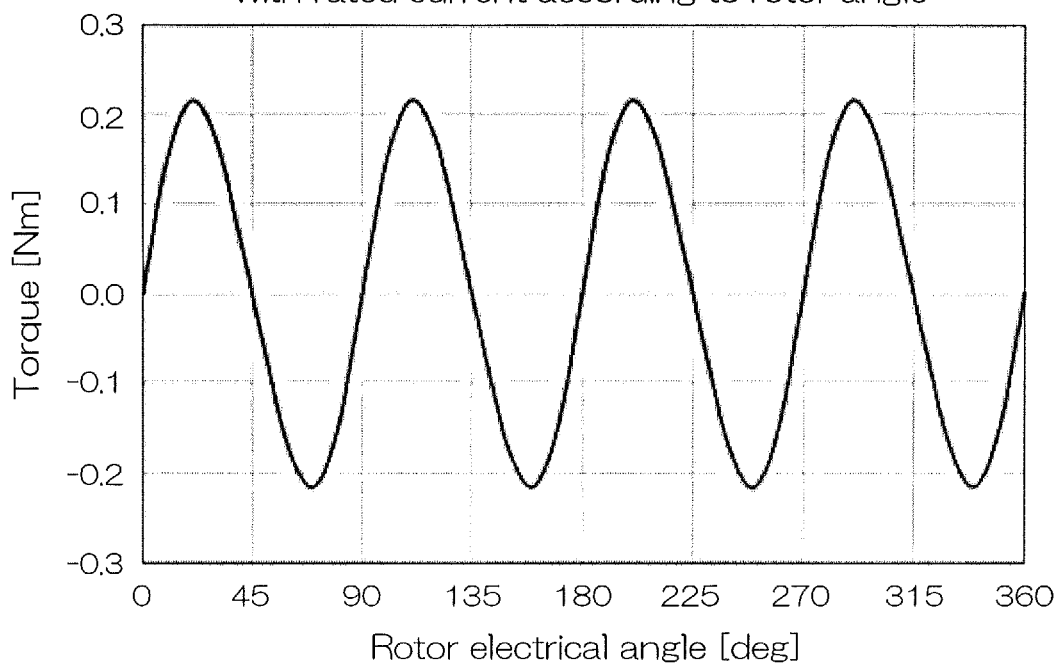

FIG. 31A shows the results of the analysis of the self-inductance L and the mutual inductance M obtained when the rotor of the slot magnet type motor having a gap ratio ΔM/ΔF of 8 was slowly rotated in the non-excitation state. FIG. 31B shows the results of the analysis of the self-inductance L and the mutual inductance M obtained when the rotor of the same motor was slowly rotated with the d-axis current set at the rated current value and with the q-axis current set at zero. FIG. 32A shows the result of the torque analysis corresponding to FIG. 31A (in the non-excitation state). FIG. 32B shows the result of the torque analysis corresponding to FIG. 31B (in the d-axis excitation with the rated current). The torque observed in the non-excitation state (FIG. 32A) is the detent torque.

As shown, the ratio between the self-inductance L and the mutual inductance M in the non-excitation state is significantly different as compared with the slot magnet type motor having a gap ratio ΔM/ΔF of 4. As compared with the motor having a gap ratio ΔM/ΔF of 4, the detent torque is smaller, but the torque ripples during the excitation are approximately doubled. This implies that the motor having a gap ratio ΔM/ΔF of 8 suffers from greater vibrations when being driven with an ideal sinusoidal current. This also implies that the detent torque does not directly affect the rotational vibrations.

Figure 33:
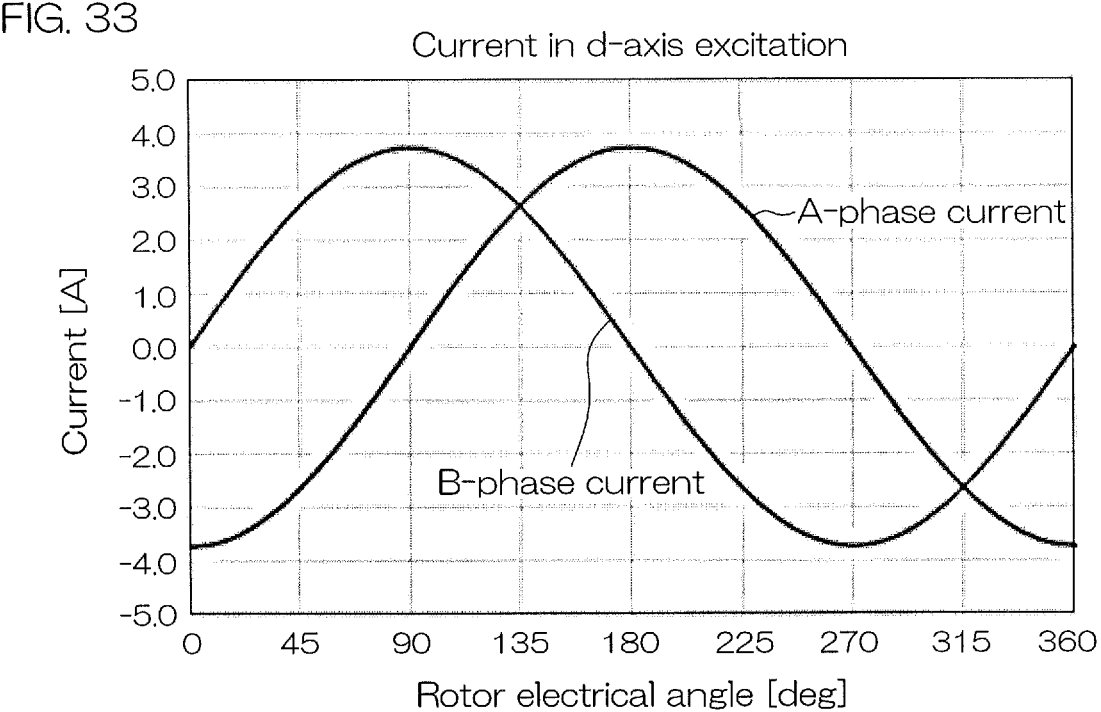
FIG. 33 is a waveform diagram showing exemplary waveforms of an A-phase sinusoidal current and a B-phase sinusoidal current applied during d-axis excitation with a rated current.
Figure 34:
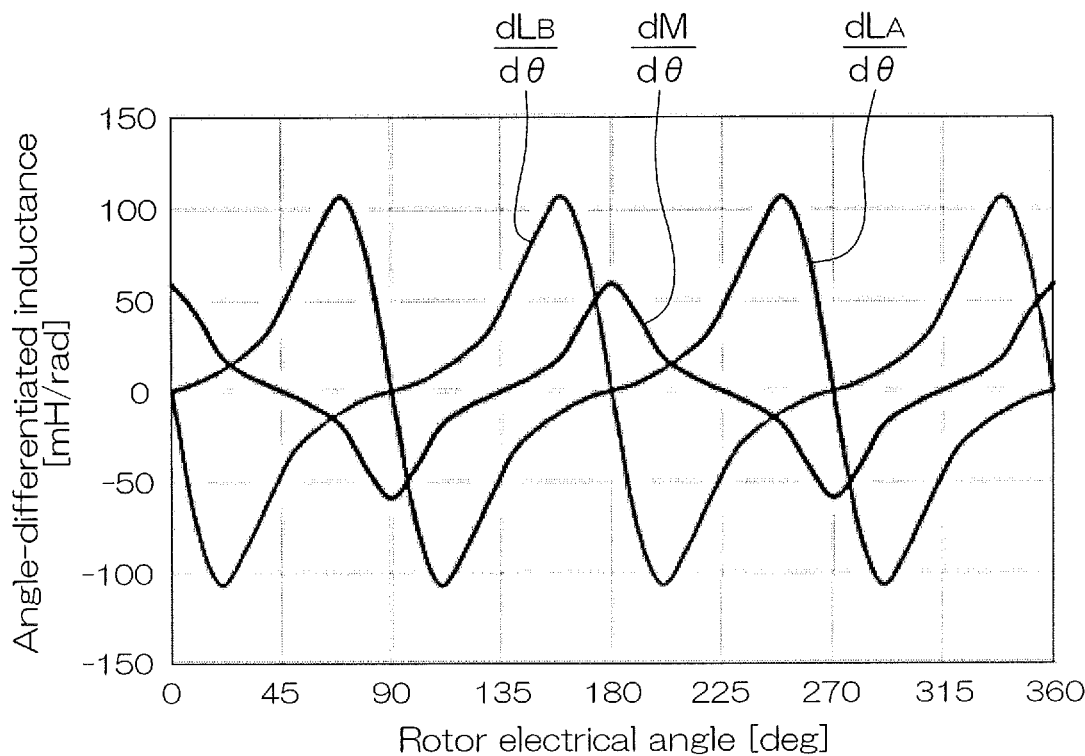
FIG. 34 is a waveform diagram showing the angle-differentiated inductance values calculated based on the results of the inductance analysis of the slot magnet type stepping motor.
Figure 35:
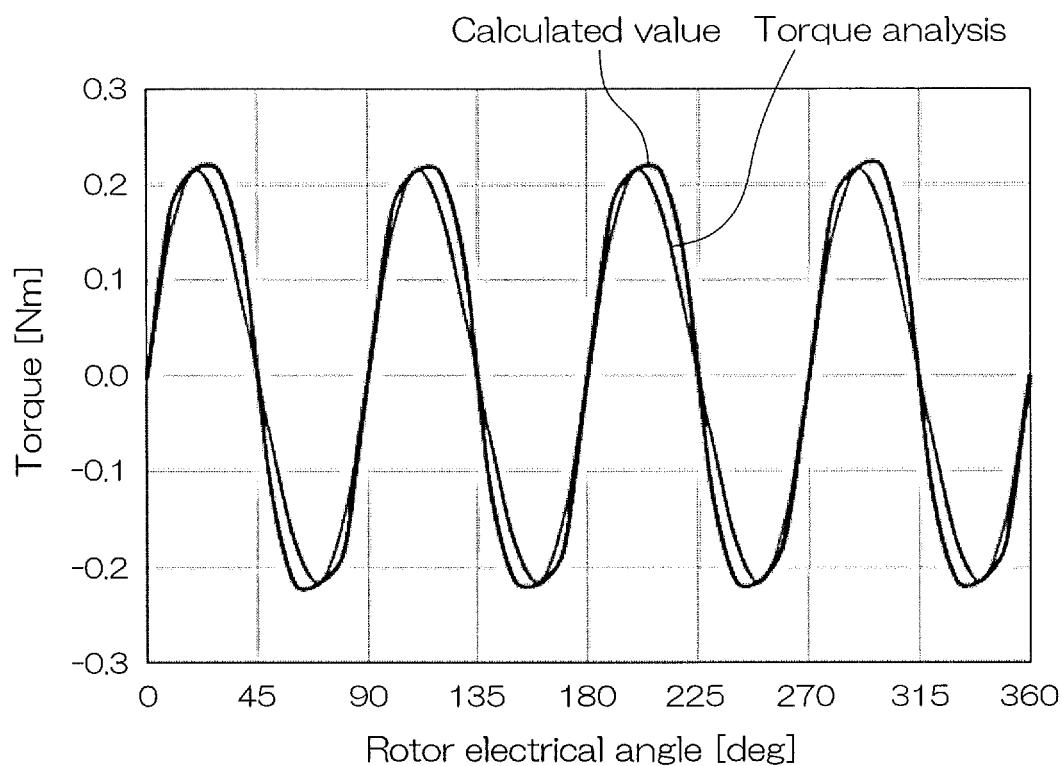
FIG. 35 is a waveform diagram showing superposed θ-T waveforms of reluctance torques of the slot magnet type stepping motor respectively determined by calculation and analysis.

The A-phase sinusoidal current and the B-phase sinusoidal current applied during the d-axis excitation with the rated current are as shown in FIG. 33. The angle-differentiated values are determined from the results (FIG. 31B) of the analysis of the inductances of the slot magnet type motor having a gap ratio ΔM/ΔF of 8. Then, the angle-differentiated value $dL_A/d\theta$ of the A-phase self-inductance $L_A$, the angle-differentiated value $dL_B/d\theta$ of the B-phase self-inductance $L_B$, and the angle-differentiated value $dM/d\theta$ of the mutual inductance M are provided as shown in FIG. 34. Based on these, the reluctance torque $T_r$ is calculated from the expression (4), and is compared with the result of the torque analysis (FIG. 32B). The comparison result is shown in FIG. 35. As shown, the values calculated from the expression (4) (including absolute values) substantially match with the torque analysis result. This indicates that the torque ripple component is attributable to the reluctance torque.

In reality, as shown in FIG. 31B, the inductances L, M each have a waveform containing a certain harmonic component, depending on the motor. In the case of FIG. 31B, the self-inductance L has a waveform containing a harmonic component having a cycle twice that of the self-inductance L, and the mutual inductance M has a waveform containing a harmonic component having a cycle three times that of the mutual inductance M. With these harmonic components, the angle-differentiated waveforms of the inductances L, M are also deviated from the sinusoidal waveforms. In the expressions (17) and (18), therefore, the amplitudes LΔ, MΔ of the angle-differentiated inductances (i.e., coefficients $A_1$, $A_2$) and $\delta_1$, $\delta_2$ of the harmonic current phase components are desirably effectively changed depending on how the harmonic components are contained in the inductances. More specifically, the vibration suppressing effect can be often improved by matching the phase of the reluctance torque correction waveform with the fundamental sinusoidal wave of the electrical angle cycle of the stepping motor 1 while allowing a slight phase deviation rather than by perfectly matching the phase of the reluctance torque correction waveform with the fundamental sinusoidal wave.

The same electrical configuration as shown in FIGS. 13 to 22 for driving the hybrid type stepping motor is used for driving the slot magnet type stepping motor. In the slot magnet type stepping motor, the vibrations can be suppressed by the current correction for the reluctance torque and/or the current correction for the nonlinearity term of the magnet torque as in the hybrid type stepping motor. However, the current correction for the nonlinearity term of the magnet torque is less necessary than in the hybrid type stepping motor and, therefore, may be obviated with less importance.

Figure 36:
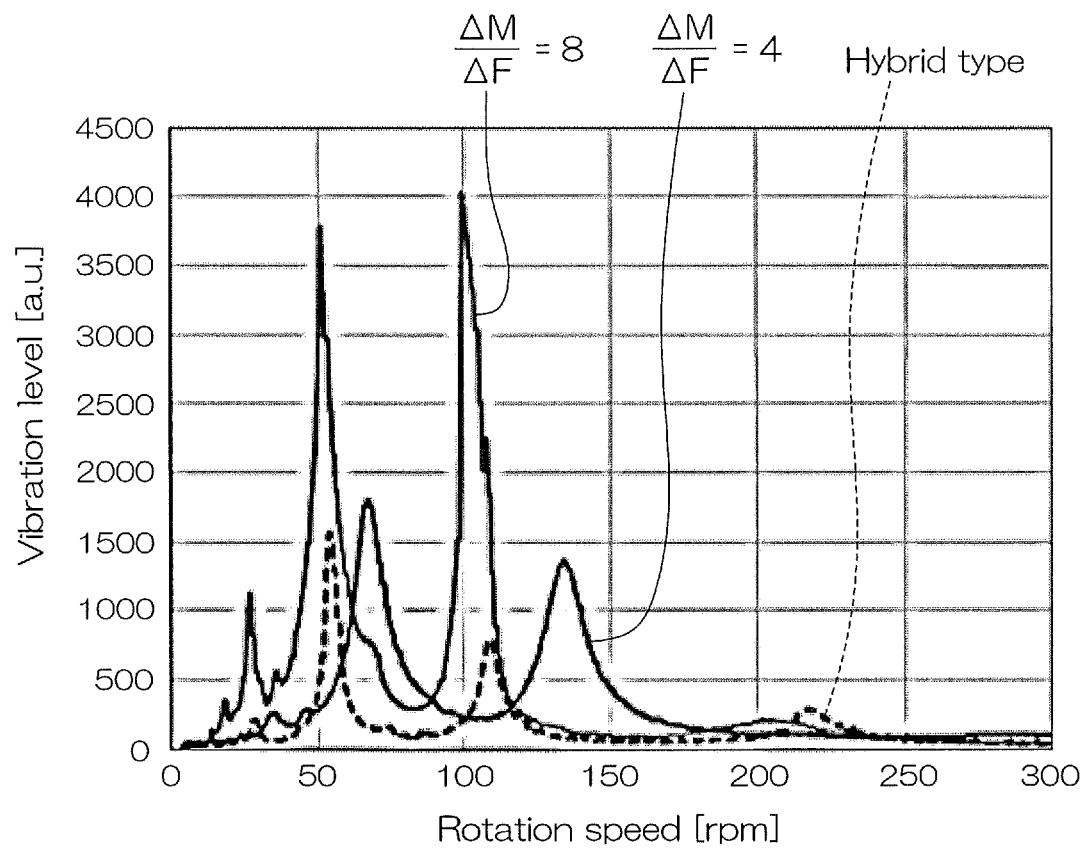
FIG. 36 is a diagram showing the measurement of the rotational vibrations of the slot magnet type stepping motors (without correction) by way of example.

Exemplary measurements of the rotational vibrations are shown in FIGS. 36 and 37. Stepping motors 1 used for the measurements include two-phase slot magnet type stepping motors (see FIGS. 25 to 27) each having a mounting angle size of 60 mm, a motor length of 40 mm, a rotor inertia moment of $370 \times 10^{-7}$ kg·m², and a rotor tooth number of 50, and a hybrid type stepping motor (see FIGS. 10 to 12) having the same physical construction. The two-phase slot magnet type stepping motors have a gap ratio ΔM/ΔF of 4 and a gap ratio ΔM/ΔF of 8, respectively, for which the measurement results are shown.

FIG. 36 shows a relationship between the rotation speed and the rotational vibration level where neither the current correction for the reluctance torque nor the current correction for the magnet torque was performed (where the motors were each driven with an uncorrected sinusoidal current). FIG. 37 shows a relationship between the rotation speed and the rotational vibration level where the current correction for the reluctance torque was performed and the current correction for the magnet torque was obviated.

FIG. 38 shows actual measurement values of the motor current of the slot magnet type stepping motor having a gap ratio ΔM/ΔF of 8. Shown in FIG. 38 are a fundamental current waveform yet to be corrected (a sinusoidal waveform corresponding to the line 510, 520 in FIG. 5A, 5B), a reluctance torque correction current waveform (corresponding to the line 511, 521 in FIG. 5A, 5B) to be superposed on the fundamental current waveform, and a corrected current waveform (corresponding to the line 512, 522 in FIG. 5A, 5B). The corrected current waveform is a waveform obtained by superposing the reluctance torque correction current waveform on the fundamental current waveform. However, the amplitude of the reluctance torque correction current waveform is adjusted according to the motor current before the superposition.

Where the slot magnet type stepping motors respectively having a gap ratio $\Delta M/\Delta F$ of 4 and a gap ratio $\Delta M/\Delta F$ of 8 and the hybrid type stepping motor were driven with the uncorrected sinusoidal current (FIG. 36), the second-order and fourth-order rotational vibrations notably appeared. On the other hand, where the current corrections were performed (FIG. 37), the vibration levels of the respective motors were significantly reduced.

Figure 39A:
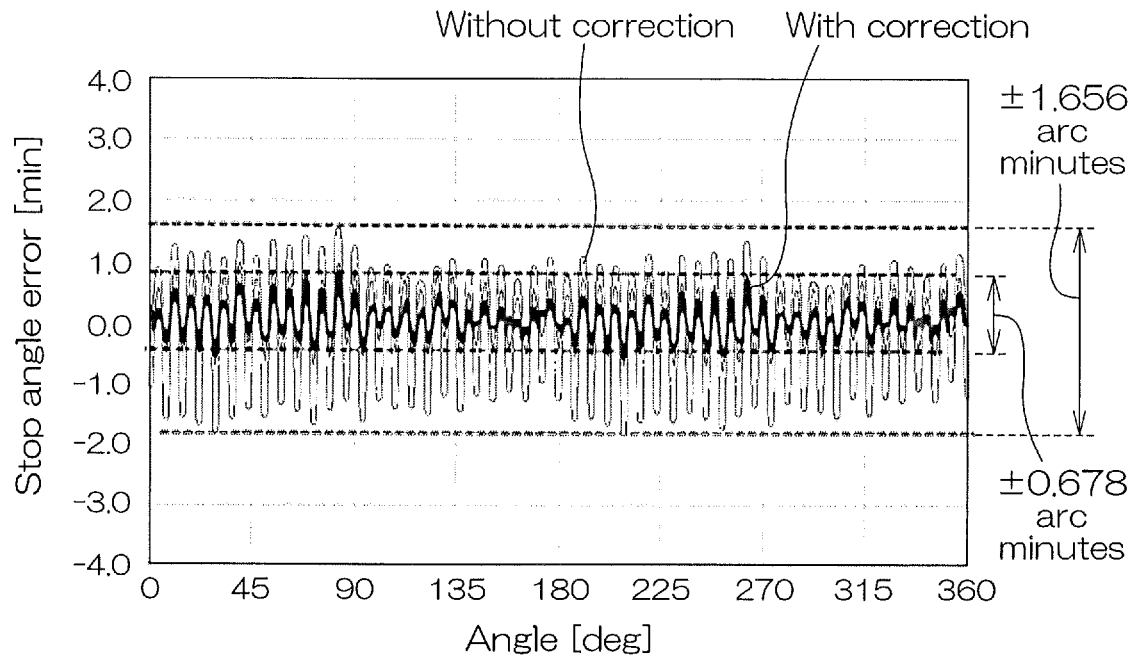
FIGS. 39A and 39B are diagrams showing the results of the measurement of the stop angle error when the slot magnet type stepping motor was operated by full-step driving.
Figure 39B:
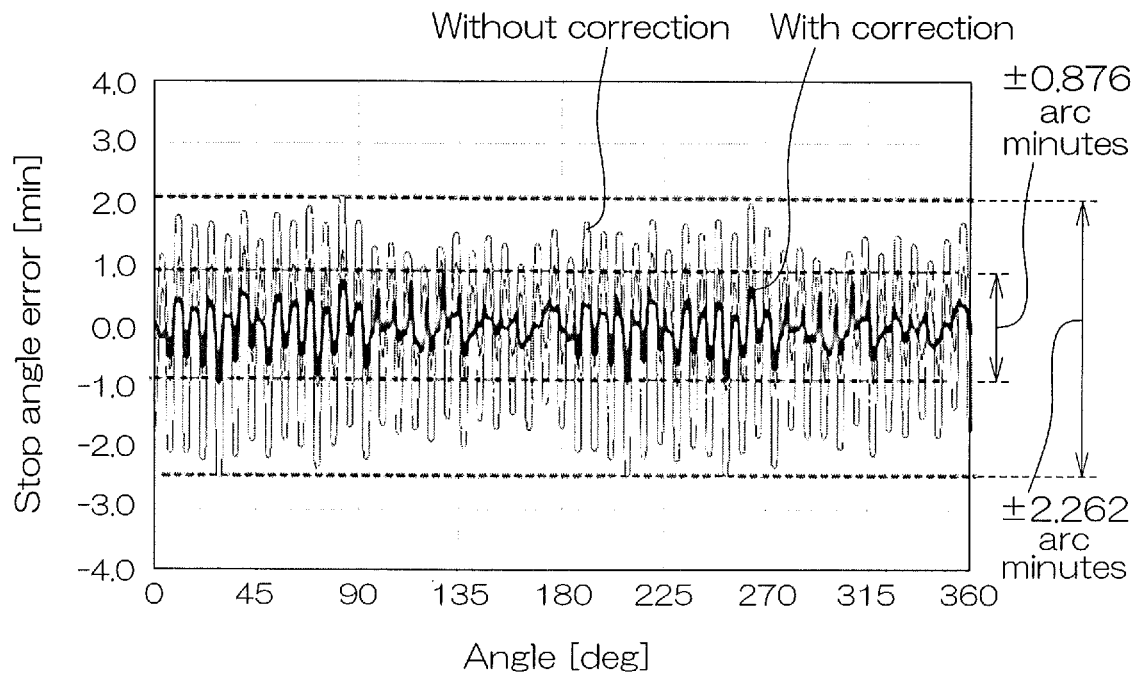

FIGS. 39A and 39B show the results of the measurement of the stop angle error when the slot magnet type motor having a gap ratio $\Delta M/\Delta F$ of 4 was operated by the full-step driving (1.8 degrees/pulse). The measurement results shown in FIG. 39A were obtained with the stop current set at the rated current, and the measurement results shown in FIG. 39B were obtained with the stop current set at 50% of the rated current. Shown in each of FIGS. 39A and 39B are measurement results obtained with and without the current correction for the reluctance torque. It is conventionally considered that the stop angle error observed when the motor is operated by the full-step driving is determined by the mechanical accuracy of the small teeth. However, this is not true when the reluctance torque is taken into consideration, but the stop angle error during the full-step driving can be suppressed by the current correction. FIGS. 39A and 39B indicate that, even if the different stop currents are employed, the current correction provides substantially the same stop angle error suppressing effect.

FIGS. 40A and 40B show the results of the measurement of the stop angle error when the slot magnet type stepping motor was operated by the micro-step driving (0.36 degrees/pulse). The measurement results shown in FIG. 40A were obtained with the stop current set at the rated current, and the measurement results shown in FIG. 40B were obtained with the stop current set at 50% of the rated current. Shown in each of FIGS. 40A and 40B are measurement results obtained with and without the current correction for the reluctance torque. The measurement results indicate that, even in the case of the micro-step driving, the current correction is effective and, even if the different stop currents are employed, the stop angle error suppressing effect can be maintained.

While the embodiment of the present invention has thus been described, the present invention may be embodied in some other ways. Although the embodiment described above is mainly directed to the driving of the two-phase stepping motor by way of example, the present invention is applicable to stepping motors having three or more phases. A driver which drives a three-phase stepping motor, for example, is configured such that the PWM inverter is adapted for U-phase, V-phase and W-phase windings and a coordinate transformer for coordinate transformation from the $\alpha$-$\beta$ coordinate system (two-phase fixed coordinate system) to a UVW coordinate system (three-phase fixed coordinate system) is provided between the voltage command coordinate transformer 88 and the PWM inverter 51 in FIG. 16. Further, a coordinate transformer for coordinate transformation from the UVW coordinate system (three-phase fixed coordinate system) to the $\alpha$-$\beta$ coordinate system (two-phase fixed coordinate system) is provided between the phase current coordinate, transformer 87 and current detectors which respectively detect U-phase, V-phase and W-phase currents. Drivers which drive other multiphase stepping motors may be configured in substantially the same manner.

In the embodiment described above, the qp-axis fundamental current command $i_{baseqp}*$ is set to zero by way of example, but the qp-axis fundamental current command $i_{baseqp}*$ may be set to a nonzero constant value or a nonzero variable value. Where the qp-axis fundamental current command $i_{baseqp}*$ has a nonzero value, the dp-axis fundamental current command $i_{basedp}*$ and the qp-axis fundamental current command $i_{baseqp}*$ may be determined so that the magnitude of a resultant current vector obtained by combining the dp-axis fundamental current command $i_{basedp}*$ and the qp-axis fundamental current command $i_{baseqp}*$ equals to the drive current amplitude. The drive current amplitude (which is equal to the dp-axis fundamental current command $i_{basedp}*$ when the qp-axis fundamental current command $i_{baseqp}*$ is zero) is not necessarily required to be a constant value. For example, power saving can be achieved by reducing the drive current amplitude when the rotor is held at a position after being rotated stepwise by the step angle $\Delta\theta$.

While the embodiments of the present invention have been described in detail, these embodiments are merely specific examples that are illustrative of the technical principles of the present invention but not limitative of the invention. The spirit and scope of the present invention are limited only by the appended claims.

This application claims the priority benefit of Japanese Patent Application No. 2020-159830 filed on Sep. 24, 2020, the disclosure of which is entirely incorporated herein by reference.

REFERENCE SIGNS LIST

1: Stepping motor
2: Stator
22, 22A, 22B: Windings
25: Stator slot magnets
30: Rotation axis
31: Rotor iron core
35: Rotor slot magnets
40: Permanent magnet
41: Rotor segment
42: Rotor segment
50: DC power source
51: PWM inverter
512: Pulse width modulation pattern generator
52A: A-phase current detector
52B: B-phase current detector
55: Driving circuit section
60: Control unit
70A: A-phase compensation value computing section
70B: B-phase compensation value computing section
71A: A-phase reluctance torque correction waveform generator
71B: B-phase reluctance torque correction waveform generator
72A: A-phase magnet torque correction waveform generator
72B: B-phase magnet torque correction waveform generator
73: Coefficient setting device 76A: A-phase adder
76B: B-phase adder
81: Compensation command generator
82: Compensation command coordinate transformer
83: First adder
84: Second adder
85: dp-axis current controller
86: qp-axis current controller
87: Phase current coordinate transformer
88: Voltage command coordinate transformer

The invention claimed is:

1. A stepping motor driver for driving a stepping motor according to a position angle command, the stepping motor driver comprising:
   a current detector that detects a phase current of the stepping motor;
   an inverter that applies a current to a winding of the stepping motor; and
   a control unit that controls the inverter;
   wherein a rotational coordinate system, which is rotated according to the position angle command, is defined by a dp-axis and a qp-axis orthogonal to each other;
   wherein the control unit comprises:
      a phase current coordinate transformer that transforms the phase current detected by the current detector into a dp-axis component and a qp-axis component in the rotational coordinate system based on the position angle command to generate a dp-axis detection current and a qp-axis detection current;
      a torque correction command generator that generates a torque correction command according to a torque correction waveform indicating a current waveform to be applied to the stepping motor in order to suppress torque fluctuation of the stepping motor;
      a torque correction command coordinate transformer that transforms the torque correction command generated by the torque correction command generator into a dp-axis component and a qp-axis component in the rotational coordinate system based on the position angle command to generate a dp-axis torque correction component and a qp-axis torque correction component;
      an adder that superposes the dp-axis torque correction component and the qp-axis torque correction component generated by the torque correction command coordinate transformer respectively on a dp-axis fundamental current command and a qp-axis fundamental current command based on the rotational coordinate system to generate a dp-axis current command and a qp-axis current command; and
      a control command generator that compares the dp-axis detection current and the qp-axis detection current generated by the phase current coordinate transformer respectively with the dp-axis current command and the qp-axis current command generated by the adder and applies a control command to the inverter according to a result of the comparison;
   wherein the torque correction waveform contains a reluctance torque correction waveform component which suppresses reluctance torque fluctuation; and
   wherein the reluctance torque correction waveform component has a waveform profile calculated with the use of a ratio between an amplitude of an angle-differentiated self-inductance and an amplitude of an angle-differentiated mutual inductance of the stepping motor.

2. The stepping motor driver according to claim 1, wherein the dp-axis fundamental current command indicates an amplitude of the current to be applied to the stepping motor, and the qp-axis fundamental current command indicates zero.

3. The stepping motor driver according to claim 1, wherein the reluctance torque correction waveform component has a waveform profile such that an original waveform having a frequency twice that of a fundamental sinusoidal wave of an electrical angle cycle of the stepping motor and having a phase matched with that of the fundamental sinusoidal wave is full-wave-rectified to the same sign as or a different sign from that of the fundamental sinusoidal wave.

4. The stepping motor driver according to claim 3, wherein the original waveform is a sinusoidal waveform.

5. The stepping motor driver according to claim 1, wherein the torque correction waveform contains a magnet torque correction waveform component for compensation for nonlinearity of a magnet torque with respect to the current.

6. The stepping motor driver according to claim 5, wherein the magnet torque correction waveform component has a waveform profile which varies according to the motor current supplied to the stepping motor.

7. The stepping motor driver according to claim 5, wherein the magnet torque correction waveform component has a waveform profile which amplifies an amplitude of a peak portion of a fundamental sinusoidal wave of an electrical angle cycle of the stepping motor when being superposed on the fundamental sinusoidal wave.

8. The stepping motor driver according to claim 1, wherein the stepping motor is of a hybrid type or of a slot magnet type.

9. The stepping motor driver according to claim 1,
   wherein the torque correction command generator generates the torque correction command according to a torque correction waveform indicating a current waveform in a two-phase fixed coordinate system defined by an α-axis and a β-axis orthogonal to each other,
   wherein the coordinate transformation by the torque correction command coordinate transformer is coordinate transformation from the two-phase fixed coordinate system to the rotational coordinate system.

10. The stepping motor driver according to claim 1, wherein the control command generator comprises:
    a voltage command generator that compares the dp-axis detection current and the qp-axis detection current respectively with the dp-axis current command and the qp-axis current command to generate a dp-axis voltage command and a qp-axis voltage command; and
    a voltage command coordinate transformer that coordinate-transforms the dp-axis voltage command and the qp-axis voltage command generated by the voltage command generator from the rotational coordinate system to a motor fixed coordinate system defined by a plurality of phases of the stepping motor based on the position angle command to generate phase voltage commands for the respective phases of the stepping motor.

11. The stepping motor driver according to claim 1, wherein the reluctance torque correction waveform component has a waveform profile which varies according to a motor current supplied to the stepping motor.

12. A stepping motor driver for driving a stepping motor according to a position angle command, the stepping motor driver comprising:
    a current detector that detects a phase current of the stepping motor;

an inverter that applies a current to a winding of the stepping motor; and a control unit that controls the inverter;

wherein a rotational coordinate system, which is rotated according to the position angle command, is defined by a dp-axis and a qp-axis orthogonal to each other;

wherein the control unit comprises:

a phase current coordinate transformer that transforms the phase current detected by the current detector into a dp-axis component and a qp-axis component in the rotational coordinate system based on the position angle command to generate a dp-axis detection current and a qp-axis detection current;

a torque correction command generator that generates a torque correction command according to a torque correction waveform indicating a current waveform to be applied to the stepping motor in order to suppress torque fluctuation of the stepping motor;

a torque correction command coordinate transformer that transforms the torque correction command generated by the torque correction command generator into a dp-axis component and a qp-axis component in the rotational coordinate system based on the position angle command to generate a dp-axis torque correction component and a qp-axis torque correction component;

an adder that superposes the dp-axis torque correction component and the qp-axis torque correction component generated by the torque correction command coordinate transformer respectively on a dp-axis fundamental current command and a qp-axis fundamental current command based on the rotational coordinate system to generate a dp-axis current command and a qp-axis current command; and a control command generator that compares the dp-axis detection current and the qp-axis detection current generated by the phase current coordinate transformer respectively with the dp-axis current command and the qp-axis current command generated by the adder and applies a control command to the inverter according to a result of the comparison;

wherein the torque correction waveform contains a reluctance torque correction waveform component which suppresses reluctance torque fluctuation;

wherein the reluctance torque correction waveform component has a waveform profile such that an original waveform having a frequency twice that of a fundamental sinusoidal wave of an electrical angle cycle of the stepping motor and having a phase matched with that of the fundamental sinusoidal wave is full-wave-rectified to the same sign as or a different sign from that of the fundamental sinusoidal wave; and wherein the reluctance torque correction waveform component has a waveform profile such that the original waveform is full-wave-rectified to the same sign as that of the fundamental sinusoidal wave when an amplitude of an angle-differentiated self-inductance of the stepping motor is greater than an amplitude of an angle-differentiated mutual inductance of the stepping motor, and the reluctance torque correction waveform component has a waveform profile such that the original waveform is full-wave-rectified to the different sign from that of the fundamental sinusoidal wave when the amplitude of the angle-differentiated self-inductance is smaller than the amplitude of the angle-differentiated mutual inductance.

13. The stepping motor driver according to claim 12, wherein the reluctance torque correction waveform component has a waveform profile calculated with the use of a ratio between an amplitude of an angle-differentiated self-inductance and an amplitude of an angle-differentiated mutual inductance of the stepping motor.

* * * * *